US007971180B2

(12) United States Patent
Kreamer et al.

(10) Patent No.: US 7,971,180 B2
(45) Date of Patent: Jun. 28, 2011

(54) METHOD AND SYSTEM FOR EVALUATING MULTI-DIMENSIONAL PROJECT PLANS FOR IMPLEMENTING PACKAGED SOFTWARE APPLICATIONS

(75) Inventors: Jed Kreamer, Santa Monica, CA (US); Juhnyoung Lee, Yorktown Heights, NY (US); Rakesh Mohan, Courtlandt Manor, NY (US); Thomas D. Rosinski, Frisco, TX (US); Vikas J. Shivpuriya, Elmsford, NY (US); Gerhard Sigl, Hudson, NH (US)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 11/762,129

(22) Filed: Jun. 13, 2007

(65) Prior Publication Data

US 2008/0313596 A1   Dec. 18, 2008

(51) Int. Cl.
 *G06F 9/44* (2006.01)
 *G06Q 10/00* (2006.01)
(52) U.S. Cl. ........ 717/101; 717/102; 717/103; 717/120; 717/123; 705/7; 705/10; 705/11
(58) Field of Classification Search .................... 717/101
 See application file for complete search history.

(56) References Cited

U.S. PATENT DOCUMENTS

| | | | |
|---|---|---|---|
| 5,408,663 A | | 4/1995 | Miller |
| 5,495,430 A * | | 2/1996 | Matsunari et al. ............... 703/6 |
| 5,537,524 A | | 7/1996 | Aprile |
| 5,671,361 A | | 9/1997 | Brown et al. |
| 5,815,638 A * | | 9/1998 | Lenz et al. ...................... 706/15 |
| 6,073,107 A | | 6/2000 | Minkiewicz et al. |
| 6,088,678 A * | | 7/2000 | Shannon ........................... 705/8 |
| 6,101,481 A | | 8/2000 | Miller |
| 6,490,569 B1 | | 12/2002 | Grune et al. |
| 6,546,506 B1 * | | 4/2003 | Lewis .............................. 714/38 |

(Continued)

FOREIGN PATENT DOCUMENTS

CA   2477919 A1   2/2006

(Continued)

OTHER PUBLICATIONS

Auer et al., "Increasing the Accuracy and Reliability of Analogy-Based Cost Estimation with Extensive Project Feature Dimension Weighting" Proceeding of the 2004 International Symposium on Empirical Software Engineering (ISESE'04).*

(Continued)

*Primary Examiner* — Thomas K Pham
(74) *Attorney, Agent, or Firm* — Cantor Colburn LLP; William J. Stock

(57) ABSTRACT

A method for scoring and ranking multi-dimensional project plans for implementing packaged software applications, the method includes: determining one or more dimensions for a project plan; assigning one or more attributes to each of the one or more dimensions; assigning one or more utility functions to each of the one or more attributes; assigning one or more weights to each of the one or more attributes; assigning one or more ordering factors to one or more combinations and permutations of the dimensions; calculating a series of scores for the one or more combinations and permutations of the dimensions; ranking the one or more combinations and permutations of the dimensions based on the calculated series of scores; and wherein each of the one or more combinations and permutations of the dimensions represents a different individual multi-dimensional project plan.

19 Claims, 43 Drawing Sheets

U.S. PATENT DOCUMENTS

| | | | |
|---|---|---|---|
| 6,549,956 B1 | 4/2003 | Bass et al. | |
| 6,550,053 B1 | 4/2003 | Muckley | |
| 6,678,671 B1 | 1/2004 | Petrovic et al. | |
| 6,738,736 B1 | 5/2004 | Bond | |
| 6,904,449 B1 | 6/2005 | Quinones | |
| 6,920,458 B1 | 7/2005 | Chu et al. | |
| 6,938,007 B1 | 8/2005 | Iulianello et al. | |
| 6,938,240 B2 | 8/2005 | Charisius et al. | |
| 6,990,437 B1 | 1/2006 | Abu El Ata | |
| 7,007,270 B2 | 2/2006 | Martin et al. | |
| 7,010,788 B1* | 3/2006 | Rehg et al. | 718/100 |
| 7,035,786 B1 | 4/2006 | Abu El Ata et al. | |
| 7,073,175 B2* | 7/2006 | Rehg et al. | 718/102 |
| 7,139,720 B1 | 11/2006 | Foell et al. | |
| 7,146,351 B2 | 12/2006 | Sweitzer et al. | |
| 7,305,654 B2* | 12/2007 | Patel et al. | 717/101 |
| 7,617,117 B2* | 11/2009 | Starkey | 705/7 |
| 7,676,490 B1* | 3/2010 | Cassone et al. | 707/805 |
| 2003/0135481 A1 | 7/2003 | Helmes et al. | |
| 2003/0212649 A1 | 11/2003 | Denesuk et al. | |
| 2004/0148209 A1 | 7/2004 | Church et al. | |
| 2005/0027582 A1 | 2/2005 | Chereau et al. | |
| 2005/0203784 A1 | 9/2005 | Rackham | |
| 2006/0041857 A1 | 2/2006 | Huang et al. | |
| 2006/0053043 A1* | 3/2006 | Clarke | 705/8 |
| 2006/0095906 A1 | 5/2006 | Oikawa | |
| 2006/0100916 A1 | 5/2006 | Kennedy et al. | |
| 2006/0230011 A1 | 10/2006 | Tuttle et al. | |
| 2007/0038501 A1 | 2/2007 | Lee et al. | |
| 2007/0124186 A1 | 5/2007 | Virine | |
| 2007/0203856 A1 | 8/2007 | Frohnhoefer et al. | |
| 2007/0271203 A1 | 11/2007 | Delvat | |
| 2008/0027776 A1 | 1/2008 | Sourov et al. | |

FOREIGN PATENT DOCUMENTS

| | | |
|---|---|---|
| WO | 0030000 A2 | 5/2000 |
| WO | 0140974 A2 | 6/2001 |
| WO | 0207367 A2 | 1/2002 |
| WO | 03083604 A2 | 10/2003 |
| WO | 2004077198 A2 | 9/2004 |
| WO | 2006023139 A2 | 3/2006 |

OTHER PUBLICATIONS

Martin Shepperd and Chris Schofield "Estimating Software Project Effort Using Analogies" Nov. 1997, IEEE Transactions on Software Engineering, vol. 23, No. 12.*

Model-Driven Architecture, [online]; [retrieved on Jun. 27, 2007]; retrieved from the Internet http://en.wikipedia.org/wiki/model-driven_architecture.

Eclipse Modeling Framework Project (EMF), [online]; [retrieved on Jun. 27, 2007]; retrieved from the Internet http://www.eclipse.org/modeling/emf/.

Eclipse Graphical Editing Framework (GEF), [online]; [retrieved on Jun. 27, 2007] retrieved from the Internet http://www.eclipse.org/gef/.

OMG Model Driven Architecture, [online]; [retrieved on Nov. 12, 2008]; retrieved from the Internet http://www.omg.org/mda/.

Eclipse Modeling Framework, [online]; [retrieved on Nov. 12, 2008]; retrieved from the Internet http://en.wikipedia.org/wiki/Eclipse_Modeling_Framework.

Graphic Modeling Framework, [online]; [retrieved on Nov. 12, 2008]; retrieved from the Internet http://www.eclipse.org/modeling/gmf/.

Unified Modeling Language, [online]; [retrieved on Nov. 12, 2008]; retrieved from the Internet http://en.wikipedia.org/wiki/Unified_Modeling_Language.

Robert Harmon et al. "Value-Based Pricing for New Software Products: Strategy Insights for Developers," pp. 1-24; 2005.

U.S. Appl. No. 11/762,117; Non-Final Office Action; filed Jun. 13, 2007; Date Mailed: Jan. 18, 2011.

A.W. Brown et al., "A Rational Approach to Model-driven Development," IBM Systems Journal, vol. 45, Issue 3, 18 pgs, 2006.

B. Hailpern and P. Tarr, "Model-driven Development: The Good, the Bad, and the Ugly," IBM Systems Journal, vol. 45, Issue 3; 2006.

U.S. Appl. No. 11/762,122; Non-Final Office Action; filed Jun. 13, 2007; Date Mailed: Feb. 15, 2011.

Ivan Porres, "Rule-based Update Transformations and their Application to Model Refactorings," Software and Systems Modeling, vol. 4, Issue 4, 19 pages, 2005.

Wikipedia, "Machine Learning," www.wikipedia.org/wiki/Machine_learning, Mar. 7, 2007, as retrived from the Wayback machine, www.web.archive.org, pp. 1-5.

U.S. Appl. No. 11/762,113; First Office Action; filed Jun. 13, 2007; Date Mailed: Oct. 13, 2010.

U.S. Appl. No. 11/762,134; Final Office Action; filed Jun. 13, 2007; Date Mailed: Sep. 9, 2010.

U.S. Appl. No. 11/762,134; Non-Final Office Action; filed Jun. 13, 2007; Date Mailed: Apr. 5, 2010.

* cited by examiner

FIG. 1F

End-User's View

1. Start the estimation system
2. Start a form-based questionnaire in the system
3. Answer questions for project plan estimation
   1) Answer "Basic Info" questions
   2) Answer scope questions
   3) Answer "System" questions
4. Review alternative implementation project plans with score
5. Select an implementation project plans with score
6. Review the complete tree of the selected project plan
7. *Iteratively, go back to Step 4 for an alternative project plan*
8. Manually adjust the plan structure by selecting entries in the complete tree
9. Generate a Gantt chart (project schedule estimation) in a worksheet (using a button)
10. Review the Gantt chart to see if it meets the requirements
11. *Iteratively, go back to Step 3 for what-if analysis of alternative schedule estimations*
12. Manually adjust and refine the project plan (using a graphical User interface)
13. *Iteratively, go back to Step 9 for a refined Gantt chart*
14. *At anytime, save the session in a file in the local disk*
15. *At anytime, the user can exit the session and come back later to open the session using the file*
16. Answer questions for staffing and costing estimation (using a form-based questionnaire)
17. Generate a staffing report with default FTE assignment in a worksheet (using a button)
18. Review the staffing and FTE assignment for appropriateness
19. *Iteratively, go back to Step 16 for an alternative staffing*
20. *Iteratively, go back to Step 3 for an alternative project plan estimation and a staffing*
21. Adjust the assigned FTE if desired (using a graphical user interface)
22. Generate a costing report associated with the staffing report (using a button)
23. Generate a financial benefit report along with the staffing and costing report (using a button)
24. Generate a pricing proposal (using a button)
25. Publish the entire case-answers, Gantt charts, staffing/costing/benefits/pricing reports (button)

System's View

1. Start the template estimation system
2. Load up models and parameters from the knowledge base; render questionnaire with them
3. Record the answers internally; apply them to the project plan score estimator; generate the project plan list with score
4. NA
5. Generate and render the complete tree for the selected project plan
6. NA
7. Show the project plan list with score
8. Record the user's selection internally; apply the selection and previous answers to the rule-based duration estimator
9. Render the Gantt chart based on the calculation of the estimator
10. NA
11. Show the questionnaire tabs in the form
12. Record the user's modification internally; apply the modification to the Gantt chart presentation logic
13. Go to Step 9
14. Save all the info of the session in an object, and store it in hard drive
15. When user comes back, open up the object to resume the session
16. Record the answers internally; apply them to the staffing estimator; generate the staffing estimation
17. Render the staffing report side by side with the Gantt chart
18. NA
19. Show the staffing and costing questionnaire
20. Show the project plan estimation questionnaire
21. Record the user's modification internally; apply them to the calculation of hours and cost
22. Render the costing report side by side with the staffing report
23. Calculate and render the benefit report side by side with costing report
24. Calculate and render the pricing report
25. Publish the case data to the subscription servers
26. Subscribe case data from the subscription servers
27. Cleanse the case data and store them in case data repository
28. Model refiner analyzes the case data and calibrate the estimation models
29. Update estimation models and parameters in estimation knowledge base

| Financial Measure | Unit | As Is Value | Impact percentage | Expected Value |
|---|---|---|---|---|
| COGS | $K | 4,996,000 | 0% | 4,996,000 |
| Gross Profit | $K | 716,000 | 0.38% | 718,750.69 |
| Income taxes | $K | 41,000 | 1.68% | 41,687.67 |
| Net Income | $K | 123,000 | 1.68% | 125,063.02 |
| Net Revenue | $K | 5,712,000 | 0.05% | 5,714,750.69 |
| Operating Income | $K | 86,000 | 3.2% | 88,750.69 |
| Other income or loss | $K | 73,000 | 0% | 73,000 |
| Pre-tax interest expense | $K | 5,000 | 0% | 5,000 |
| Pretax income | $K | 164,000 | 1.68% | 166,750.69 |
| Research and Development Expense | $K | 185,000 | 0% | 185,000 |
| SG&A | $K | 445,000 | 0% | 445,000 |
| Days Sales Outstanding | days | 160.77 | 0% | 0 |
| Accounts Receivable | $K | 2,516,000 | 0.05% | 2,517,211.61 |
| Cash and Marketable Securities | $K | 3,500,000 | 10.97% | 3,883,838.19 |
| Finished goods Inventory | $K | 669,000 | -57.25% | 285,993.21 |
| Other current assets | $K | 100,000 | 0% | 100,000 |
| Other fixed assets | $K | 100,000 | 0% | 100,000 |
| Property, Plant and Equipment | $K | 1,019,000 | 0% | 1,019,000 |
| Raw materials inventory | $K | 340,000 | 0% | 340,000 |
| Total Assets | $K | 8,425,000 | 0.02% | 8,427,053.21 |
| Total Inventory | $K | 1,190,000 | -32.19% | 806,993.21 |
| Total current Assets | $K | 7,306,000 | 0.03% | 7,308,053.01 |
| WIP inventory | $K | 181,000 | 0% | 181,000 |
| Accounts Payable | $K | 768,000 | 0% | 768,000 |
| Long-term debt | $K | 100,000 | 0% | 100,000 |
| Other current liabilities | $K | 504,000 | 0% | 504,000 |
| Other long-term liabilities | $K | 100,000 | 0% | 100,000 |
| Stockholders Equity | $K | 6,953,000 | 0.03% | 6,955,063.01 |
| Total Liabilities and Stockholders Equity | $K | 8,425,000 | 0.02% | 8,427,063.01 |
| Total current liabilities | $K | 1,272,000 | 0% | 1,222,000 |
| Total liabilities | $K | 1,472,000 | 0% | 1,472,000 |
| Change in Accounts Payable | $K | 0 | 0% | 0 |
| Change in Accounts Receivable | $K | 0 | 0% | -1,211.61 |
| Change in Inventory | $K | 0 | 0% | 0 |
| Change in Other current assets | $K | 0 | 0% | 0 |
| Change in Other current liabilities | $K | 0 | 0% | 385,006.79 |
| Depreciation Expense | $K | 181,000 | 0% | 181,000 |
| Current Liabs to Net Worth | | 0.18 | -0.03% | 0.18 |
| Debt-Equity Ratio | | 0.01 | -0.03% | 0.01 |

METHOD AND SYSTEM FOR EVALUATING MULTI-DIMENSIONAL PROJECT PLANS FOR IMPLEMENTING PACKAGED SOFTWARE APPLICATIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to estimating schedules, staffing, costs, and business benefits of software implementation projects, and more particularly to a method and system for evaluating multi-dimensional implementation project plans for packaged software applications employing normative and constructive estimation models to score and rank project plans based on combinations and permutations of dimensions with regards to attributes and ordering factors.

2. Description of the Related Art

Prepackaged business applications, such as enterprise resource planning (ERP), supply chain management (SCM), supplier relationship management (SRM), product lifecycle management (PLM), and customer relationship management (CRM), offer significant benefits and are critical for an organization's business efficient operations. However, the project planning, configuration, and implementation of prepackaged business applications are time-consuming and costly, and require a variety of skills and expertise that many companies and organizations may not possess. In addition, the costs associated with adopting, ongoing management, and maintenance of business application packages can be staggering.

Well known project planning and costing methodologies include COCOMO (Constructive Cost Model), activity-based costing (ABC) and the ascendant (SAP) method.

COCOMO

COCOMO is a model that estimates cost, effort, staffing, and schedules when planning a new software development activity. COCOMO provides a hierarchy of three increasingly detailed estimation models: (1) Basic COCOMO—a static, single-valued model that computes software development effort (and cost) as a function of program size expressed in estimated lines of code, (2) Intermediate COCOMO—computes software development effort as a function of program size and a set of "cost drivers" that include a subjective assessment of product, hardware, personnel and project attributes, and (3) Detailed COCOMO—incorporates all characteristics of the intermediate version with an assessment of the cost driver's impact on each step (analysis, design, etc.) of the software engineering process.

Activity-Based Costing (ABC)

Activity-based costing (ABC) is an accounting methodology that defines processes, identifies the cost drivers of these processes, determines the unit costs of products and services, and creates reports on agency components that can be used to generate activity- or performance-based budgets. Activity-based costing is based on the following process steps:

(1) Identify activities-perform an in-depth analysis of the operating processes of each responsibility segment. Each process may consist of one or more activities required by outputs, (2) Assign resource costs to activities-sometimes called "tracing." Traceability refers to tracing costs to cost objects to determine why costs were incurred. Costs are categorized in three ways:
  (a) Direct—costs that can be traced directly to one output. Example: the material costs (varnish, wood, paint) to build a chair,
  (b) Indirect—costs that cannot be allocated to an individual output; in other words, they benefit two or more outputs, but not all outputs. Examples: maintenance costs for the saws that cut the wood, storage costs, other construction materials, and quality assurance.), and
  (c) General and Administrative—costs that cannot reasonably be associated with any particular product or service produced (overhead). These costs would remain the same no matter what output the activity produced. Examples: salaries of personnel in purchasing department, depreciation on equipment, and plant security, (3) Identify outputs—identify all of the outputs for which an activity segment performs activities and consumes resources. Outputs can be products, services, or customers (persons or entities to whom a federal agency is required to provide goods or services), and (4) Assign activity costs to outputs—assign activity costs to outputs using activity drivers. Activity drivers assign activity costs to outputs based on an individual outputs' consumption or demand for activities. For example, a driver may be the number of times an activity is performed (transaction driver) or the length of time an activity is performed (duration driver).

Ascendant Method

The ascendant method is a methodology that provides a consistent, structured, and practical approach to what needs to be done, when it should be done, how it should be done, and how it should be controlled. The ascendant method evolved from SAP AG's AcceleratedSAP (ASAP) method, and IBM practices, practice aids, and methods. The ascendant method supports rolling out a global solution to multiple markets/countries (i.e., several sites implanting SAP in concurrent, staggered go-lives). The ascendant method consists of a number of phases including: market initialization (evaluation), solution preparation, business blueprint, realization, cluster preparation, and cluster go live to sustain. Details of the phases are as follows:

Market initiation (phase 0)—The purpose of the market initiation phase is to complete the basic activities necessary to launch the template system's implementation project in the target markets. Each market initiation implementation project will have its own unique objectives, scope, priorities, and timeline. Typical activities in the market initiation phase include: market initiation planning; market data cleansing, standardization, and mapping workshops; infrastructure planning and deployment; local support organization planning and implementation; market application and system landscape integration; ongoing project and change management; and completion check. Sample key deliverables/results include: early adoption of data standards; local area network (LAN)/wide area network (WAN) deployment strategy; market application and system landscape strategy; and local support organization design. An alternative name for phase 0 is the evaluation phase. The purpose of the evaluation phase is to coordinate activities that are most often part of proposal development.

Solution (project) preparation (phase 1)—The purpose of the solution preparation phase is to commence and execute detailed scope, planning and preparation for the template implementation in the target market. Project preparation builds on the initial scope, strategies, and plans from the project proposal, which is the major deliverable in the evaluation phase, and helps create the project charter. Typical activities in the solution preparation phase include: ongoing project and change management; strategy and preparation for the business blueprint phase; infrastructure requirements; market application and system landscape; scope data conversion and functional design; a first data conversion dry run; and a completion check. Sample key deliverables/results include: project charter; project team organization structure; milestone program plan; detail blueprint phase work plan; and technical infrastructure deployment.

Business blueprint (phase 2)—The purpose of the business blueprint is to identify process requirements in a business blueprint document that defines how the organization intends to run its business. The main activity of the business blueprint phase is to perform a fit/gap analysis between the template system solution and the target market requirement. The approved gaps will determine the detailed design that has to be completed. Typical activities in the business blueprint phase include: ongoing project and Change Management; template fit/gap analysis; update data mapping and conversion design; a second data conversion dry run; document business blueprint; planning, review strategy and prepare for realization phase; infrastructure alignment; market application and system landscape alignment; induction of super and end-user training; role management; and completion check of business blueprint. Sample key deliverables/results include: fit/gap resolution and approval; data mapping and transformation; security processes; confirm end user roles and variants; and a documented business blueprint. Realization (phase 3)—The purpose of the realization phase is to localize and test the template systems for the target market, in accordance with the requirements documented in the Business Blueprint, and prepare a production ready environment (working production system). Typical activities in the realization phase include: ongoing project and change management; finalize data conversion documentation and developments; a third data conversion dry run; finalizing RICEF documentation and developments; configuration and process test; role management realization; custom development and technical connectivity; infrastructure deployment; cutover planning and simulation; integration testing; finalizing of super and end-user training; and planning and prepare for cluster preparation. Sample key deliverables/results include: market configuration confirmed; market role variants built; market custom development built; cutover plans approved; and a fully tested system. Cluster (final) preparation (phase 4)—The purpose of cluster preparation phase is to complete preparations for the cluster to go live with the template systems and to complete the plan for transitioning to a day-to-day business operation. Typical activities in the cluster preparation phase include: ongoing project and change management; finalizing RICEF programs; final data conversion; market cutover simulation; market acceptance testing; cluster regression tests; deliver super and end-user training; completion check; and plan and prep for go live and support phase. Examples of key deliverable/results for the cluster preparation phase include: data converted; cut over checklist; contingency plan; production readiness review; legacy retirement plan; and execution of regression test.

Cluster go live and support (phase 5)—The purpose of the go live and support phase is to transition the target market to use the template systems for day-to-day business operations (complete the transition from pre-production environment to a live, stable, productive operation). Typical activities for the go live and support phase include: ongoing project and change management; plan for continuous improvement; plan and preparation for sustain phase; post cluster go-live support; production support; systems monitoring; and system management; and a completion check. Examples of key deliverable/results for the cluster go live and support phase include: production ready systems environment; production capable end users; and production capable support help.

Sustain (phase 6)—The purpose of the sustain phase is to implement a framework for maintaining and improving the performance of the production system.

However, while the currently available project planning and costing methodologies offer aspects of software development project estimation, including the expected time for software development using factors, and project costing and pricing, the available methodologies do not specifically address estimation and implementation of project plans for packaged software applications. Furthermore, none of the present state of the art in software project estimation teaches multi-dimensional implementation project plans, rule-based estimation of service project phase duration, utilization of estimation knowledge bases that externalize estimation parameters for the estimation model configuration, Gantt chart generation of multi-dimensional implementation project plans, staffing and costing for multi-dimensional implementation project plans, and overlapping, grouping, and clustering of rollouts in project plans.

The present state of the art in estimation tools uses ill-fitted models for estimating packaged software applications, and lacks a consistent and efficient method and process for carrying out the estimation. The lack of software tools, and manual calculations based on rules-of-thumb result in significant financial loses every year for packaged application service providers due to inaccurate estimates in terms of cost, implementation strategies, resource usage, etc. Inaccurate estimation results in over-estimates, which lead to lost business opportunities, due to non-competitive bids, and under-estimates, which lead to lost profit on projects that have been under-charged. Furthermore, the ill-fitted models for estimating packaged software applications, the lack of consistent and efficient method and process of estimation, lack of software tools and manual calculation based on rule-of-thumb has had detrimental effects on the productivity of project planners of service providers and customers. The present state of the art in software project estimation requires labor-intensive effort, provides limited scalability for global practice, and lacks of consistency in estimation. The lack of a standard method, process and language, leaves little room for improvement for estimation quality, does not help retain relevant knowledge and experience, and does not help make estimators more efficient and productive.

Therefore there is a need for a system and method that specifically addresses estimation and implementation of project plans for packaged software applications, while providing for multi-dimensional implementation project plans, rule-based estimation of service project phase duration, utilization of estimation knowledge bases that externalize estimation parameters for the estimation model configuration, Gantt chart generation of multi-dimensional implementation project plans, staffing and costing for multi-dimensional implementation project plans, and overlapping, grouping, and clustering of rollouts in project plans.

Glossary

Application software—application software allows end users to accomplish one or more specific (non-computer related) tasks. Typical applications include industrial automation, business software, educational software, medical software, databases, and computer games. Businesses are probably the biggest users of application software, but almost every field of human activity now uses some form of application software. Application software is used to automate all sorts of functions.

Ascendant method—The ascendant method is a methodology that provides a consistent, structured, and practical approach to what needs to be done, when it should be done, how it should be done, and how it should be controlled. The ascendant method evolved from SAP AG's AcceleratedSAP (ASAP) method, and IBM practices, practice aids, and methods. The ascendant method supports rolling out a global solution to multiple markets/countries (i.e., several sites implanting SAP in concurrent, staggered go-lives). The ascendant method consists of a number of phases including: market initialization, solution preparation, business blueprint, realization, cluster preparation, and cluster go live to sustain.

Component business model (CBM)—A component business model represents the entire business in a simple framework that fits on a single page. The component business model is an evolution of traditional views of a business, such as ones through business units, functions, geography, processes or workflow. The component business model methodology helps identify basic building blocks of business, where each building block includes the people, processes and technology needed by this component to act as a standalone entity and deliver value to the organization. This single page perspective provides a view of the business, which is not constricted by barriers that could potentially hamper the ability to make meaningful business transformation. The component business model facilitates to identify which components of the business create differentiation and value. It also helps identify where the business has capability gaps that need to be addressed, as well as opportunities to improve efficiency and lower costs across the entire enterprise.

Constructive model—A constructive model is an intuitive model. In the context of the present invention, constructive models for estimation provide insights and understanding to the estimation, as well as, interactive decision support using what-if analysis and sensitivity analysis.

Crawler—A crawler is a program or automated script that discovers and collects information offered in one or more computer networks.

CRM (customer relationship management)—CRM is an information industry term for methodologies, software, and usually Internet capabilities that help an enterprise manage customer relationships in an organized way. For example, an enterprise might build a database about its customers that described relationships in sufficient detail so that management, salespeople, people providing service, and perhaps the customer directly could access information, match customer needs with product plans and offerings, remind customers of service requirements, know what other products a customer had purchased, and so forth.

EMF (Eclipse Modeling Framework)—EMF is a modeling framework and code generation facility for building tools and other applications based on a structured data model. From a model specification described in XMI, EMF provides tools and runtime support to produce a set of Java classes for the model, a set of adapter classes that enable viewing and command-based editing of the model, and a basic editor. Models can be specified using annotated Java, XML documents, or modeling tools like Rational Rose, then imported into EMF. Most important of all, EMF provides the foundation for interoperability with other EMF-based tools and applications.

ERP (Enterprise Resource Planning)—ERP systems integrate all data and processes of an organization into a unified system. A typical ERP system will use multiple components of computer software and hardware to achieve the integration. A key ingredient of most ERP systems is the use of a unified database to store data for the various system modules.

FMBS (financial and business management system)—The life cycle of each FBMS deployment consists of four key phases.

Business Blueprint Phase: Business process requirements are identified and a Business Blueprint document that defines how the organization intends to run its business within the business management system is developed. Additional activities that occur during this phase include the finalization of the detailed project scope, refinement of the requirements of Reports, Interfaces, Conversions, Enhancements and Forms (RICEF), documentation of the process changes for end users, and establishment of the technical system environment.

Realization Phase: The FBMS system, including RICEF elements is built based on the business process requirements identified in the Business Blueprint Phase, organizational impacts are identified and communicated, and system integration testing occurs.

Final Preparation: The activities that occur during this phase include data conversion from existing systems over to FBMS, final system testing, end user training, and establishment of a Help Desk. The activities that take place during Final Preparation lead up to the determination of final technical and organizational readiness of the system for go-live.

Go-live and Support: During this phase the organization will transition to the system, go-live, and conduct business using the new functionality. End user training continues and post-go live support is provided. Evaluation and monitoring of system transactions also takes place to ensure optimal system performance.

FTE (Full-time equivalent)—FTE is a way to measure a worker's productivity and/or involvement in a project. An FTE of 1.0 means that the person is equivalent to a full-time worker. An FTE of 0.5 may signal that the worker is only half-time, or that his projected output (due to differences in qualification, for example) is only half of what one may expect. Typically, different scales are used to calibrate this number, depending on the type of institution (schools, industry, research) and scope of the report (personnel cost, productivity).

Gantt chart—A Gantt chart is a graphical representation of the duration of tasks against the progression of time. A Gantt chart is a useful tool for planning and scheduling projects, as well as monitoring a project's progress. A Gantt chart allows for an assessment of how long a project should take, illustrates the dependencies between tasks, and the order in which tasks need to be carried out. Gantt charts have become a common technique for representing the phases and activities of a project work breakdown structure (WBS), so they can be understood by a wide audience.

GEF (Graphical Editing Framework)—GEF is a framework that was developed for the Eclipse platform (an open source, platform independent software framework, written primarily in Java, and originated by IBM). GEF consists of the following components: draw2d has to be used for the View components, Requests/Commands have to be used to edit the model, Palette of Tools that is offered to the user. Benefits of GEF include: having a graphical representation and being able to edit it; predefined tools for selection, connection creation and others; and the model-view-controller (MVC) concept. GEF allows developers to take an existing application model and quickly create a rich graphical editor.

GMF (Graphical Modeling Framework)—GMF is a framework within the Eclipse platform (an open source, platform independent software framework, written primarily in Java, and originated by IBM), and provides a generative component and runtime infrastructure for developing graphical editors based on the Eclipse Modeling Framework (EMF) and Graphical Editing Framework (GEF).

ISV (Independent Software Vendor)—ISV is a business term for companies specializing in making or selling software, usually for niche markets, such as that for real estate brokers, scheduling for healthcare personnel, barcode scanning and stock maintenance. The specialized software products generally offer higher productivity to organizations than more generalized software such as basic spreadsheet or database packages. An ISV makes and sells software products that run on one or more computer hardware or operating system platforms.

KE (Knowledge engineering)—KE refers to the building, maintaining and development of knowledge-based systems. It has a great deal in common with software engineering, and is related to many computer science domains such as artificial intelligence, databases, data mining, expert systems, decision support systems and geographic information systems.

Knowledge-based system—a computer system that is programmed to imitate human problem-solving by means of artificial intelligence and reference to a database of knowledge on a particular subject.

KPI (Key Performance Indicators)—KPI are financial and non-financial metrics used to quantify objectives to reflect strategic performance of an organization. Key Performance Indicators define a set of values used to measure against. These raw sets of values fed to systems to summarize information against are called indicators. Indicators identifiable as possible candidates for KPIs can be summarized into the following sub-categories:
   Quantitative indicators which can be presented as a number.
   Practical indicators that interface with existing company processes.
   Directional indicators specifying whether an organizations is getting better or not.
   Actionable indicators are sufficiently in an organization's control to effect change.

MDA (Model-Driven Architecture)—MDA is a software design approach introduced by the Object Management Group (OMG) that supports model-driven engineering of software systems. MDA provides a set of guidelines for structuring specifications expressed as models. The MDA approach first defines system functionality using a platform-independent model (PIM) using an appropriate Domain Specific Language. Then, given a Platform Definition Model (PDM) corresponding to CORBA (common object request broker architecture), DotNet, the Web, etc., the PIM is translated to one or more platform-specific models (PSMs) that computers can run, using different Domain Specific Languages, or a General Purpose Language like Java, C++, Python, etc. Automated tools generally perform the translations between PIM and PSM. MDA principles can also apply to other areas such as business process modeling where the PIM is translated to either automated or manual processes. The MDA model is related to multiple standards, including the Unified Modeling Language (UML), the Meta-Object Facility (MOF), the XML Metadata interchange (XMI), Enterprise Distributed Object Computing (EDOC), the Software Process Engineering Metamodel (SPEM), and the Common Warehouse Metamodel (CWM). Note that the term "architecture" in Model-driven architecture does not refer to the architecture of the system being modeled, but rather to the architecture of the various standards and model forms that serve as the technology basis for MDA.

Metamodeling in computer science and related disciplines is the construction of a collection of "concepts" (things, terms, etc.) within a certain domain. A model is an abstraction of phenomena in the real world, and a metamodel is yet another abstraction, highlighting properties of the model itself. This model is said to conform to its metamodel like a program conforms to the grammar of the programming language in which it is written. Common uses for metamodels are:
   As a schema for semantic data that needs to be exchanged or stored
   As a language that supports a particular method or process
   As a language to express additional semantics of existing information Model—in the world of dynamic systems, modeling provides the foundation of how knowledge is captured and used. As a general definition, a model is a representation of something in, or intended for, the real-world; its purpose is to describe specific characteristics, behavior and relationships with sufficient accuracy that it is an acceptable representation of what it describes. In the context of dynamic systems a model is a machine-readable representation of the components comprising a system and the policies that govern the system: it provides sufficient detail for systems to adapt dynamically to changing conditions, and changes in business requirements, through intelligent automation of the management function. In the development of information technology solutions, models may be used to manage complexity and to communicate system requirements between business stakeholders, solution and system architects, developers, and operations personnel. Model systems are formed from a series of interconnected objects. The objects each represent a specific characteristic of the system, including the desired state of that characteristic, the range of states it is capable of being and what resources it needs. The interconnections between these objects describe the nature of the relationship between these characteristics. For example, one object may rely on the other in order to exist, in which case one object is hosting the other. Alternatively, one object may simply provide a service to the other and the two objects are peers. Reduced to its simplest form, a model can be illustrated as a series of boxes and lines. The boxes represent systems, subsystems and components. The lines in the model diagram represent different kinds of relationships. These lines might represent a hosting relationship, lines of communication, and also indicate dependencies. Each element in a model, a system or a relationship belongs to a class and has attributes, constraints and policies. When creating a model, the designer places and interconnects the elements and specifies the desired values for the attributes.

Model-driven business transformation—A model-driven business transformation utilizes a multi-layer model approach to link business and IT semantics. The upper layers of the model represent business semantics in the terms familiar to business executives, business managers and analysts such as key performance indicators (KPI), operational metrics, business processes, activities and governance. The lower layers of the model represent IT architecture comprising a wide range of services implemented in IT infrastructure such as service-oriented architecture. The vision of this multi-layer model is to enable IT solutions to accurately reflect and be driven by business intent. The key to this multi-layer model is that the layers are linked in meaningful ways, so changes in one layer can ripple through other layers. The representation and enforcement of the semantics of the different layers and also of the connections between the layers is essential to the model-driven approach. This approach provides a convergence of the business and IT models using a multi-layer model, which tightly couples the business and IT models.

MOF (Meta-Object Facility)—MOF is an Object Management Group (OMG) standard for Model Driven Engineering. MOF provides a metadata management framework, and a set of metadata services to enable the development and interoperability of model and metadata driven systems. Examples of systems that use MOF include modeling and development tools, data warehouse systems, metadata repositories, etc. MOF originated in the Unified Modeling Language (UML), and was created as a metamodeling architecture to define the UML. MOF is designed as a four-layered architecture. It provides a meta-meta model at the top layer, called the M3 layer. This M3-model is the language used by MOF to build metamodels, called M2-models. The most prominent example of a Layer 2 MOF model is the UML metamodel, the model that describes the UML itself. These M2-models describe elements of the M1-layer, and thus M1-models. These would be, for example, models written in UML. The last layer is the M0-layer or data layer. It is used to describe the real-world.

MVC (Model-view-controller)—MVC is an architectural pattern used in software engineering. In complex computer applications that present lots of data to the user, one often wishes to separate data (model) and user interface (UI) (view) concerns, so that changes to the user interface do not affect the data handling, and that the data can be reorganized without changing the user interface. The model-view-controller solves this problem by decoupling data access and business logic from data presentation and user interaction, by introducing an intermediate component: the controller. The MVC paradigm is a way of breaking an application, or even just a piece of an application's interface, into three parts: the model, the view, and the controller. MVC was originally developed to map the traditional input, processing, output roles into the graphical user interface (GUI) realm:

Input→Processing→Output
Controller→Model→View

The user input, the modeling of the external world, and the visual feedback to the user are separated and handled by model, viewport, and controller objects. The controller interprets mouse and keyboard inputs from the user and maps these user actions into commands that are sent to the model and/or viewport to effect the appropriate change. The model manages one or more data elements, responds to queries about its state, and responds to instructions to change state. The viewport manages a rectangular area of the display and is responsible for presenting data to the user through a combination of graphics and text.

Multi-attribute utility (MAU) models—MAU are mathematical tools for evaluating and comparing alternatives to assist in choosing among them. They are designed to answer the question, "Given the factors we care about, what's the best choice?" MAU models are based on the assumption that the desirability of a particular alternative depends on how well its attributes measure up against key evaluation factors. For example, if you are shopping for a new car, you will prefer one over another based on how well each one scores on the factors you think are important, such as price, reliability, safety ratings, fuel economy, and style. MAU models offer a structured way to weight, evaluate, and compare possible alternatives. They offer a quantifiable method for choosing among options. A MAU model can also be used to conduct sensitivity analysis to explore the consequences of changing the attributes, their weights, or the scores they receive. Since the model usually is embodied in a simple spreadsheet, it is possible to make any number of changes and review the results. For example, if it appears that some attribute is too important in determining the results, the weights can be adjusted to produce different overall scores and to see if those differences really matter to the final decision. MAU can be used to manage complex comparisons by converting the evaluation to a numerical score while still presenting the logic behind the score. One of the most useful benefits of using a MAU model is that it makes clear to all involved the basis on which the alternatives are being evaluated. This is particularly important in group decision-making situations in which many different points of view and decision alternatives have to be reviewed and taken into account. To be effective the MAU requires a group consensus on the attributes in the model and on the weights to be used to indicate their relative importance. However, it may be very difficult and time consuming, or even impossible to achieve consensus on very controversial decisions. MAU models can be applied in all kinds of decision situations and are often used in the technical and programmatic parts of procurement evaluations.

Normative model—A normative model is a generic model for different customers and systems. In the context of the current invention normative models for estimation support various ISVs and packaged software applications, various clients, evolving situations, and parameter externalization in ontology and autonomic configuration.

OWL (Web ontology language)—OWL is a language for defining and instantiating Web ontologies. An OWL ontology may include descriptions of classes, along with their related properties and instances. OWL is designed for use by applications that need to process the content of information instead of just presenting information to humans. It facilitates greater machine interpretability of Web content than that supported by XML, RDF, and RDF Schema (RDF-S) by providing additional vocabulary along with a formal semantics. OWL is seen as a major technology for the future implementation of a Semantic Web. It is playing an important role in an increasing number and range of applications, and is the focus of research into tools, reasoning techniques, formal foundations and language extensions. OWL was designed to provide a common way to process the semantic content of web information. It was developed to augment the facilities for expressing semantics (meaning) provided by XML, RDF, and RDF-S. Consequently, it may be considered an evolution of these web languages in terms of its ability to represent machine-interpretable semantic content on the web. Since OWL is based on XML, OWL information can be easily exchanged between different types of computers using different operating systems, and application languages. Because the language is intended to be read by computer applications, it is sometimes not considered to be human-readable, although this may be a tool issue. OWL is being used to create standards that provide a framework for asset management, enterprise integration, and data sharing on the Web.

PIM (platform-independent model)—PIM is a model of a software or business system that is independent of the specific technological platform used to implement it. A PIM exhibits a specified degree of platform independence so as to be suitable for use with a number of different platforms of similar type. Examples of platforms range from virtual machines, to programming languages, to deployment platforms, to applications, depending on the perspective of the modeler and application being modeled.

PSM (platform-specific model)—PSM is a model of a software or business system that is linked to a specific technological platform (e.g., a specific programming language, operating system, or database). Platform-specific models are indispensable for the actual implementation of a system. A PSM is a view of a system from the platform specific viewpoint. A PSM combines the specifications in the PIM with the details that specify how that system uses a particular type of platform.

RICEF (Reports, Interfaces, Conversion, Enhancements, and Forms)—RICEF is used to collectively indicate the application development in SAP configuration and installation projects. The amount and difficulty levels of these objects determine the level of application development efforts in such projects. More specifically, R—Reports: R refers report programming. Firstly classical report programming, WRITE statement; then it means ALV (Approved Vendor Lists) programming with either ALV function modules or ABAP (a programming language for SAP's Web application server) objects; I—Interfaces are ALE (Application Link Enabling)/IDOC (Intermediate Document) developments. Not only development, ABAP programming for IDOCs, also IDOC customization, management. C—Conversion: BDC (Batch Data Communication) programming, batch input function modules, BDCDATA structure, CALL TRANSACTION. Also conversion specifically refers to conversion programs for standard batch input programs. E—Enhancements are user-exits and the object oriented model of user-exits that is BADIs (Business Add-Ins). F—Forms are SAPscript forms, SAP script print programs, and SmartForms.

SAP (Systems Applications and Products)—SAP applications have the capability to manage financial, asset, and cost accounting, production operations and materials, personnel, plants, and archived documents in a client server environment. SAP is made up of individual, integrated software modules that perform various organizational system tasks. SAP applications are a product of the SAP Corporation based in Germany, and provide customers with the ability to interact with a common corporate database for a comprehensive range of applications. SAP is made up of individual, integrated software modules that perform various organizational system tasks.

SCM (supply chain management)—SCM is the oversight of materials, information, and finances as they move in a process from supplier to manufacturer to wholesaler to retailer to consumer. Supply chain management involves coordinating and integrating these flows both within and among companies. The ultimate goal of any effective supply chain management system is to reduce inventory (with the assumption that products are available when needed). Supply chain management flows can be divided into three main flows: product flow, information flow, and financial flow. The product flow includes the movement of goods from a supplier to a customer, as well as any customer returns or service needs. The information flow involves transmitting orders and updating the status of delivery. The financial flow consists of credit terms, payment schedules, and consignment and title ownership arrangements. There are two main types of SCM software: planning applications and execution applications. Planning applications use advanced algorithms to determine the best way to fill an order. Execution applications track the physical status of goods, the management of materials, and financial information involving all parties.

Semantics—Semantics refers to the aspects of meaning that are expressed in a language, code, or other form of representation. Semantics is contrasted with two other aspects of meaningful expression, namely, syntax, the construction of complex signs from simpler signs, and pragmatics, the practical use of signs by agents or communities of interpretation in particular circumstances and contexts. By the usual convention that calls a study or a theory by the name of its subject matter, semantics may also denote the theoretical study of meaning in systems of signs.

Semantic Web—The semantic web is an evolving extension of the World Wide Web in which web content can be expressed not only in natural language, but also in a form that can be understood, interpreted and used by software agents, thus permitting them to find, share and integrate information more easily.

UML (unified modeling language)—UML is a standardized specification language for object modeling. UML is a general-purpose modeling language that includes a graphical notation used to create an abstract model of a system, referred to as a UML model. UML is officially defined at the Object Management Group (OMG) by the UML metamodel, a Meta-Object Facility metamodel (MOF). Like other MOF-based specifications, the UML metamodel and UML models may be serialized in XMI. UML was designed to specify, visualize, construct, and document software-intensive systems. UML is not restricted to modeling software. UML is also used for business process modeling, systems engineering modeling, and representing organizational structures. UML possess the ability to model distributed systems using classes, relationships, inheritance, and composition.

Value drivers—Value drivers are key business parameters that capture business impact at a measurable metric level and are translated into business values. Generic value drivers include revenue growth, margin improvement, and increased capital efficiency, etc.

Value modeling—value modeling identifies and maps the enterprise's key business and IT value drivers, and links the drivers to the measurable business and financial benefits. The value model also helps tracking the performance and showing realized value during and after the IT implementation.

XMI (XML Metadata Interchange)—XMI is an OMG standard for exchanging metadata information via Extensible Markup Language (XML). XMI can be used for any metadata whose metamodel can be expressed in Meta-Object Facility (MOF). The most common use of XMI is as an interchange format for UML models, although it can also be used for serialization of models of other languages (metamodels). One purpose of XML Metadata Interchange (XMI) is to enable easy interchange of metadata between UML-based modeling tools and MOF-based metadata repositories in distributed heterogeneous environments. XMI is also commonly used as the medium by which models are passed from modeling tools to software generation tools as part of model-driven engineering. XMI integrates four industry standards:

XML—extensible Markup Language, a World Wide Web Consortium (W3C) standard.

UML—Unified Modeling Language, an OMG modeling standard.

MOF—Meta Object Facility, an OMG language for specifying metamodels.

MOF Mapping to XMI

The integration of these four standards into XMI allows tool developers of distributed systems to share object models and other metadata.

WBS (work breakdown structure)—A WBS is a list of tasks that, if completed, will produce the final product. The way the work is broken down dictates how it will be done. There are many ways to decompose a project into tasks. The project can be broken down by feature, by project phase (requirements tasks, design tasks, programming tasks, QA tasks, etc., or by some combination of the two. A Work Breakdown Structure is a fundamental project management technique for defining and organizing the total scope of a project, using a hierarchical tree structure. The first two levels of the WBS (the root node and Level 2) define a set of planned outcomes that collectively and exclusively represent 100% of the project scope. At each subsequent level, the children of a parent node collectively and exclusively represent 100% of the scope of their parent node. A well-designed WBS describes planned outcomes instead of planned actions. Outcomes are the desired ends of the project, and can be predicted accurately; actions comprise the project plan and may be difficult to predict accurately. A well-designed WBS makes it easy to assign any project activity to one and only one terminal element of the WBS.

SUMMARY OF THE INVENTION

Embodiments of the present invention include a method and system for scoring and ranking multi-dimensional project plans for packaged software applications, wherein the method includes: determining one or more dimensions for a project plan; assigning one or more attributes to each of the one or more dimensions; assigning a utility function to each of the one or more attributes; assigning weights to each of the one or more attributes; assigning one or more ordering factors to one or more combinations and permutations of the dimensions; calculating a series of scores for the one or more combinations and permutations of the dimensions; ranking the one or more combinations and permutations of the dimensions based on the calculated series of scores; and wherein each of the one or more combinations and permutations of the dimensions represents a different individual multi-dimensional project plan.

The method of embodiments of the present invention also include: a series of attribute values for the one or more attributes is inputted through a series of questionnaires; wherein the series of attribute values are assigned to the utility functions to determine a series of corresponding utility values; wherein the utility functions are at least one of the following: step functions, non-linear functions, and linear functions. In addition, the number of utility functions to be assigned is equal to the number of dimensions multiplied by the number of attributes, wherein the utility functions may be either a qualitative or quantitative measures.

Also included in methods of embodiments of the invention is the calculation of a series of scores for the one or more combinations and permutations of the dimensions is carried out with a project plan score estimator in signal communication with one or more estimation knowledge bases; wherein the project plan score estimator utilizes a mathematical model based on multi-attribute utility (MAU) theory with empirical data.

In embodiments of the present invention, the calculation of a score for a single-dimensional project plan is a weight average utility value across involved attributes multiplied by a single dimensional ordering factor; and wherein the calculation scales up the score comparable to those of multi-dimensional project plans.

In embodiments of the present invention, the calculation of a score for a multi-dimensional implementation project plan is the summation of the weight average utility value across involved attributes of each dimension, multiplied by ordering factors; wherein the calculation normalizes a resulting score comparable to resulting scores of other implementation project plans; and wherein the resulting scores reflect the effect of the orders of the involved dimensions.

In embodiments of the present invention, the ranked multi-dimensional plans are grouped according to a primary dimension; wherein the primary dimension is the first dimension listed in a given multi-dimensional plan; wherein the groupings are coded for visual identification; and wherein the coding comprises: colors, textures, shapes, and fonts. In addition, the grouping provides a visual indication of the consistency and validity of the scoring and ranking of the multi-dimensional project plans.

In embodiments of the present invention sensitivity analysis of the project plans may be conducted by changing attributes, attribute weighting, or attribute utility. In addition, a series of complete trees that show all combinations of multi-dimensional project plans are displayed to facilitate the adjustment of the multi-dimensional project plans.

In an embodiment of the present invention, the plan dimensions that are taken into account in structuring packaged application projects plans include geography by continent, country, business unit, and business scenario to form a combined total of twenty six single-dimensional, two-dimensional, and three-dimensional project plans; wherein geography by continent and country are never used together within an individual multi-dimensional project plan.

A system for scoring and ranking multi-dimensional project plans for implementing packaged software applications, the system includes: a view layer configured to act as a user interface for user inputs and system outputs; a model and control layer configured to implement rules based on a series of estimation and implementation models, and to perform calculations to determine scores for ranking multi-dimensional project plans; an estimation knowledge base layer configured to hold and derive the series of estimation and implementation models; and wherein the system for scoring and ranking multi-dimensional project plans for implementing packaged software applications is carried out over networks comprising: the Internet, intranets, local area networks (LAN), and wireless local area networks (WLAN).

In embodiments of the system of the present invention, the calculations to determine scores for ranking multi-dimensional project plans is carried out with one or more project plan score estimators; wherein the one or more project plan score estimators determines one or more dimensions for a project plan based on the series of estimation and implementation models; wherein the one or more project plan scorers assigns one or more attributes to each of the one or more dimensions; wherein the one or more project plan scorers assigns a utility function to each of the one or more attributes; wherein the one or more project plan scorers assigns weights to each of the one or more attributes; wherein the one or more project plan scorers assigns one or more ordering factors to one or more combinations and permutations of the dimensions; wherein the one or more project plan scorers assigns the attributes, the utility functions, the weights, and the ordering factors based the series of estimation and implementation models; wherein the one or more project plan scorers calculate a series of scores for one or more combinations and permutations of the dimensions; wherein the one or more project plan scorers rank the one or more combinations and permutations of the dimensions based on the calculated series of scores; and wherein each of the one or more combinations and permutations of the dimensions represents a different individual multi-dimensional project plan.

In embodiments of the system of the present invention, a series of attribute values for the one or more attributes are inputted through a series of questionnaires presented and answered in the view layer; wherein the one or more project plan scorers assign the attribute values to the utility functions to determine a series of corresponding utility values; wherein the utility functions are at least one of the following: step functions, non-linear functions, and linear functions; and wherein the utility functions may be either a qualitative or quantitative measures.

In embodiments of the system of the invention, the project plan score estimator utilizes a mathematical model based on multi-attribute utility (MAU) theory with empirical data to calculate the series of scores for the one or more combinations and permutations of the dimensions.

In embodiments of the system of the invention, calculating the series of scores for the one or more combinations and permutations of the dimensions further includes the following: the calculation of a score for a single-dimensional project plan that is a weight average utility value across involved attributes multiplied by a single dimensional ordering factor; wherein the single-dimensional calculation scales up the score comparable to those of multi-dimensional project plans; wherein the calculation of a score for a multi-dimensional implementation project plan is the summation of the weight average utility value across involved attributes of each dimension, multiplied by ordering factors; wherein the multi-dimensional calculation normalizes a resulting score comparable to resulting scores of other implementation project plans; and wherein the resulting scores reflect the effect of the orders of the involved dimensions.

In embodiments of the system of the invention, the ranked multi-dimensional plans are grouped according to a primary dimension; wherein the primary dimension is the first dimension listed in a given multi-dimensional plan; wherein the groupings are coded for visual identification; wherein the coding comprises: colors, textures, shapes, and fonts; wherein the grouping provides a visual indication of the consistency and validity of the scoring and ranking of the multi-dimensional project plans; wherein sensitivity analysis of the project plans may be conducted by changing attributes, attribute weighting, or attribute utility; and wherein a series of complete trees that show all combinations of multi-dimensional project plans are displayed in the view layer to facilitate the adjustment of the multi-dimensional project plans.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for scoring and ranking multi-dimensional project plans for implementing packaged software applications.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1F illustrates in list form the relationship between the user method of FIG. 1D and the system response of FIG. 1E according to an embodiment of the invention.

FIGS. 12A-12F illustrate various templates and user interfaces for establishing staffing levels and associated costs as aligned with multi-dimensional implementation plans for packaged software applications according to embodiments of the invention.

FIGS. 18A-18E illustrate interactive and graphical features of estimating financial benefits and financial reporting according to embodiments of the invention.

Figure 1A:
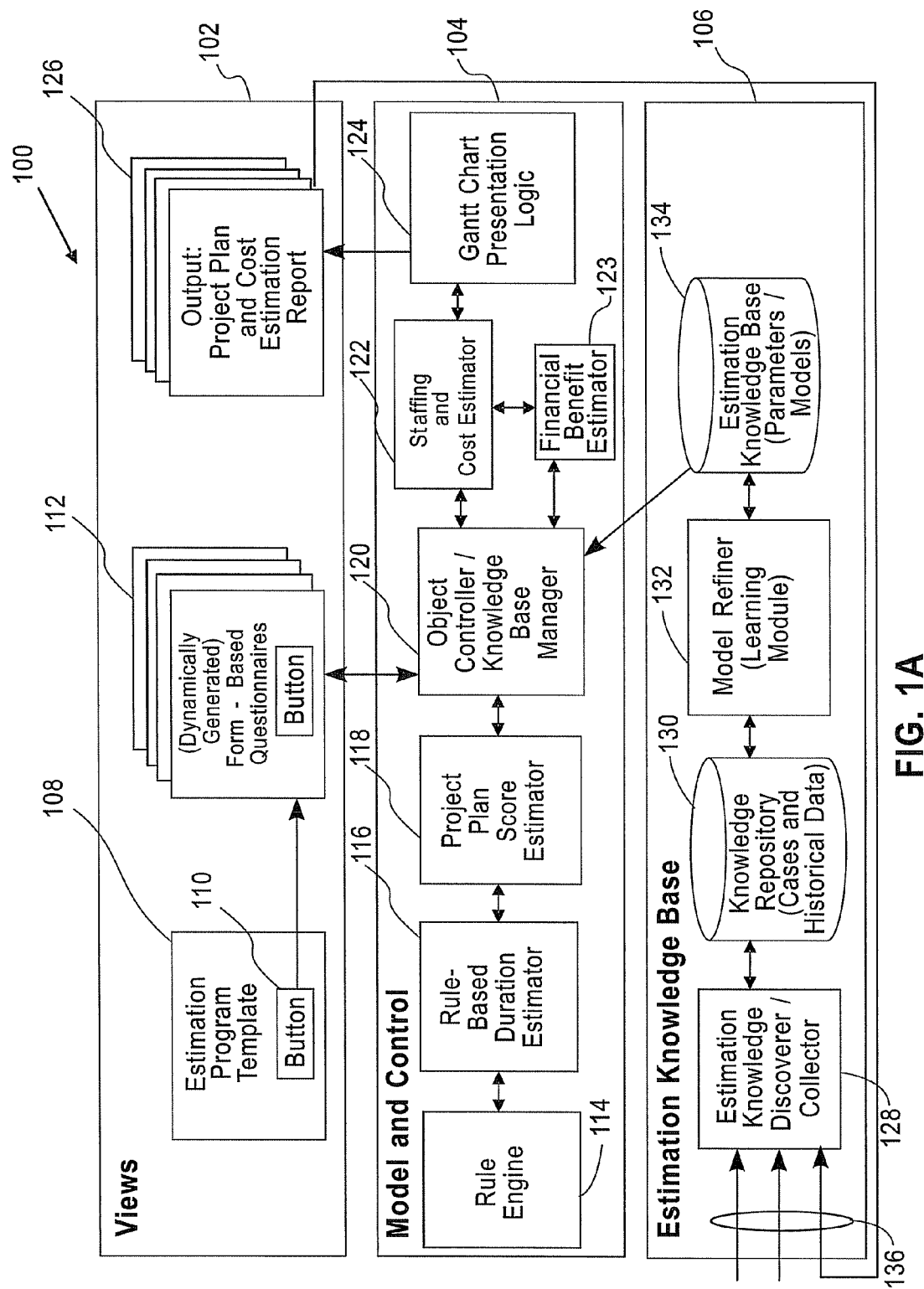
FIG. 1A is a schematic diagram of an estimation system architecture according to an embodiment of the invention.

The detailed description explains the preferred embodiments of the invention, together with advantages and features, by way of example with reference to the drawings.

DETAILED DESCRIPTION

Embodiments of the invention provide a method and system for estimating and generating implementation project plans for packaged software applications employing normative and constructive estimation models to determine and support decisions for estimated costs, estimated values, resource allocations, and project schedules. In particular, embodiments of the invention provide multi-dimensional implementation project plans, rule-based estimation of service project phase duration, utilization of an estimation knowledge base that externalizes estimation parameters, Gantt chart generation of multi-dimensional implementation project plans, and overlapping, grouping, and clustering of rollouts in project plans.

Through the use of embodiments of the invention, accurate cost, value, and schedule estimates for configuring and installing packaged software applications produced by independent software vendors can be obtained. Embodiments of the invention enable users to easily recalibrate, tailor, or extend the present invention's model and method to better fit their unique situations, by providing easy-to-understand definitions of the model's inputs, outputs, and assumptions. The openness of the constructive models provided by embodiments of the invention assist users to better understand the complexities of the information technology (IT) job to be carried out, and permits the user to know exactly why the model gives the estimate it does. Embodiments of the invention also provide normative models, which are applicable to various packaged application service projects from independent software vendors, and also to IT projects and customers with different situations. Embodiments of the invention also have the ability to evolve models it provides, as IT methods, systems, and customers evolve. Embodiments of the invention assist users to achieve consistent global delivery and usage of band-mixes, while decreasing the occurrences of delivery excellence problems. By improving the quality of estimates furnished by packaged application implementation/configuration services, as provided by embodiments of the invention, the potential new business win percentages by independent software vendors can be enhanced on a global basis.

In addition, embodiments of the invention also provide various decision support and business case analysis capabilities. Decision support and business case analysis capabilities include ROI analysis, and making investment or other financial decisions involving an IT service effort. Embodiments of the invention set project budgets and schedules as a basis for planning and control, as well as, negotiating tradeoffs among cost, schedule, functionality, performance, or quality factors. Additionally, embodiments of the invention support IT cost and schedule risk management decisions, and decide on which parts of the IT system to develop, reuse, lease, or purchase. Embodiments of the invention also support legacy software inventory decisions: what parts to modify, phase out, outsource, etc., and assists in setting mixed investment strategies to improve customer's software capability, via reuse, tools, process maturity, outsourcing, etc. Finally, embodiments of the invention support decisions on how to implement process improvement strategies.

FIG. 1A is a schematic diagram of an estimation system architecture 100 according to an embodiment of the invention. The estimation system 100 utilizes Model-view-controller (MVC) (blocks 102, 104). MVC is an architectural pattern used in software engineering. In complex computer applications that present lots of data to users, it is often advantageous to separate data (model) and user interface (UI) (view) concerns, so that changes to the user interface do not impact the data handling, and that the data can be reorganized without changing the user interface. The model-view-controller solves this problem by decoupling data access and business logic from data presentation and user interaction, by introducing an intermediate component: the controller. It is common to split an application into separate layers: presentation (UI), domain, and data access. In MVC the presentation layer is further separated into View and Controller. MVC encompasses more of the architecture of an application than is typical for a design pattern.

The model portion of the MVC architecture is the domain-specific representation of the information on which the application operates. However, it is a common misconception that the model is another name for the domain layer. Domain logic adds meaning to raw data (e.g., calculating if today is the user's birthday, or the totals, taxes and shipping charges for shopping cart items). Many applications use a persistent storage mechanism (such as a database) to store data. MVC does not specifically mention the data access layer because it is understood to be underneath or encapsulated by the Model. View renders the model into a form suitable for interaction, typically a user interface element. MVC is often seen in web applications, where the view is the HTML page and the code, which gathers dynamic data for the page. The controller processes and responds to events, typically user actions, and may invoke changes on the model.

In an estimation system 100 of an embodiment of the invention, the user starts the operation through the estimation program template 108, which is dynamically formed by using a template based on a business product software program such as spreadsheet, word processor, presentation, and project planning applications. The business product software provides the basic user interface and functions. In addition, the estimation system 100 adds features specific to estimation of packed software implementation projects. The user can access the estimation features by using a software widget on the business product software such as a button 110. In an embodiment, when the user initiates the estimation operation, the estimation system 100 renders a series of forms 112 in a pop-up window on top of the business product software program.

The pop-up window shows a number of form-based questionnaires (FIGS. 2A-2F) where the user provides input for the project estimation. Also, the window provides a number of widgets, which the user can use to execute the estimation models of the model component 104 such as, the rule engine 114, rule-based duration estimation 116, the multi-dimensional plan scoring estimation 118, the staffing and cost estimator 122, financial benefit estimator 123, and the Gantt chart presentation logic engine 124. Content is dynamically generated for the form-based questionnaire (112, FIGS. 2A-2F) by loading up information externalized in the estimation knowledge base 106.

The view component 102 of embodiments of the invention provide the outputs of the estimation system 100, in the form of a project plan and cost estimation report 126, usually in the form of charts and tables including Gantt charts. The reports are generated by the presentation logic model 124 of the estimation system 100 are rendered in the aforementioned business product software applications.

The rule engine 114 supports the rule-based estimation of project phase durations. The rule engine 114 forms a business rules engine, which is a software system that helps manage and automate business rules. The business rules an enterprise follows may come from legal regulation, company policy or other sources. In the estimation systems, rules are used to represents logic for calculating project phase durations. The rule engine 114, among other functions, may help to register, classify and manage all these rules; verify consistency of formal rules; and infer some rules based on other rules. Rules can also be used to detect business situations of interest to the user automatically.

The model component 104 also contains the object controller 120. The object controller 120 manages the objects stored in the estimation knowledge base 134, loads up the objects and renders them in the view component 102 of the estimation system 100, and stores input from the users coming through the view component 102 into the estimation knowledge base 106. The estimation knowledge base 106 is an additional component to the MVC architecture of the estimation system 100. The estimation knowledge base 106 externalizes knowledge and information parameters related to the project estimation, and facilitates the updating of parameter values that are used by the estimation models. Within the estimation knowledge base 106 is an estimation knowledge discoverer and collector 128, which connects to various sources 136 (including empirical data from the project plan and cost estimation report 126, historical and empirical data—internal cases prior to and after implementation of embodiments of the present invention, and data from external sources,—the Web (Internet), packaged application software vendors (ISV), information from existing installations—data mining (crawler)), and collects knowledge and information relevant to estimation, including historical data of prior estimation cases contained within a knowledge repository 130. The collected knowledge and data is culled and analyzed by a model refiner 132. If validated, certain knowledge (in the form of rules and ontology) is learned by the model refiner 132, which, in turn, conveys the newly found knowledge to the estimation models as parameters that are represented in the estimation knowledge base 106.

Figure 1B:
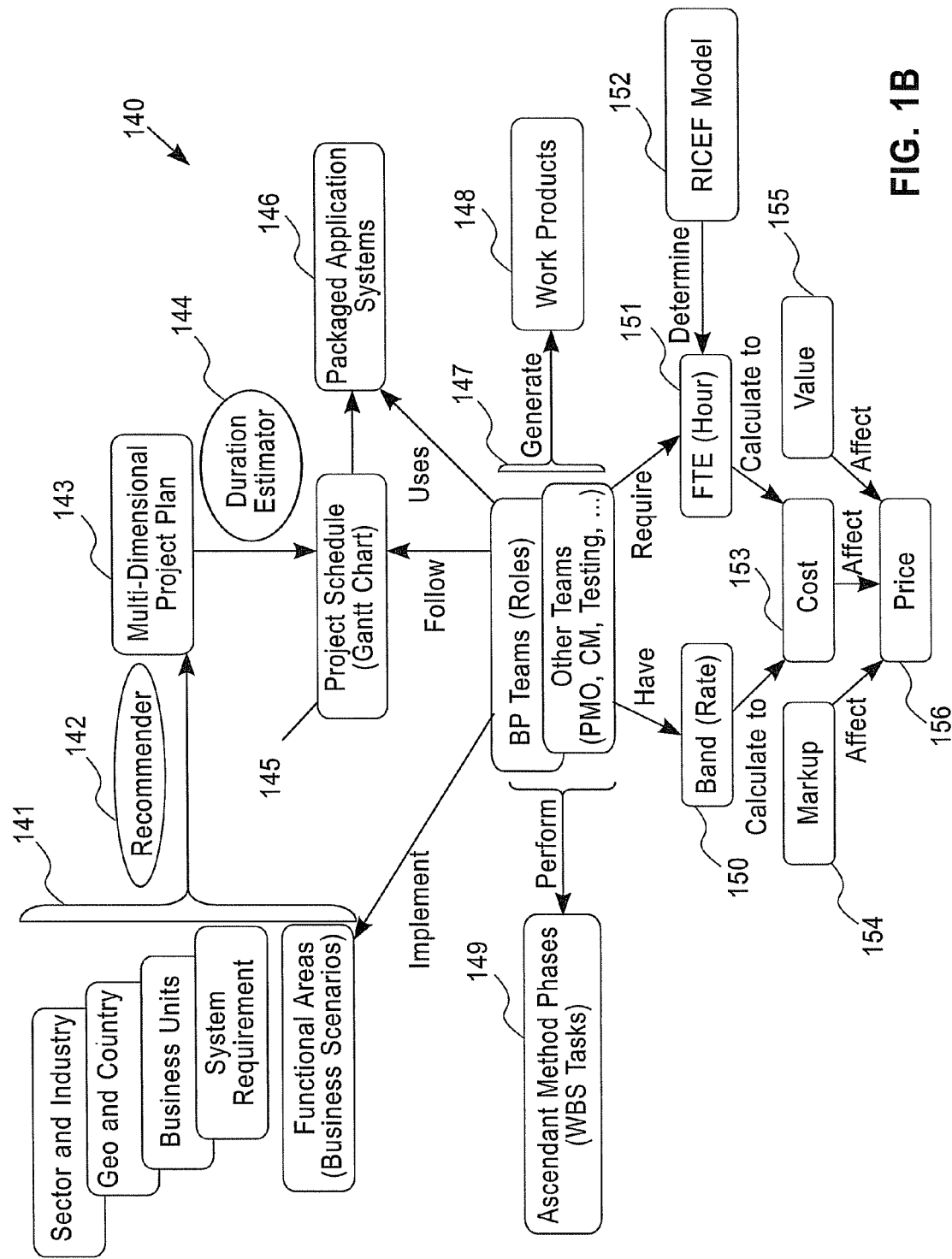
FIG. 1B is a schematic diagram of a data estimation model that employs an estimation system architecture according to an embodiment of the invention.

FIG. 1B is a schematic diagram of a data estimation model 150 that employs the estimation system 100 of FIG. 1A according to an embodiment of the invention. The inputs 152 are gathered from the form-based questionnaires (112, FIGS. 2A-2F) that are answered or filled in by the business process (BP) teams 164 that perform specific roles or functions. Examples of other teams and groups that may supply inputs include project management office (PMO), application development, technology infrastructure, change management, testing, training, marketing, etc. The inputs are processed by the estimation system 100, and symbolized in FIG. 1B by the recommender 154 to provide a multi-dimensional project plan 156. The duration estimator 116 (symbolized by block 158 in FIG. 1B) furnishes a project schedule 160, which may be in the form of a Gantt chart) in concert with packaged application systems 162 employed by the business process teams 164. The business process teams 164 perform ascendant method phases (work breakdown structure (WBS)) 168 to generate the work products 166. A WBS is a list of tasks that, if completed, will produce the final product. Supplying the data estimation models with the worker cost rate (cost/FTE)/band (rate) 170, and the FTE 172 (Full-time equivalent is a way to measure a worker's productivity and/or involvement in a project) allows the calculation of the cost 176 of the project. The FTE 172 is determined by an RICEF (Reports, Interfaces, Conversion, Enhancements, and forms) model 170. The organization employing the estimation model 150 applies a markup 178 and value or return factor 180 to determine a price 182 for the product or service to be sold.

FIGS. 2A-2F are examples of dynamically generated form-based questionnaires 112 according to an embodiment of the invention. The form-based questionnaires 112 provide a means for user inputs in the project estimation process, and are dynamically rendered by the estimation system 100 by using the information loaded from the estimation knowledge base 106. The form-based questionnaires 112 can be customized and configured through the knowledge base 106 to support various estimation scenarios. A number of dimensions may be involved in the definition of an estimation scenario. In an embodiment of the packaged application project estimation system 100, there can be four dimensions—the sector and industry dimension; the geography and country dimension; the business unit dimension; and the business scenario dimension.

Figure 2A:
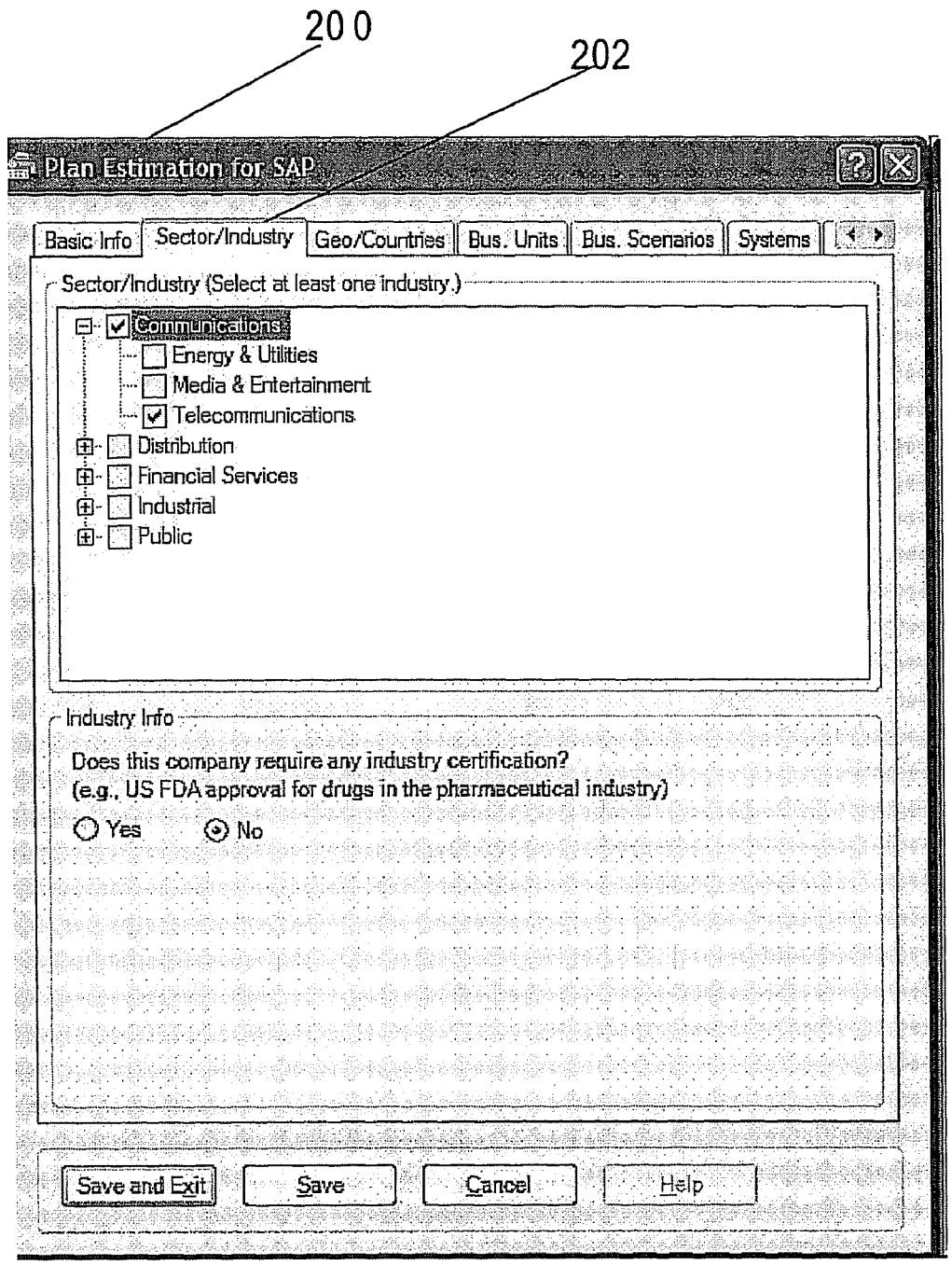
FIGS. 2A-2F are examples of dynamically generated form-based questionnaires according to an embodiment of the invention.

FIG. 2A illustrates a user interface plan estimation form-based questionnaire 200 with the sector and industry tab 202 selected. The user can select one or more sectors and industries that will be taken into account in the present packaged application project to be estimated. The sector and industry takes a hierarchical form. A basic hierarchy is stored in the estimation knowledge base 134 and loaded up to the user interface through the object controller 120. The sector and industry hierarchy may be updated through the estimation knowledge base 134, and the updated map can be dynamically loaded up to the user view 102. Additionally, in this form 200, one or more questions related to the sector and industry may be presented to the user for input.

Figure 2B:
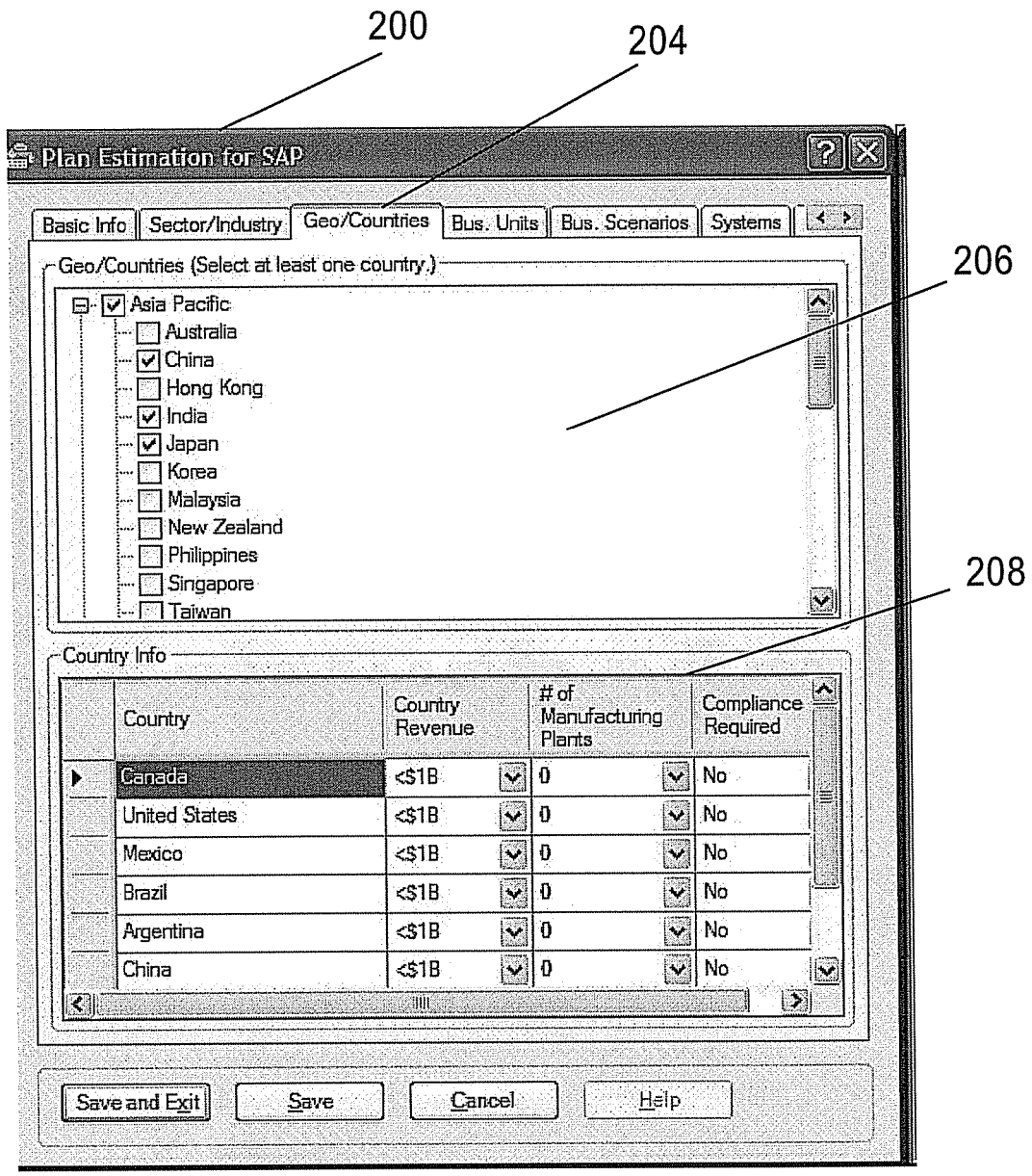

In FIG. 2B plan estimation form-based questionnaire 200 has the geography and country tab 204 selected. With the geography and country tab 204 selected, the user can select one or more continents and countries 206 that will be taken into account in the present packaged application project to be estimated. The geography and country takes a hierarchical form. A basic hierarchy is stored in the estimation knowledge base 134 and loaded up to the user interface through the object controller 120. The geography and country may be updated through the estimation knowledge base 134, and an updated map can be dynamically loaded up to the user view 102. Additionally, in this form, one or more attributes 208 of the selected continents and countries can be specified. The attribute values 208 such as the revenue by country, the number of manufacturing plants in each selected country, and any compliance requirement by country are presented to the user for possible selection. The user selected attribute value parameters are taken into account in the estimation models for calculating schedule, phase duration, scoring, cost, and/or value of the project.

Figure 2C:
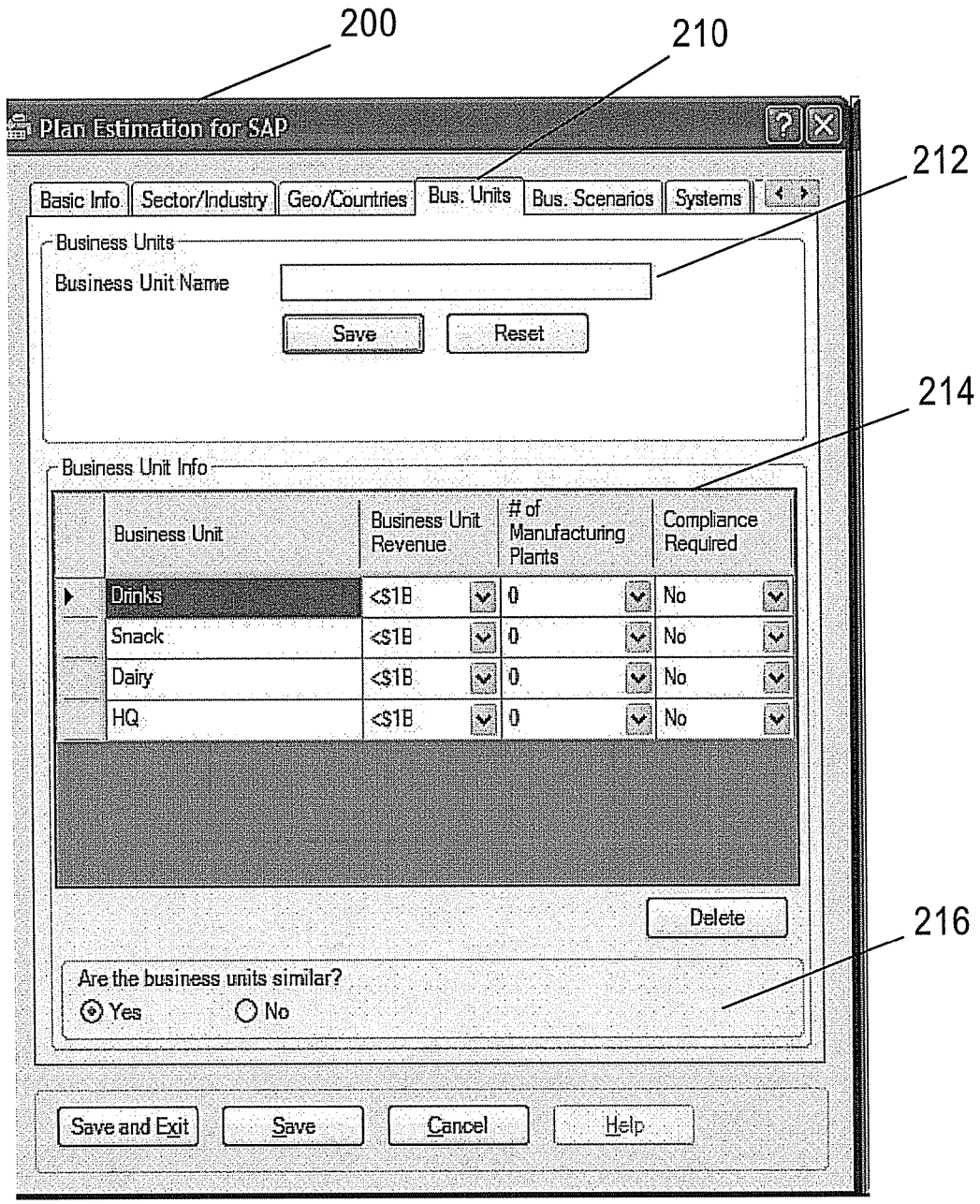

A plan estimation form-based questionnaire 200 with the business unit tab 210 selected is illustrated in FIG. 2C. With the business unit tab selected 210, the user can enter in box 212 one or more business units that will be taken into account in the present packaged application project to be estimated. In addition, in the business unit version of the plan estimation form-based questionnaire 200, one or more attributes 214 of the entered business units (in box 212) may be specified. The attribute values 214 as the revenue by unit, the number of manufacturing plants in each selected unit, and any compliance requirement by unit are presented to the user for possible selection. The user selected attribute value parameters are taken into account in the estimation models for calculating schedule, phase duration, scoring, cost, and/or value of the project. Additionally, a series of questions 216 related to the business unit may be asked. The example question shown— Are the business units similar?—may have a direct affect on the duration of the project plan, and the estimation provided. If the business units in the plan implementation are similar, the project duration may potentially be shorter.

Figure 2D:
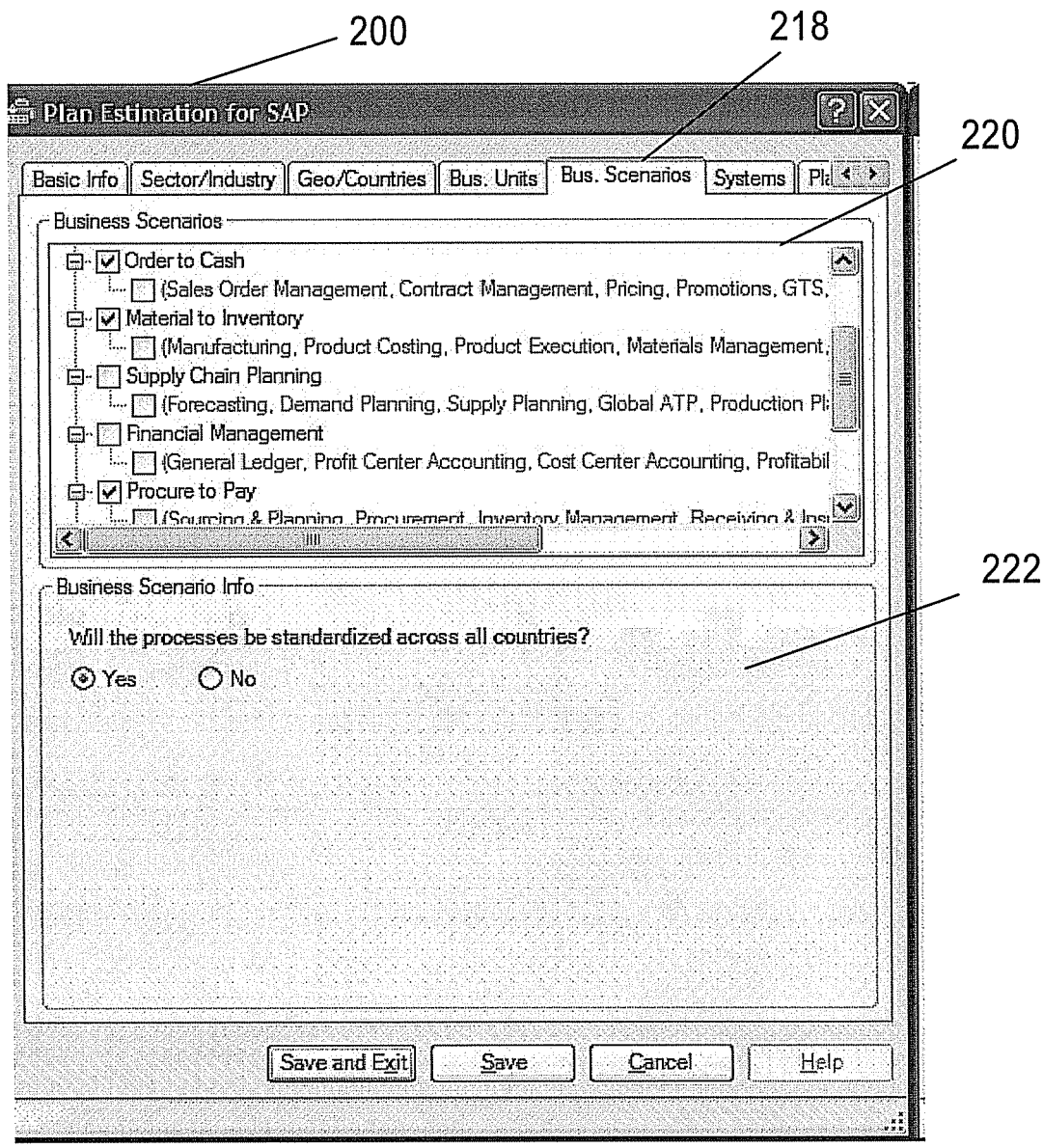

A plan estimation form-based questionnaire 200 with the business scenario tab 216 selected is illustrated in FIG. 2D. With the business scenario tab 218 selected, the user can select one or more business scenarios and processes 220 that will be taken into account in the present packaged application project to be estimated. The business scenarios and processes 220 may take a hierarchical form. A basic hierarchy is stored in the estimation knowledge base 134 and loaded up to the user interface 102 through the object controller 120. The business scenario and process 220 hierarchy may be updated through the estimation knowledge base 134, and the updated map can be dynamically loaded up to the user view 102. Additionally, in this form, one or more questions 222 related to the business scenario and process may be presented to the user for input. The example question shown—Will the process be standardized across all countries?—may have a direct affect on the duration of the project plan, and the estimation provided. If the processes in the plan implementation are standardized across all countries, the project duration may potentially be shorter.

Figure 2E:
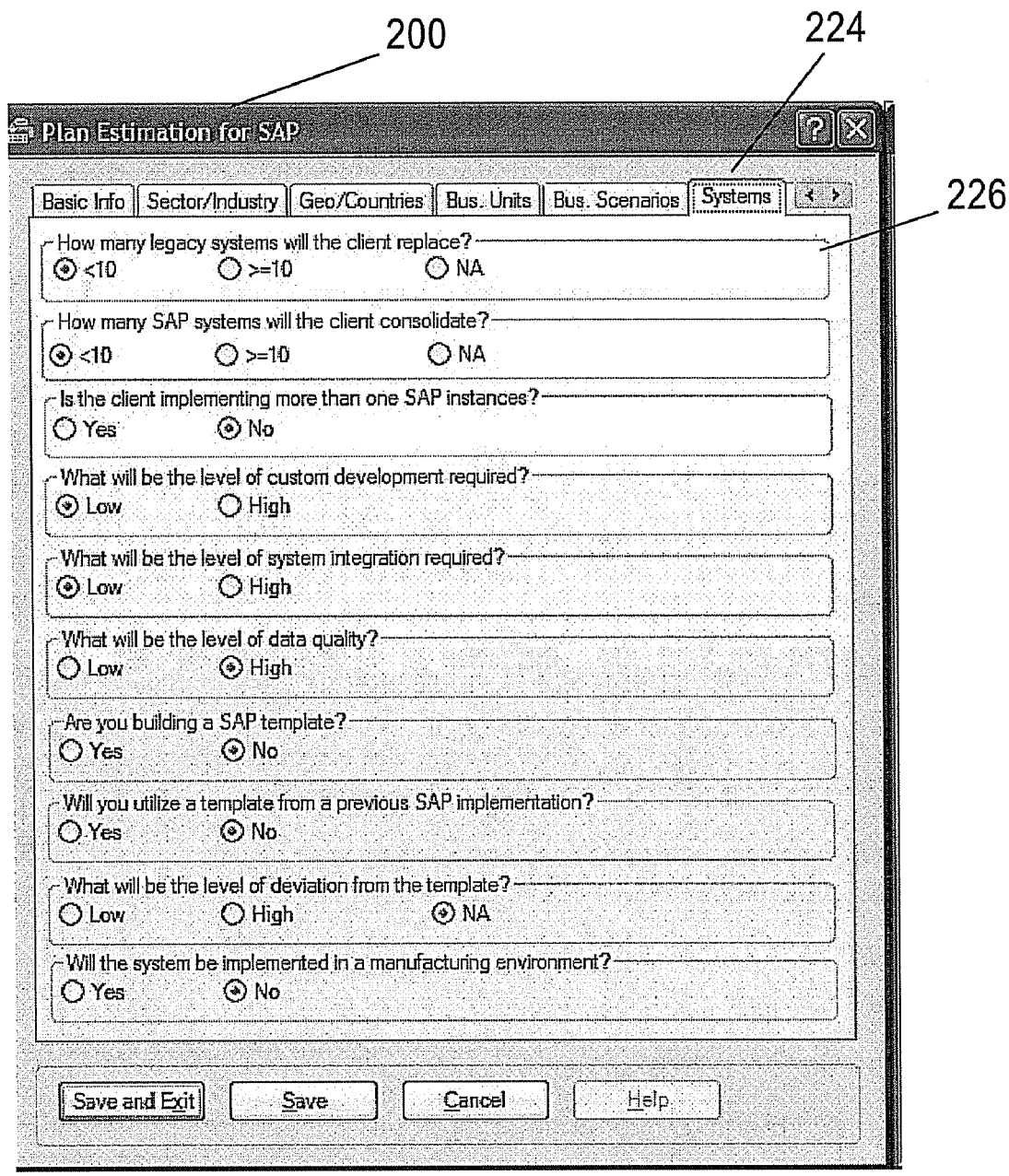

The user may provide system details when the system tab 224 is selected on the plan estimation form-based questionnaire 200 as seen in FIG. 2E. The user can provide answers to various system detail questions 226 that will be taken into account in the present packaged application project to be estimated. Additionally, in this form, one or more attributes of the entered business units can be specified, such as the number of legacy system that will be replaced by the project, the number of SAP systems that will be consolidated by the project, the number of SAP instances to be implemented in the project, the level of custom development; the level of system integration; the level of data quality, if a SAP template will be built in the project, if there is a template existing for use, if so, the level of the deviation from the template, and if the implementation will be in a manufacturing environment. These parameters are taken into account in the estimation models for calculating schedule, phase duration, scoring, cost, and/or value of the project.

Figure 2F:
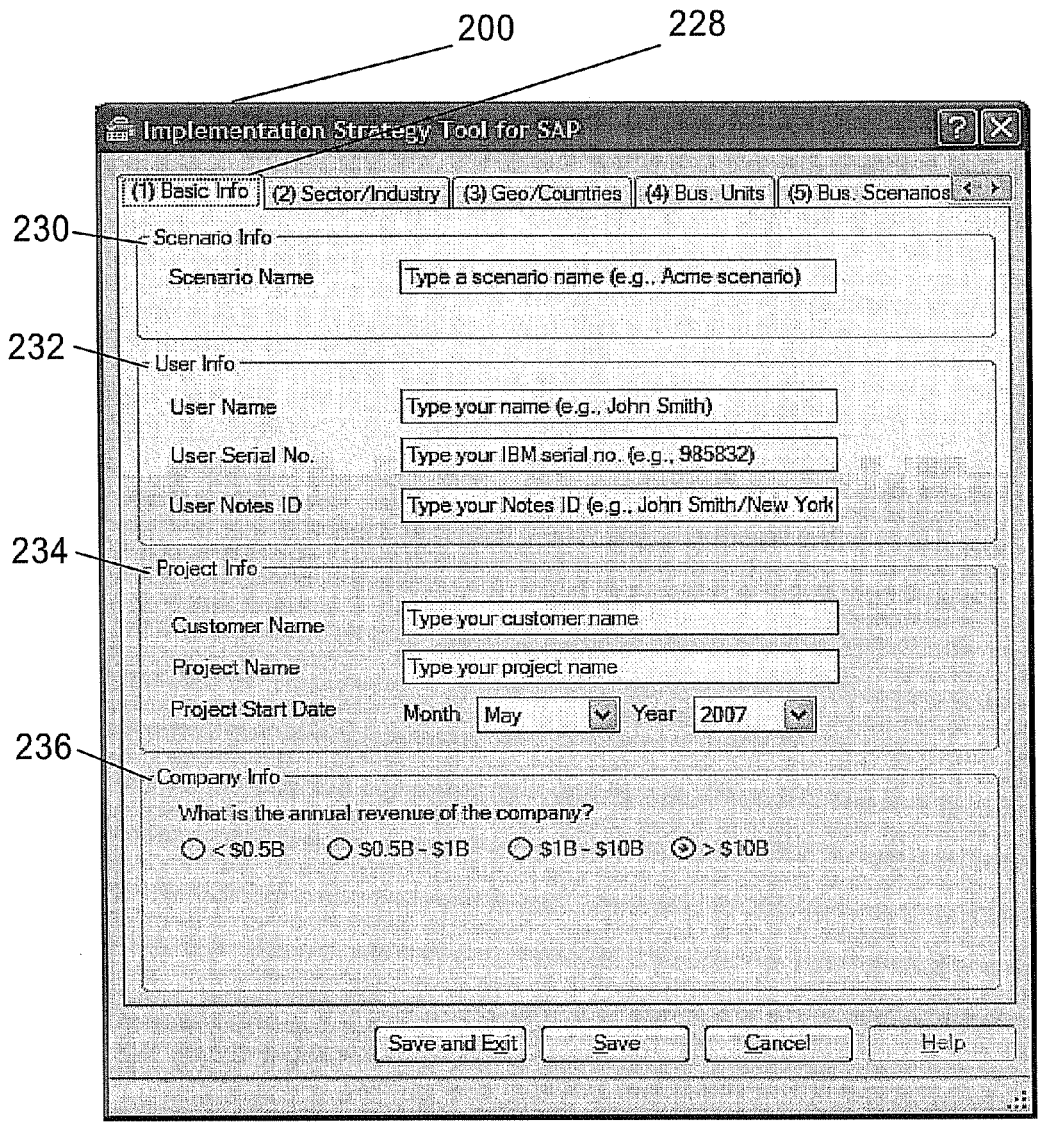

The user may provide basic information when the basic information tab 228 is selected on the plan estimation form-based questionnaire 200 as seen in FIG. 2F. The basic information provided includes the name of the scenario that is entered in area 230; user information including, for example, the name of the individual utilizing the estimation system 100, and user identification information that is entered in area 232; project information including, for example, customer name (the company for whom the implementation project plans are being generated for), project name, project start date, number of end users that is entered in area 234; and company (customer) information, for example, financial profiles to determine the scope and budget for the project implementation that is entered in area 236.

Figure 3:
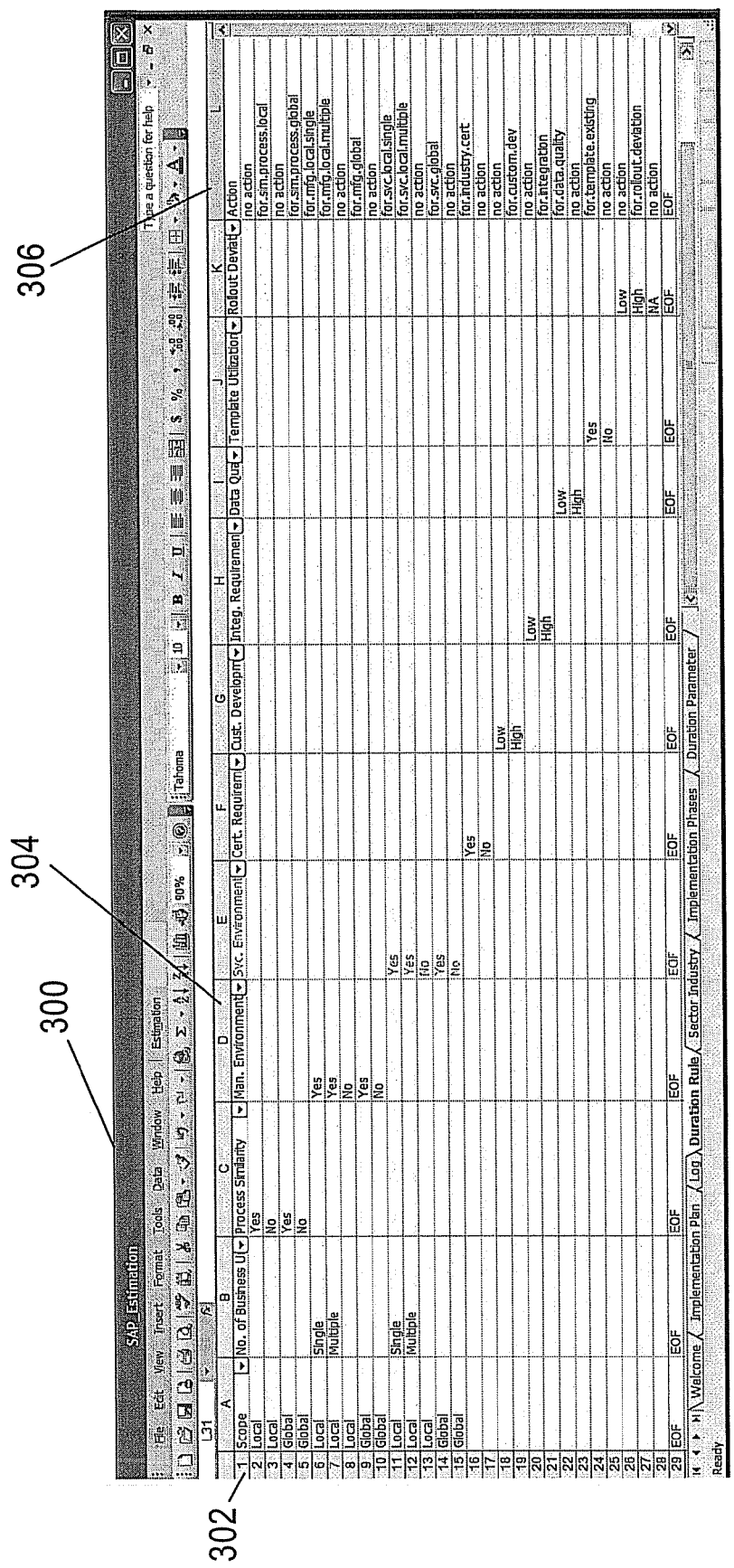
FIG. 3 illustrates a table of rules for estimating phase duration in spreadsheet form, which are externalized in the estimation knowledge base according to an embodiment of the invention.

FIG. 3 illustrates a table 300 in spreadsheet form that shows several rules, which are externalized in the estimation knowledge base 134, for estimating phase duration of project phases in a packaged software application. In the table 300, each row 302 represents a single rule, and each column 304 represents a condition. In the table, each value in the grid represents the value that makes the condition true. The last column in the table, column L (306), represents an action, which will be taken when the condition of the rule is satisfied. The actions are basically adjustment of the duration of one or more phases in the implementation plan. The details of the phase adjustment are also externalized in the estimation knowledge base, and are shown in a user interface (see FIG. 8).

In the estimation system 100, the estimation rules may be configured through the estimation knowledge base 134. The knowledge base manager 120 loads the rule data set up from the estimation knowledge base 134 to the rule-based duration estimator 116. During an estimation session, the user enters various input data for estimation through the form-based questionnaires 112. The rule-based duration estimator 116 takes the input data one by one, applying it to the rule set, executing it in one or more rules in the set by using the rule engine 114, finding one or more actions given by the rule set, and accordingly adjusting one or more project phase durations. At the end of the estimation session, the current phase duration is the final estimated phase duration and is presented in the estimation report in the form of Gantt chart and other formats by the presentation logic 124.

Figure 4:
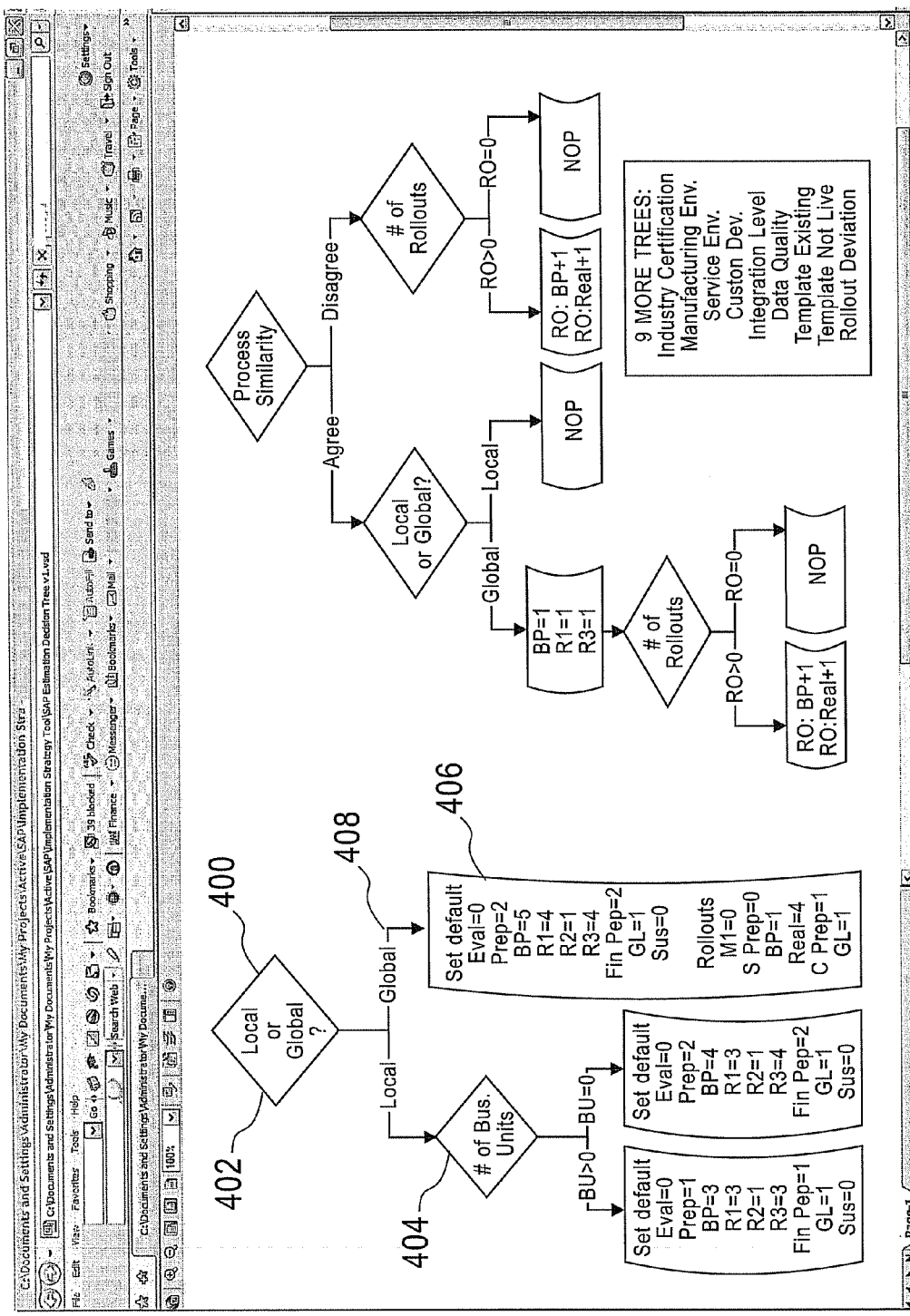
FIG. 4 illustrates decision trees (or forests) that are an abstract representation of the rule set for the phase duration calculation according to an embodiment of the invention.
Figure 8:
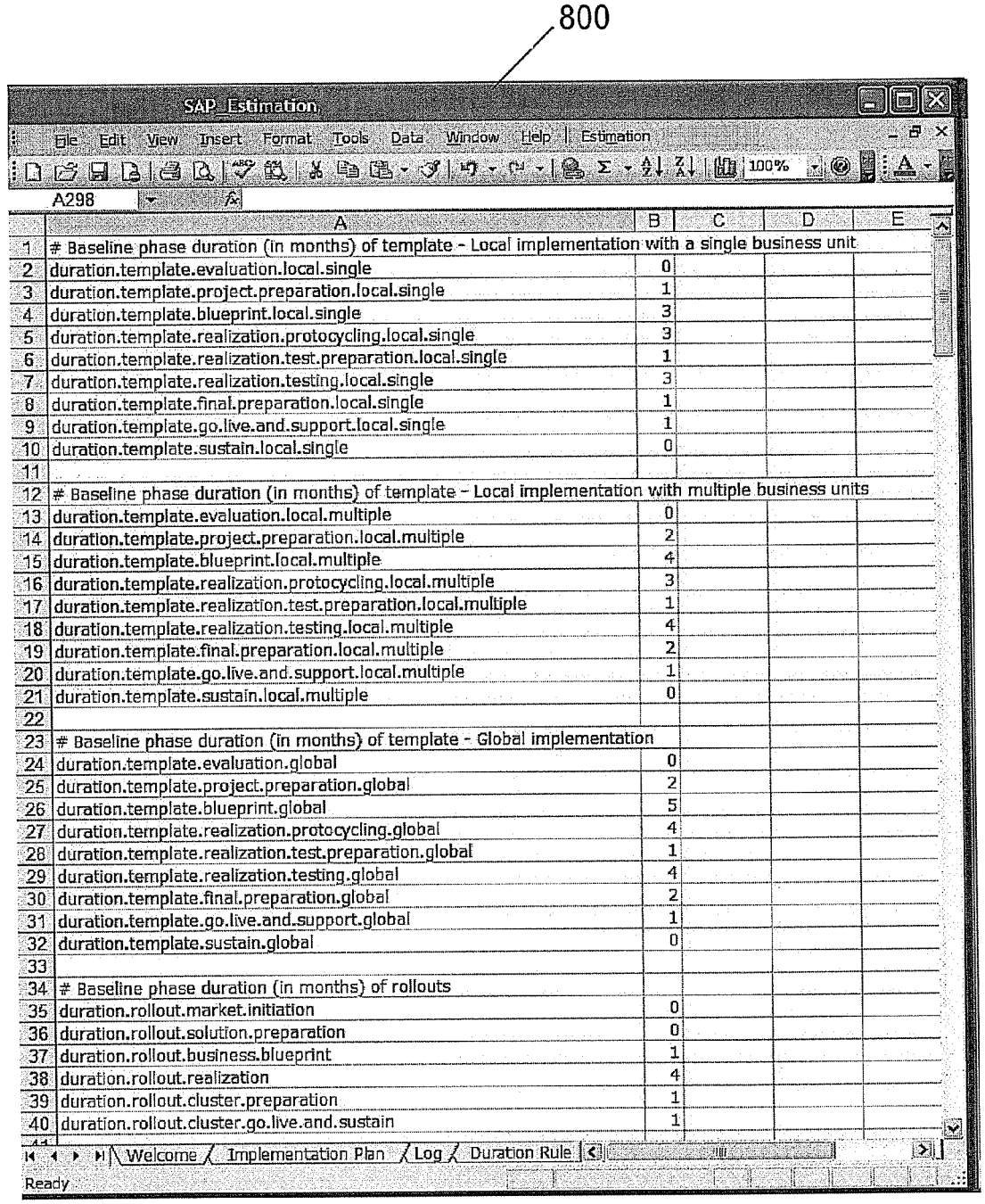
FIG. 8 shows the externalization of duration parameters according to an embodiment of the invention.

FIG. 4 illustrates decision trees (or forests) that are an abstract representation of the rule set for the phase duration calculation for an embodiment of the invention. A decision tree is a decision support tool that uses a graph or model of decisions and their possible consequences. A decision tree is used to identify the strategy (in our case, a phase duration adjustment action) most likely to reach a goal (in our case, an estimated phase duration). The roots 400 of the trees represent one or more starting points of the phase duration calculation. They are given the initial values 402, which are also specified in a set of duration parameters as illustrated in FIG. 8 in the estimation knowledge base 134. Other nodes in the trees represent either conditions 404 of the estimation rule set that is shown in FIG. 3 or actions 406 to be taken when the condition is met, which is also specified in the rule set in FIG. 3. A path 408 of the root to a leaf node represents a sequence of conditions to reach a phase duration adjustment action. The rule-based duration estimator 116 implements the decision trees in software code.

Embodiments of the invention provide clients with the ability to derive multi-dimensional implementation project plans for packaged application projects. The multi-dimensional implementation project plans enable flexible and cost-effective implementation of packaged applications aligned to business strategies and environments of the client. In embodiments of the invention, the basic dimensions that are taken into account in structuring packaged application implementation projects include sector and industry, geography and country, business unit, and business scenario, which were described in the questionnaires in the user interface (FIGS. 2A-2F). By combining these dimensions, the estimation system 100 provides a plurality of multi-dimensional implementation project plans. In the example embodiment illustrating the invention, there are 26 implementation project plans that are to be considered, since the additional possible combinations are not suitable in terms of project cost and project duration in SAP implementation project plans.

Figure 5A:
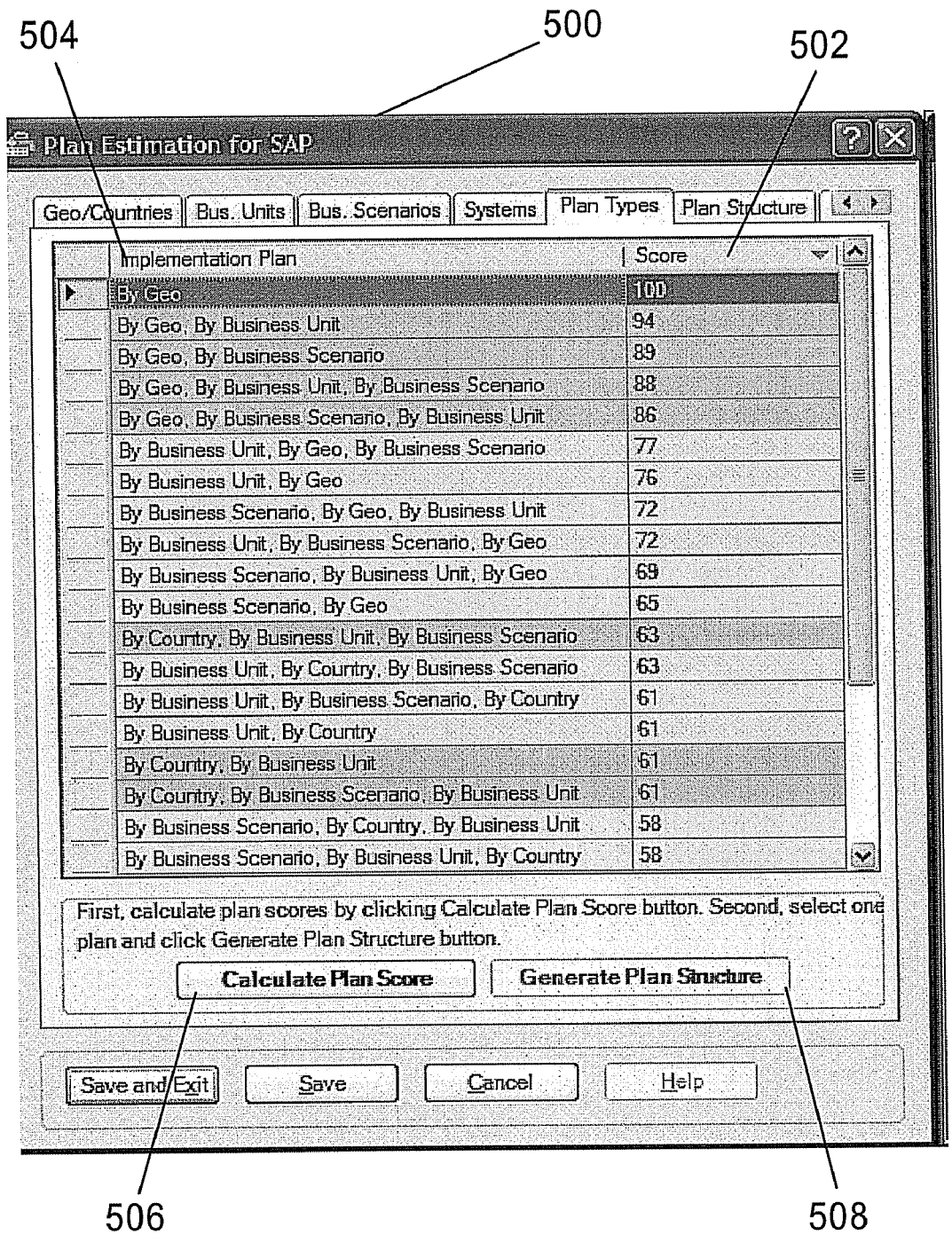
FIG. 5A illustrates a user interface list of multi-dimensional implementation plans according to an embodiment of the invention.

A list of multi-dimensional implementation plans (26 combinations) is shown in the user interface of FIG. 5A according to an embodiment of the invention. Some of the plans are single-dimensional (e.g., By Geography, By Country, By Business Unit, and By Business Scenario). Others are 2-dimensional (By Geo-By Business Unit, By Geo-By Business Scenario, By Country-By Business Unit, and By Country-By Business Scenario). Yet others are 3-dimensional (By Geo-By Business Unit-By Business Scenario, By Geo-By Business Unit-By Business Scenario, By Country-By Business Unit-By Business Scenario, and By Country-By Business Scenario-By Business Unit). Table 1 presents a list of possible one, two, and three dimensional project plans according to an embodiment of the invention. It should be noted that the sector and industry dimension is not used in the multi-dimensional project plans, and that Geo and country are not used together. If a country is deemed important based on a user selected threshold, such as unit volume, or revenue, then country would be used instead of Geo (continent—a collection of countries within an area). Based on the user input collected from the form-based questionnaires 112, the project estimation system 100 can calculate and present the scores of each of the multi-dimensional implementation plans in a table or form 500 as shown in the user interface of FIG. 5A.

TABLE 1

| | |
|---|---|
| Single-Dimensional Project Plans | By Geo<br>By Country<br>By Business Unit<br>By Business Scenario |
| Two-Dimensional Project Plans | By Geo, By Business Unit<br>By Geo, By Business Scenario<br>By Country, By Business Unit<br>By Country, By Business Scenario<br>By Business Unit, By Geo<br>By Business Unit, By Country<br>By Business Unit, By Business Scenario<br>By Business Scenario, By Geo<br>By Business Scenario, By Country<br>By Business Scenario, By Business Unit |
| Three-Dimensional Project Plans | By Geo, By Business Unit, By Business Scenario<br>By Geo, By Business Scenario, By Business Unit<br>By Country, By Business Unit, By Business Scenario<br>By Country, By Business Scenario, By Business Unit<br>By Business Unit, By Geo, By Business Scenario<br>By Business Unit, By Country, By Business Scenario<br>By Business Unit, By Business Scenario, By Geo<br>By Business Unit, By Business Scenario, By Country<br>By Business Scenario, By Geo, By Business Unit<br>By Business Scenario, By Country, By Business Unit<br>By Business Scenario, By Business Unit, By Geo<br>By Business Scenario, By Business Unit, By Country |

The calculation of the scores 502 for each of the multi-dimensional implementation plans 504 utilizes a mathematical model based on multi-attribute utility theory (MAU) with empirical data. Table 2 is an example of weightings assigned to attributes for the determination of scores for the multi-dimensional implementation plans 504. In the example, Geos (continents) are given a greater weighting than individual countries, since Geos already include the individual countries.

TABLE 2

| Attribute | Weight |
|---|---|
| Number of Geos (Continents) | 100 |
| Number of Countries | 25 |
| Number of Business Units | 50 |
| Number of Manufacturing Plants | 75 |

TABLE 2-continued

| Attribute | Weight |
|---|---|
| Maximum Country Revenue | 100 |
| Maximum Business Unit Revenue | 75 |
| Business Unit Similarity Level | 50 |
| Business Process Standardization Level | 75 |

Figure 5B:
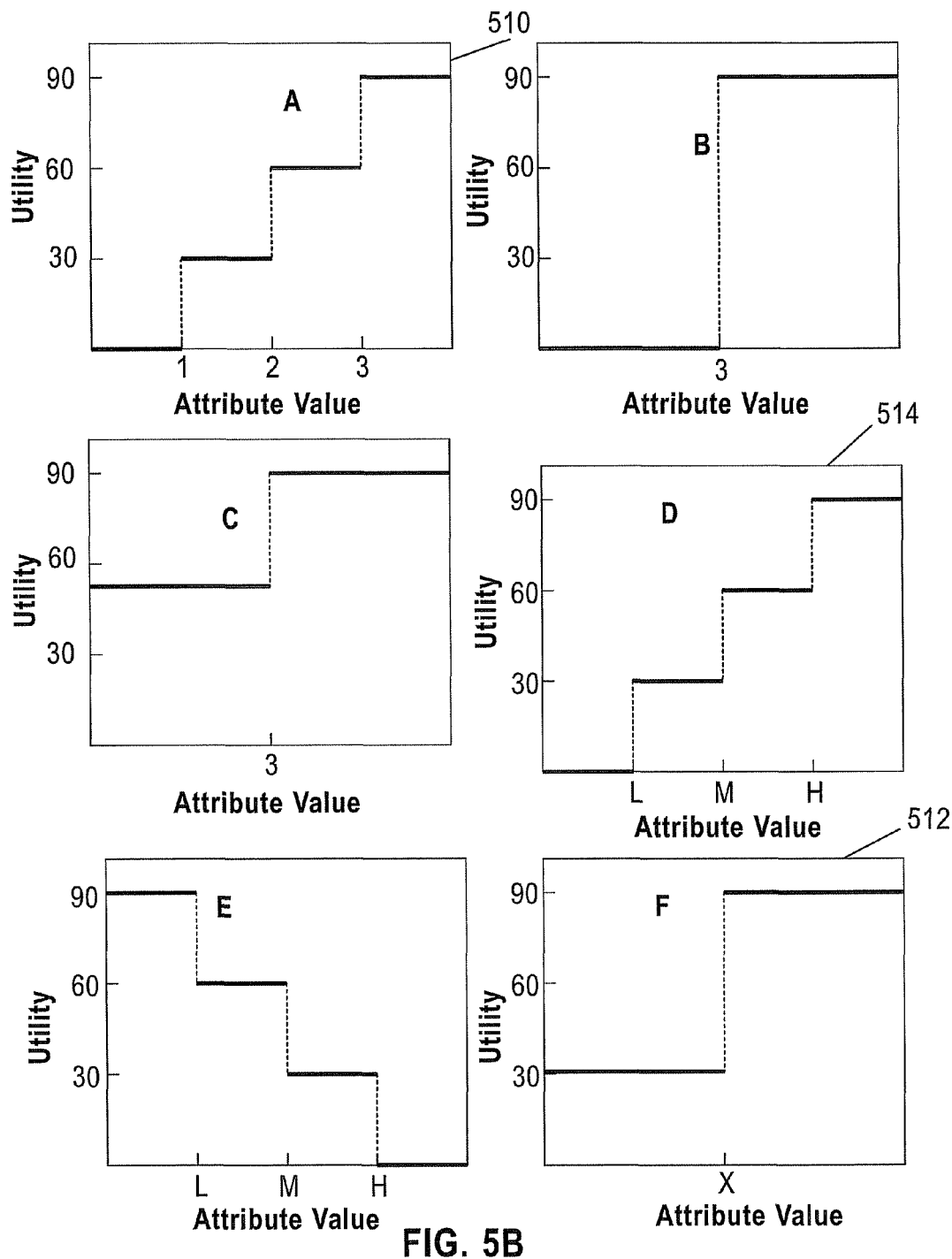
FIG. 5B illustrates a series of utility function graphs according to an embodiment of the invention.

FIG. 5B provides an example of graphical representations of the utility functions that are to be assigned to the dimensions and attributes for the determination of scores for the multi-dimensional implementation plans 504 according to an embodiment of the invention. The utility functions A-F are a subset of the 32 possible utility functions that correspond to the 4 dimensions (geo (continent), country, business unit, and business scenario) and 8 attributes (Table 2) of the present example implementation of an embodiment of the invention. The other 26 utility functions are employed with the other 3 dimensions. The number of possible utility functions if given by the equation:

Number (utility function assignment)=Number (dimensions)×Number (attributes), therefore, 32 utility function assignments=8 dimensions×4 attributes Utility function A (510) has an x-axis with attribute values corresponding to the number of facilities located in a given continent or country. For example, if there are 2 facilities in a given country the utility function A has a value of 60. The utility function F represents a situation where a threshold parameter (X) determines the value for the utility function. For example if X represents a level of revenue in a given country, and the actual revenue is less than the threshold, the utility function F assumes a value of 30. Utility functions can be based on qualitative information as well, as illustrated by utility function D with attribute values based on qualitative measures such as L—low, M—medium, and H—high (which are assigned numeric values). An example of a qualitative measure based on user responses to the form-based questionnaires (112, FIG. 2E) would be the level of system integration required (low, medium, high). The utility functions may include step functions, non-linear functions, and linear functions.

Table 3 illustrates the assignments of the utility functions A-F of FIG. 5B to the GEO dimensions and attributes according to an embodiment of the invention.

TABLE 3

| Dimension | Attributes | Utility Function |
|---|---|---|
| Geo | Number of Geos (Continents) | A |
| Geo | Number of Countries | A |
| Geo | Number of Business Units | B |
| Geo | Number of Manufacturing Plants | C |
| Geo | Maximum Country Revenue | F |
| Geo | Maximum Business Unit Revenue | F |
| Geo | Business Unit Similarity Level | D |
| Geo | Business Process Standardization Level | E |

Table 4 is a summary of inputs for the scoring functions and ordering factors. Input parameters include:

| | |
|---|---|
| dimensions | $D_i$ |
| attributes | $A_p$ |
| weights | $W_p$ |
| utility function | $U_{ip}$ |
| ordering factors | $O_{ni}$ |

The columns headers of table 4 represent the attributes, while the row descriptors are dimensions of an embodiment of the invention. At a corresponding intersection of a row and column a corresponding utility function is assigned.

TABLE 4

| | A1 | A2 | A3 | ... | Ai | ... |
|---|---|---|---|---|---|---|
| D1 (Geo) | U11 | U12 | U13 | ... | U1i | ... |
| D2 (Country) | U21 | U22 | U23 | ... | U2i | ... |
| D3 (Business Unit) | U31 | U32 | U33 | ... | U3i | ... |
| D4 (Business Scenario) | U41 | U42 | U43 | ... | U4i | ... |

The following equations are used in a multi-attribute utility mathematical model to calculate score for the various dimensional implementation project plans according to an embodiment of the invention. The ordering factors Oij (where i is the dimension of the grouping (e.g., 1—one-dimensional, 2—two-dimensional, etc.) and j varies from 1 to the number of possible grouping orders) correspond to the order in grouping the various dimensions. For example, the value of $O_{21}$ corresponding to the two-dimensional ordering—By Geo, By Business may differ from $O_{22}$ for the two-dimensional ordering By Business, By Geo. The following score functions are an additive model.

(1) Score of a single—dimensional implementation project plan $$\text{Score}(D_i) = O_{1i} \frac{\sum_{p=1}^{m} W_p U_{ip}}{W_p},$$

where $$O_{1i} = \frac{3}{1},$$

and $$i = 1, \ldots, n$$

(2) Score of a two—dimensional implementation project plan $$\text{Score}(D_i, D_j) = O_{2i} \frac{\sum_{p=1}^{m} W_p U_{ip}}{W_p} + O_{2j} \frac{\sum_{p=1}^{m} W_p U_{jp}}{W_p},$$

where $$O_{2i} = \frac{4}{2}, O_{2j} = \frac{2}{2}, i = 1, \ldots, n$$

and $$j = 1, \ldots, n$$

(3) Score of a three—dimensional implementation project plan $$\text{Score}(D_i, D_j, D_k) = O_{3i} \frac{\sum_{p=1}^{m} W_p U_{ip}}{W_p} + O_{3j} \frac{\sum_{p=1}^{m} W_p U_{jp}}{W_p} + O_{3k} \frac{\sum_{p=1}^{m} W_p U_{kp}}{W_p},$$

where $$O_{3i} = \frac{4}{3}, O_{3j} = \frac{3}{3}, O_{3k} = \frac{2}{3}, i = 1, \ldots, n, j = 1, \ldots, n$$

and $$k = 1, \ldots, n$$

Intuitively speaking, the score of a single-dimensional implementation project plan is the weight average utility value across involved attributes multiplied by the single dimensional ordering factor, which scales up the score comparable to those of multi-dimensional implementation project plans. The score of a multi-dimensional implementation project plan is the summation of the weight average utility value across involved attributes of each dimension, multiplied by ordering factors, which normalize the resulting score comparable to those of other implementation project plans, and reflect the effect of the orders of the involved dimensions.

The scores 502 of the multi-dimensional implementation plans 504 are calculated when the user clicks on the "Calculate Plan Score" button 506 in the form 500, by the project plan score estimator 118. The scores 502 of the plans 504 are sorted by the score values and entered in the table of form 500. In addition to scoring the plans, the plans are color-coded in the table of form 500. The plans are color coded by the primary (first) dimension in the plan (which decides the basic plan structure). When the plans 504 are sorted by scores 502, the color-coding assists in understanding any clusters of the plans (usually expected for a valid scoring calculation), and the consistency of the results. A random pattern of interspersed colors in the scoring results would be indicative of a faulty assumption or incorrect input into the form-based questionnaires 112. Additional coding schemes for identification of clusters may include variation in textures, shape codes, and assigned charter text fonts. Once the scores 502 are calculated, the user examines the results and decides which plan type they want to use in generating the actual plan schedule. This process can be iterative. The user can select one plan from the list and generate a plan schedule. The user can then return to the list, select another plan, and try it out. The user can compare resultant plan schedules from the multiple iterative tries, for gaining a better understanding of what elements of each plan works best for them. The user can conduct sensitivity analysis of project plans by changing attributes, their weighting, or their utility as well as having a mechanism for enabling what-if analyses of project plans. The ability to conduct sensitivity analysis also acts as an educational tool for the estimator (user).

Figure 6:
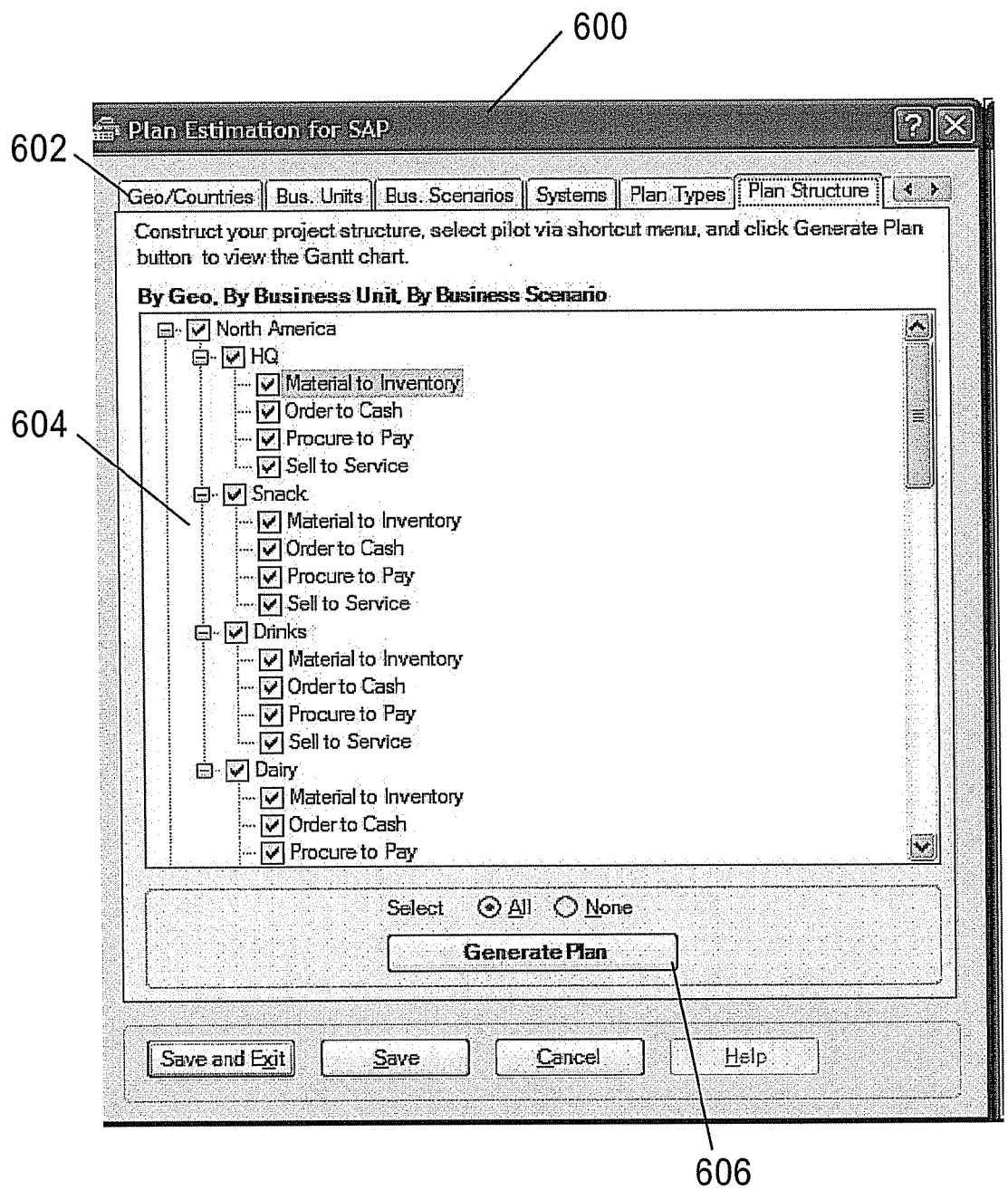
FIG. 6 shows a form of multi-dimensional implementation plan structure according to an embodiment of the invention.

When the user selects a project plan from the table in form 500 of FIG. 5A, and clicks on the "Generate Plan Structure" button 508, a new user interface form 600 of FIG. 6 is presented to the user that is configured to adjust the multi-dimensional implementation plan structure for the selected project plan 602 (in this case By Geography (Geo.), By Business Unit, By Business Scenario). FIG. 6 shows a form of multi-dimensional implementation plan structure according to an embodiment of the invention. The implementation plan is shown in an exploded hierarchical tree structure 604 with checkboxes for each entry. The actual values of the exploded hierarchical tree structure 604 comes from the selected/entered values of sector and industry, geography and country, business unit, and business scenario, which were described and selected by the user in the form-based questionnaires 112 in the user interface (FIGS. 2A-2F). The exploded hierarchical tree structure 604 shows the complete combination of the values in the given project plan structure. The complete hierarchical tree structure 604 is shown for each of the multi-dimensional project plans. By providing a checkbox for each entry in the exploded hierarchical tree structure 604, the user is allowed to include or exclude the entry in the final project plan. This inclusion/exclusion mechanism is useful to cope with asymmetric, irregular structures of the client enterprise, strategies, project intentions, and also for exploratory analyses. Once the user completes the manual inclusion/exclusion step for each entry in the exploded hierarchical structure 604, the user clicks the "Generate Plan" button 606 in the form 600 to generate the project plan estimation report (in one or more Gantt charts see FIG. 10).

The externalization of model parameters in the estimation knowledge base 134 instead of hard coding them directly in the software code of the estimation system 100 facilitates an increased level of user interaction and customization of the estimation models. This externalization of parameters, rules, models in a knowledge base or ontology allows the estimation system to easily be configured for different experiment conditions, changing business environments, diverse groups of enterprises in different industries and sectors, in different geographies and countries, with various sizes and needs. In addition, the externalization of model parameters allows different packaged applications from multiple vendors to be utilized in the modeling process.

Figure 7:
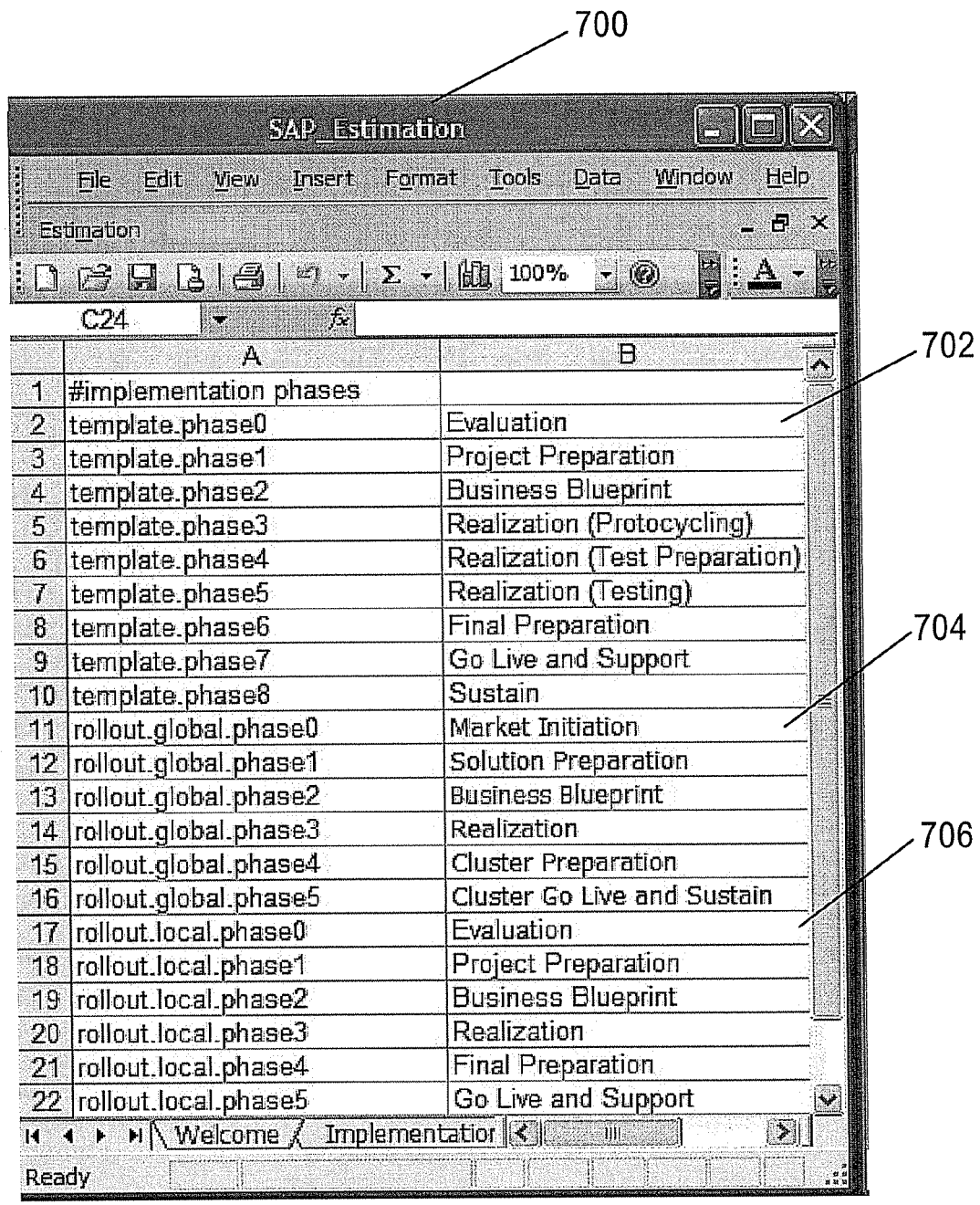
FIG. 7 shows the externalization of phase parameters according to an embodiment of the invention.

FIG. 7 shows the externalization of phase parameters according to an embodiment of the invention. In packaged application project estimation, it is possible to have to deal with different sets of project implementation methods using different sets of implementation phases. In a SAP application project estimation, a method known as the ascendant method is popularly used. The ascendant method uses a few different sets of implementation phases to deal with implementation activities in different situations: the blueprint phases, global rollout phases and local rollout phases. A blueprint project 702 consists of 9 phases—evaluation, project preparation, business blueprint, realization (protocycling), realization (test preparation), realization (testing), final preparation, go-live and support, and sustain. A global rollout project 704 consists of 6 phases—market initiation, solution preparation, business blueprint, realization, cluster preparation, and cluster go-live and sustain. Finally, local rollout projects 706 also consist of 6 phases—evaluation, project preparation, business blueprint, realization, final preparation, and go-live and support. Again, this phase information is externalized in the estimation knowledge base 134, configured as needed and dynamically reflected in the estimation models and final estimation report output 126 in the estimation system 100.

The externalization of duration parameters is shown in FIG. 8 according to an embodiment of the invention. The externalized information presented in a table 800 includes the actions for the phase duration adjustment, which were explained in FIG. 3. In addition, the table 800 shows the baseline phase durations for the roots in the decision trees shown in FIG. 4 for those phases for different project types as shown in FIG. 7. The numbers that are used in the duration adjustment are derived from both subject matter expert knowledge and analyses (e.g., data mining, statistics, and machine learning) on historical case data collected and filtered by the estimation knowledge discoverer/collector 128 of FIG. 1. The phase duration parameter information is externalized in the estimation knowledge base 134, configured as needed and dynamically reflected in the estimation models and final estimation report output 126 in the estimation system 100.

Figure 9:
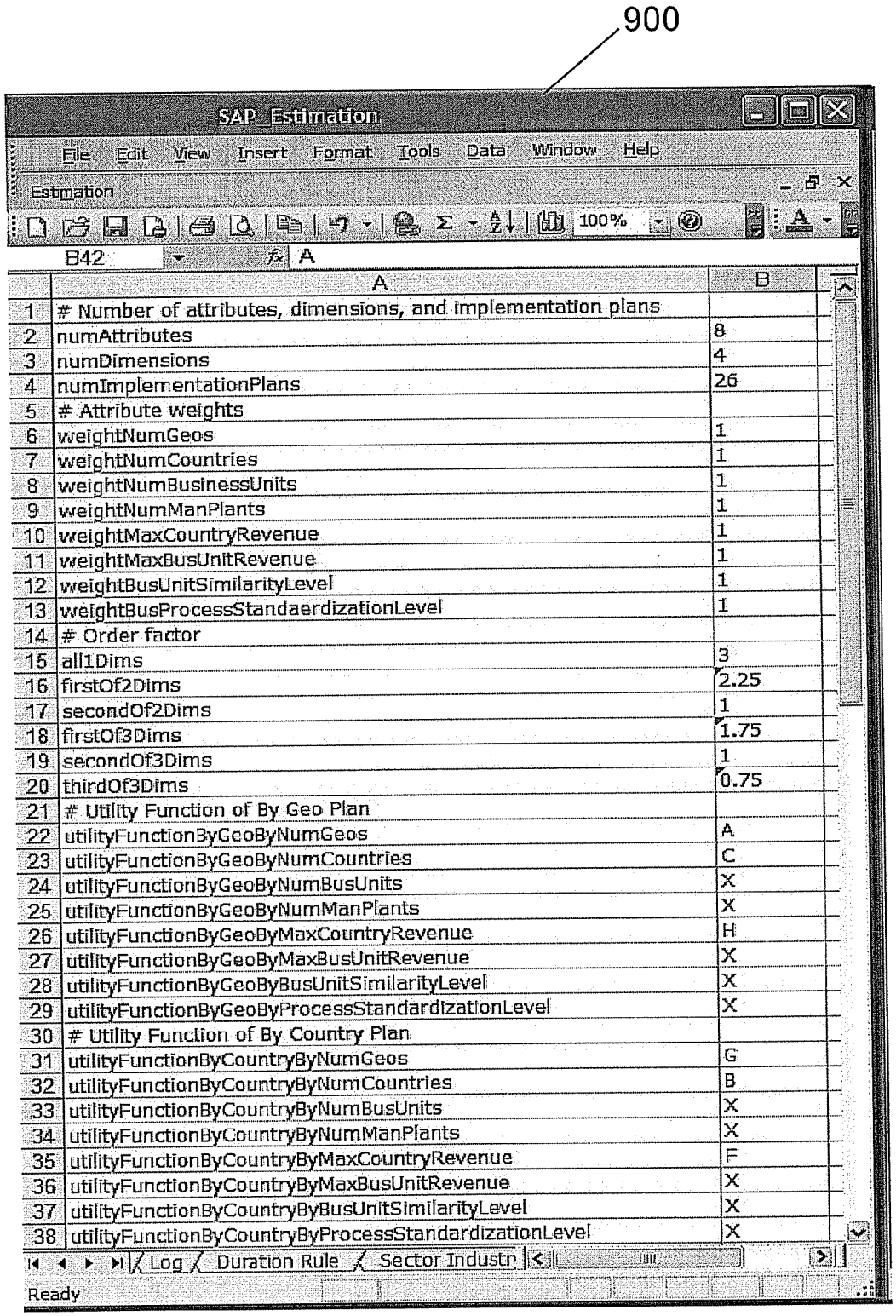
FIG. 9 shows a table of externalized scoring parameters according to an embodiment of the invention.

FIG. 9 shows a table 900 of externalized scoring parameters according to an embodiment of the invention, which are used by the project plan score estimator 118 shown in FIG. 1, and explained in conjunction with FIGS. 3, 4 and 5. The project plan score estimator 118 utilizes a model based on multi-attribute utility theory. The model requires a set of parameters, which include dimensions, project plans, attributes and their weights, ordering factors, utility functions and their assignment to the project plans. The scoring parameter information for the project plan score estimator 118 is externalized in the estimation knowledge base 134, configured as needed and dynamically reflected in the estimation models and final estimation report output 126 in the estimation system 100.

Figure 10:
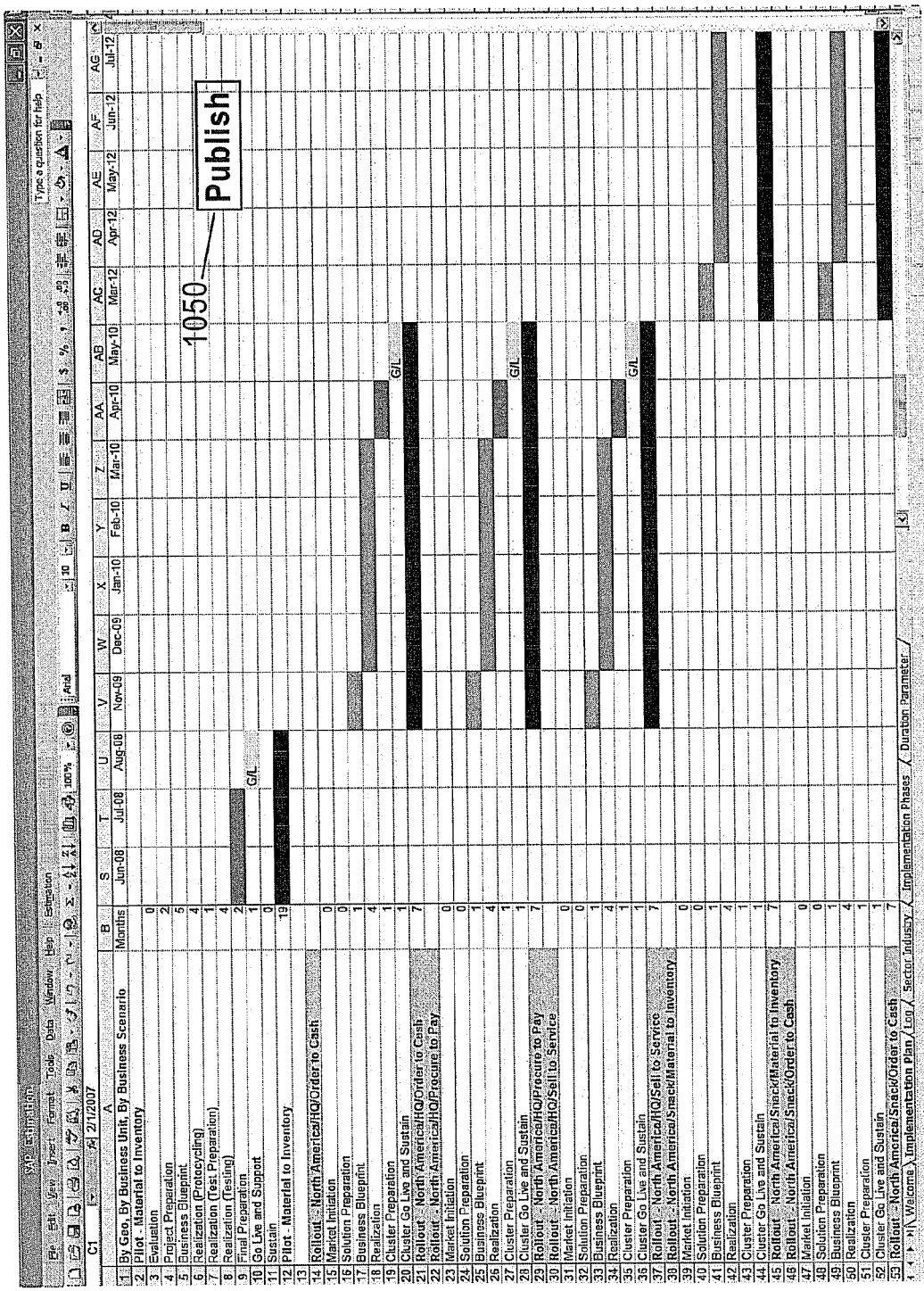
FIG. 10 shows an estimated project plan rendered in the form of a Gantt chart according to an embodiment of the invention.

FIG. 10 shows an estimated project plan rendered in a Gantt chart 1000, as part of the estimation system output report 126, according to an embodiment of the invention. A Gantt chart is a popular type of bar chart that illustrates a project schedule. Gantt charts illustrate the start and finish dates of the terminal elements and summary elements of a project. Terminal elements and summary elements comprise the work breakdown structure (WBS) of the project. Some Gantt charts also show the dependency (i.e., precedence network) relationships between activities. The estimation system output report 126 can also include estimation of cost and financial benefit of the project. The project plan is a multi-dimensional project plan for packaged applications generated according to the implementation plan selection shown in FIG. 5 and ad hoc project structure adjustment shown in FIG. 6.

Figure 11:
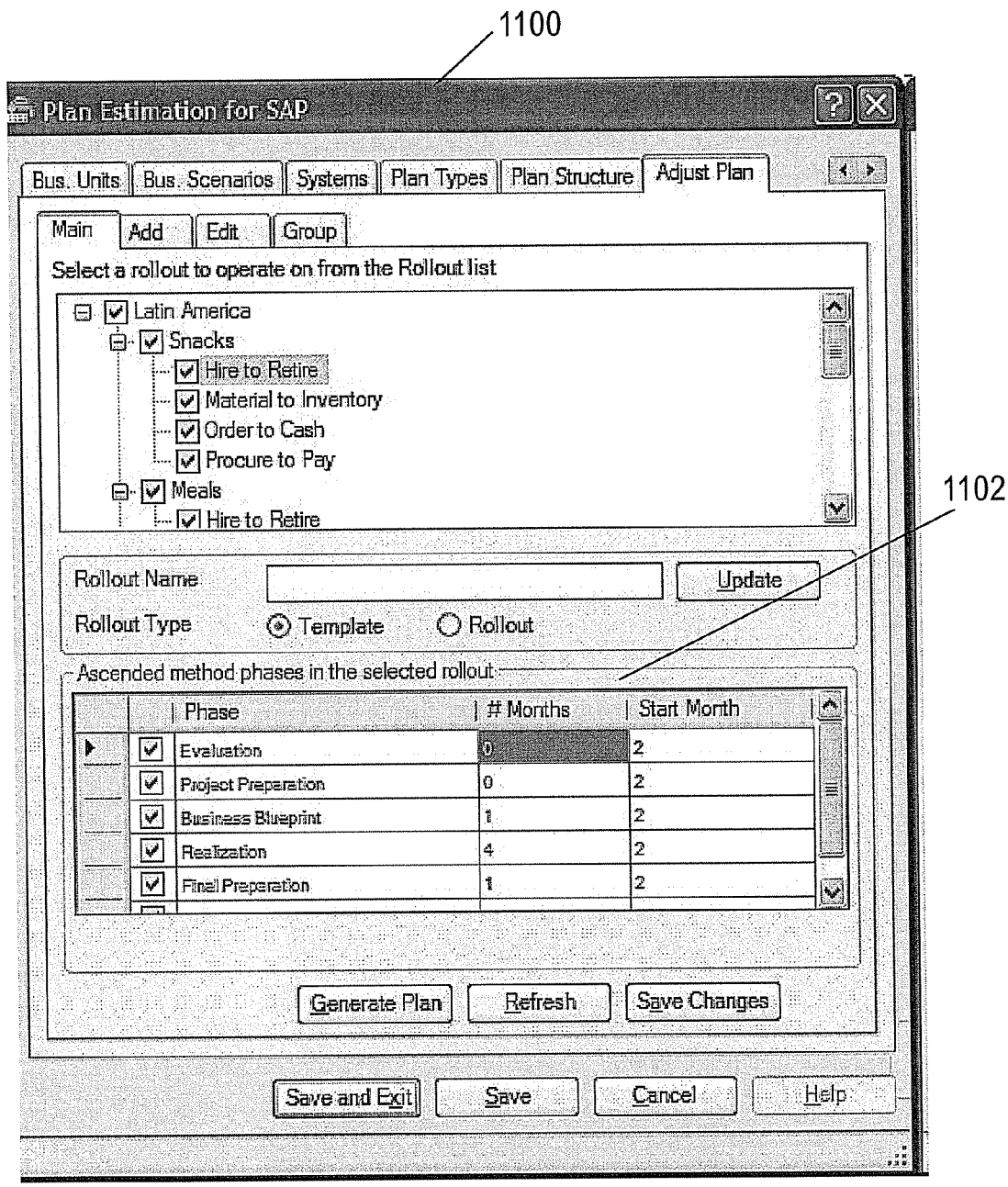
FIG. 11 illustrates a user interface mechanism for adjusting project plans for overlapping or grouping of rollouts according to an embodiment of the invention.

In FIG. 11 provides a user interface 1100 mechanism for manually adjusting the generated project schedules to overlap two or more phases, or two or more rollouts, grouping (or synchronizing) two or more rollouts (i.e., aligning them to start at the same time), and rearrange the order of the rollouts in the project schedule, etc. in the estimation system 100 according to an embodiment of the invention. Furthermore, the user interface 1100 is configured for other editing capabilities such as removing an existing rollout (such as setting the phase length to 0 as in entry 1102) from the plan, adding a new rollout to the plan, changing the name of a rollout, changing the length of phases of a rollout, changing the starting month of phases of a rollout, excluding/including one or more phases in the rollout, among others. Rollouts refer to the introduction of a project plan within a specific Geo (continent), country, or division within a company. The manual adjustments are typically done on an ad hoc basis to deal with certain special situations (such as geographical proximity of project sites, availability of global resources, etc.), and so it is typically difficult to effectively automate them in the model. This point is true, especially when the ease-of-use and simplicity of the user interface is an important driver for the design of the estimation system. Therefore in embodiments of the invention, it is a more efficient approach to provide an effective user interface for manual adjustment instead of trying to automate such ad hoc operations with a lengthy questionnaire and obscure questions.

Cost estimation and validation of project plans within embodiments of the invention is carried out using a combination of driver-based costing and activity-based costing (ABC). Embodiments of the invention consider both qualitative drivers and quantitative drivers, and the embodiments translate the driver's qualitative rating into quantitative ones for facilitating cost estimations. Cost driver categories include: product drivers—ISV and packaged software applications; company drivers—revenue, size, experience in implementation of software within the enterprise, business unit similarity (the greater the similarity the lower the cost), and process standardization (higher standardization equates to lower cost implementation); scope drivers—number of sites, number of countries, types and numbers of business scenarios and processes, number of business units, types and number of industries and sectors considered; and project driver—rollout types (complexity), and the degree of rollout overlap and clustering. Cost (effort) estimation by embodiments of the invention combine a top-down (by single formula), and a bottom-up (effort for each phase estimated first) for estimate validation.

Figure 12A:
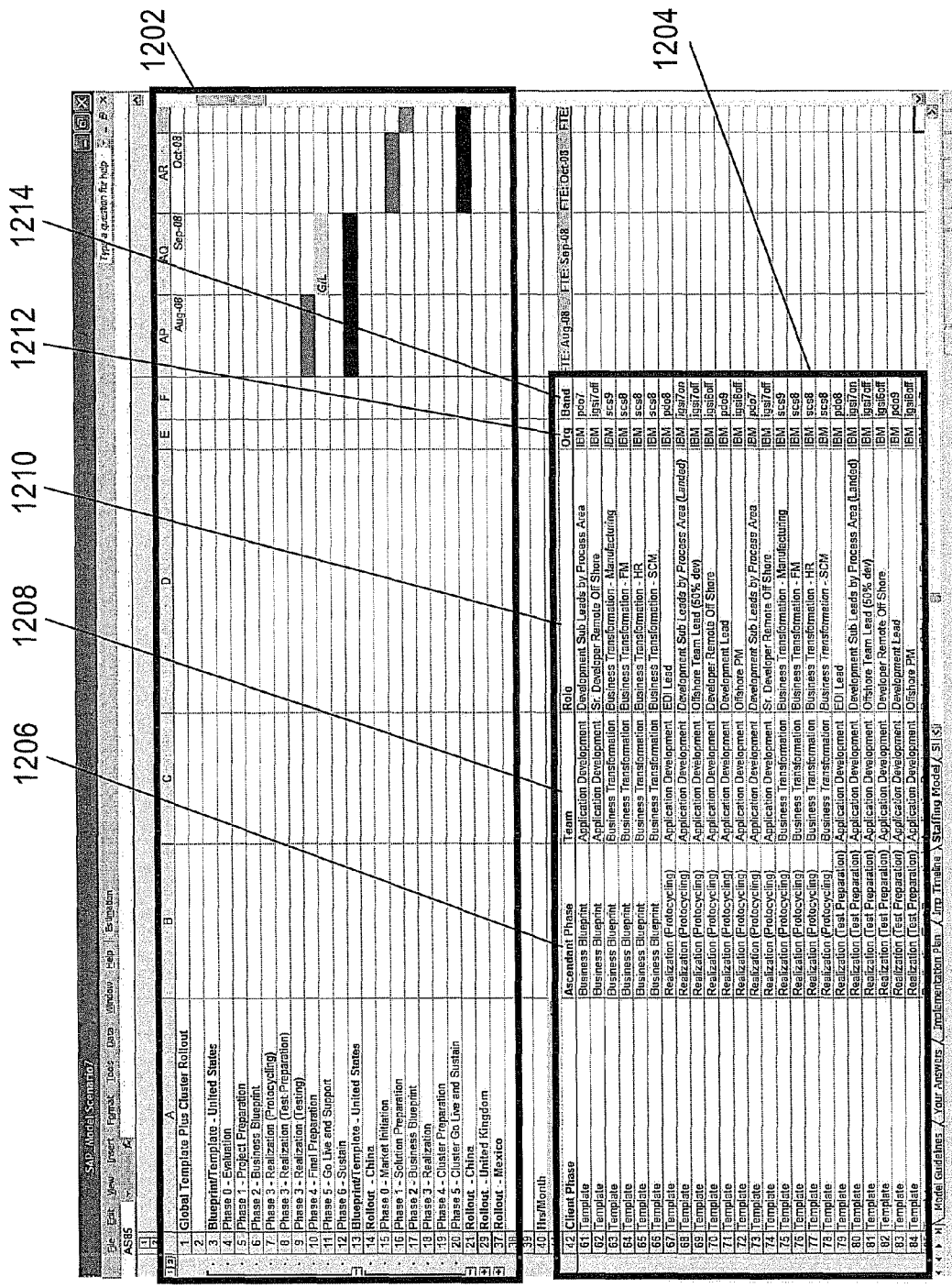
Figure 12B:
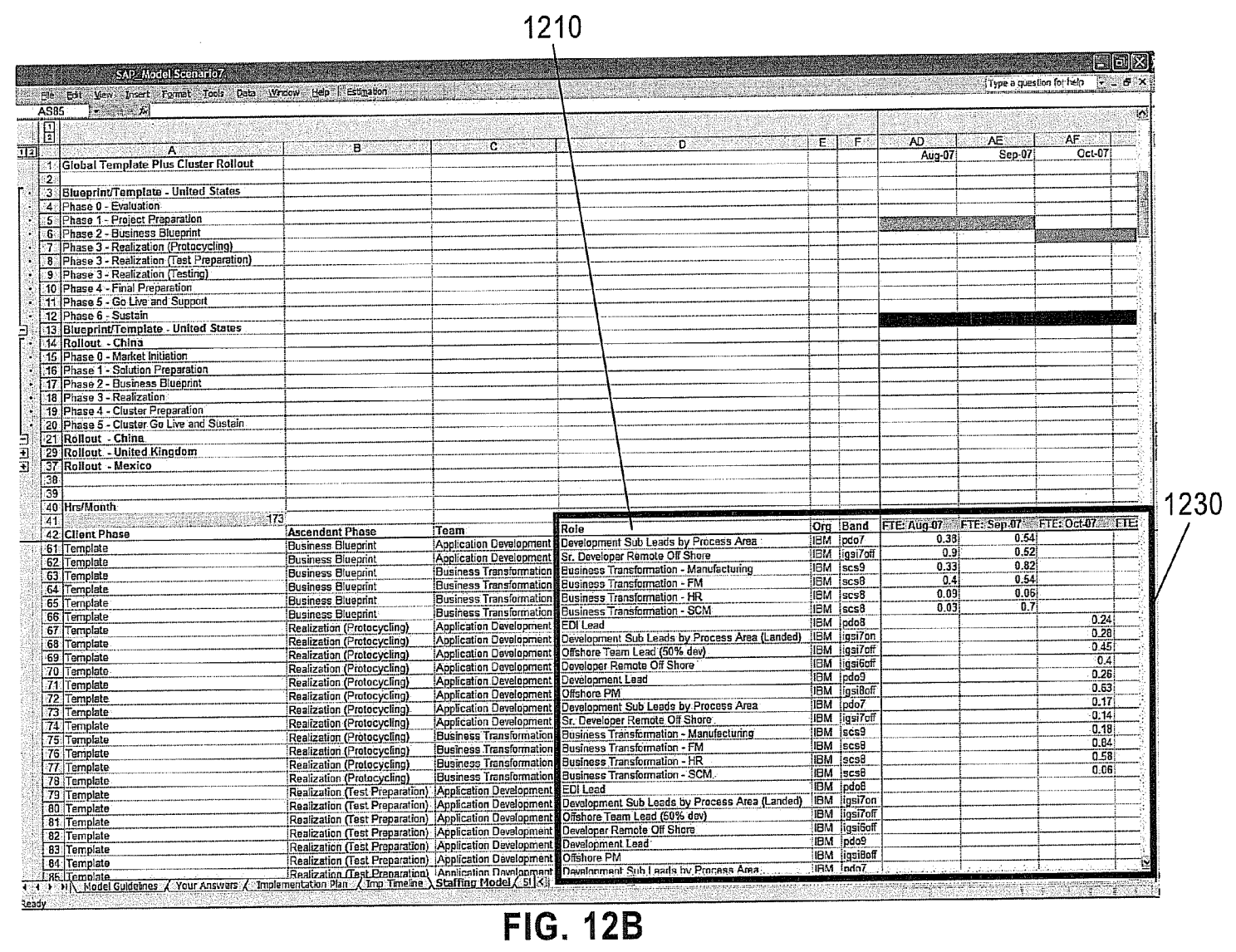
Figure 12C:
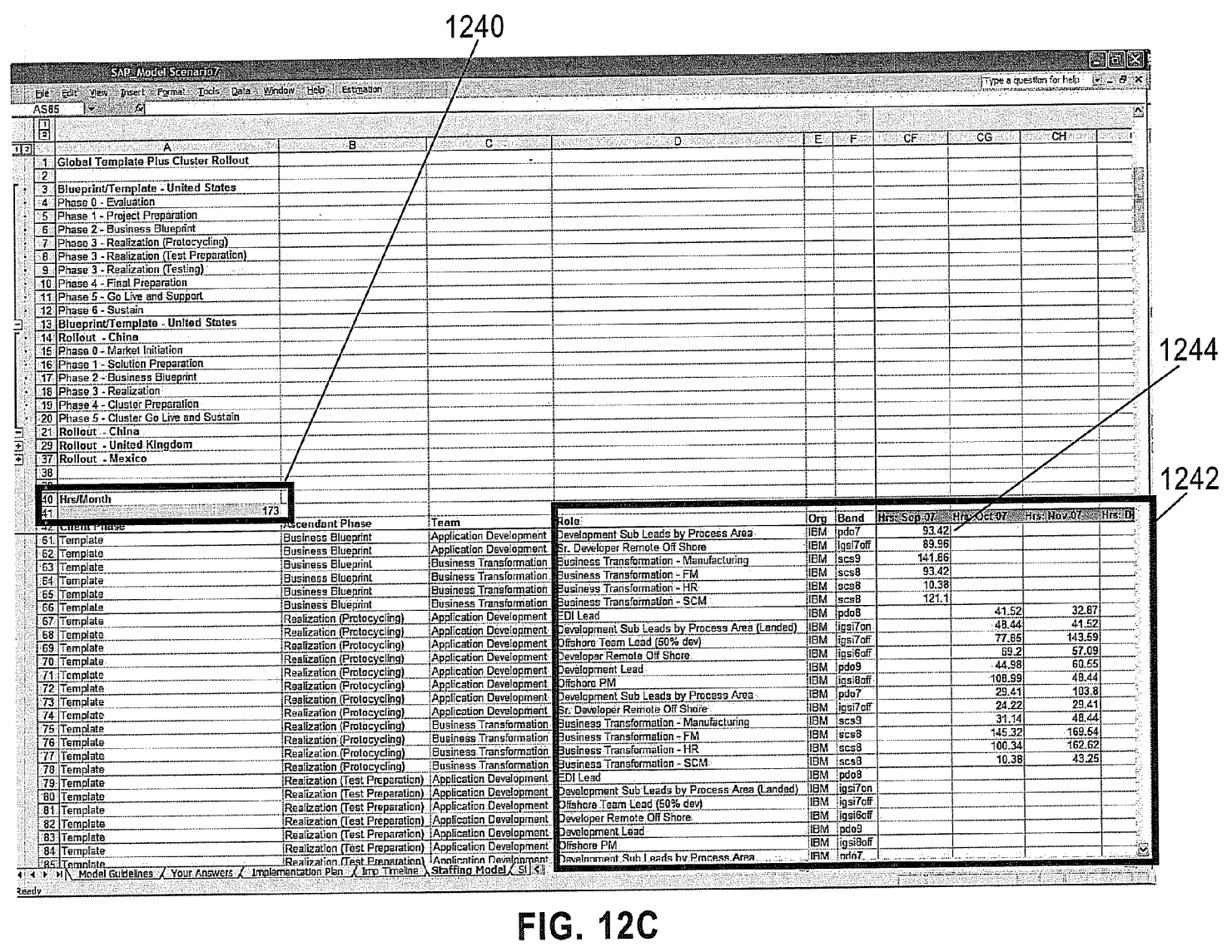
Figure 12D:
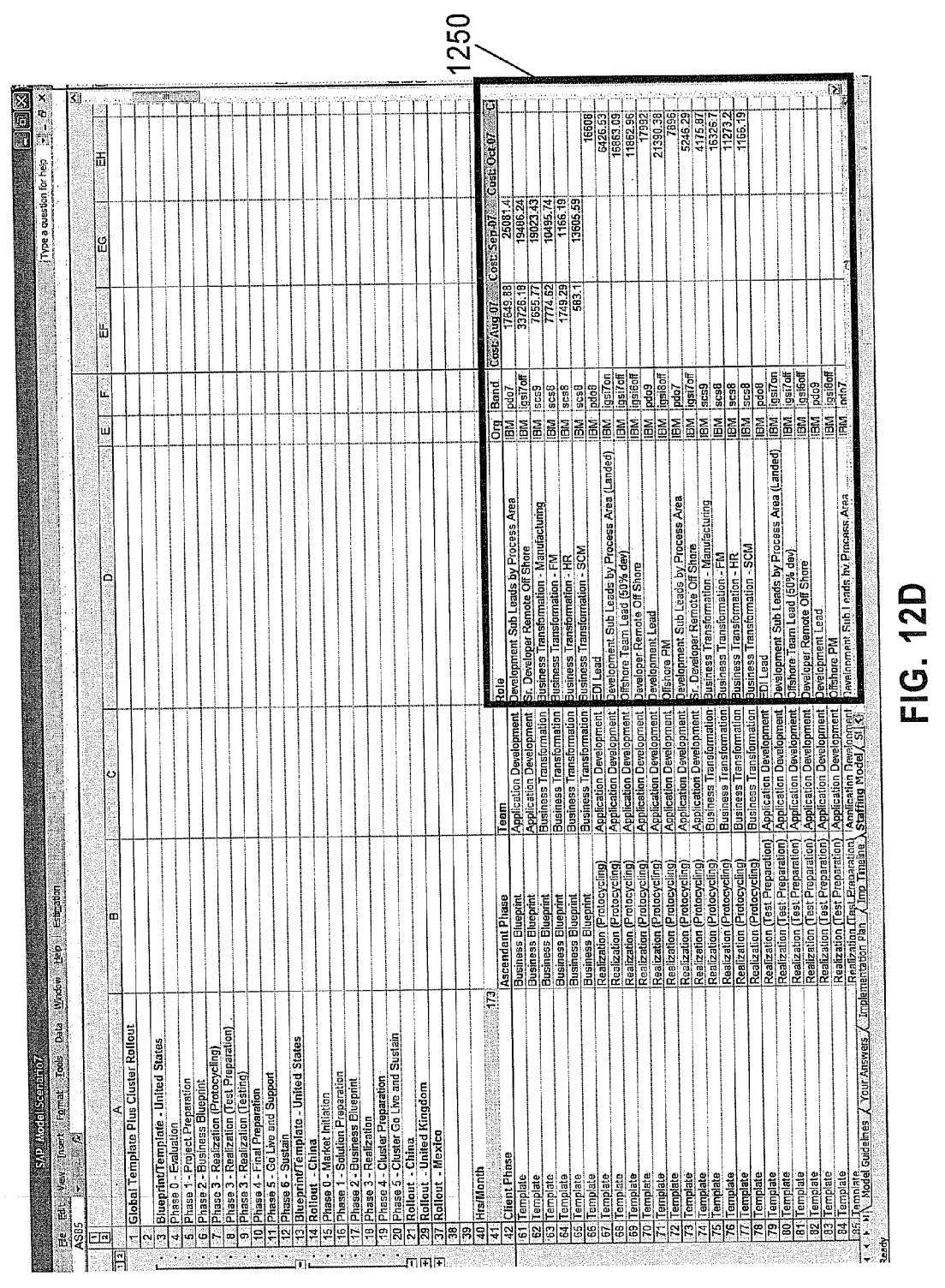
Figure 12E:
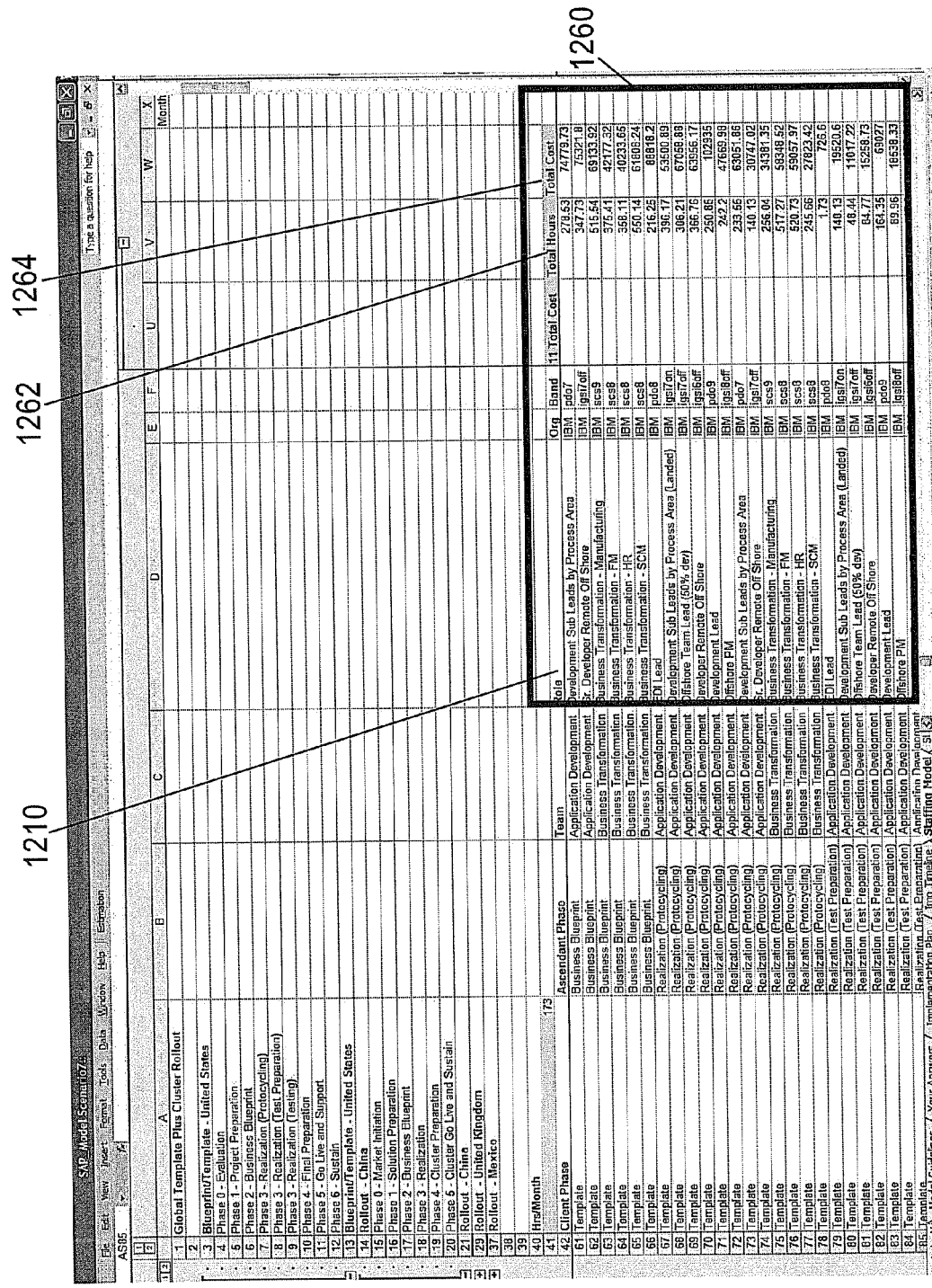
Figure 12F:
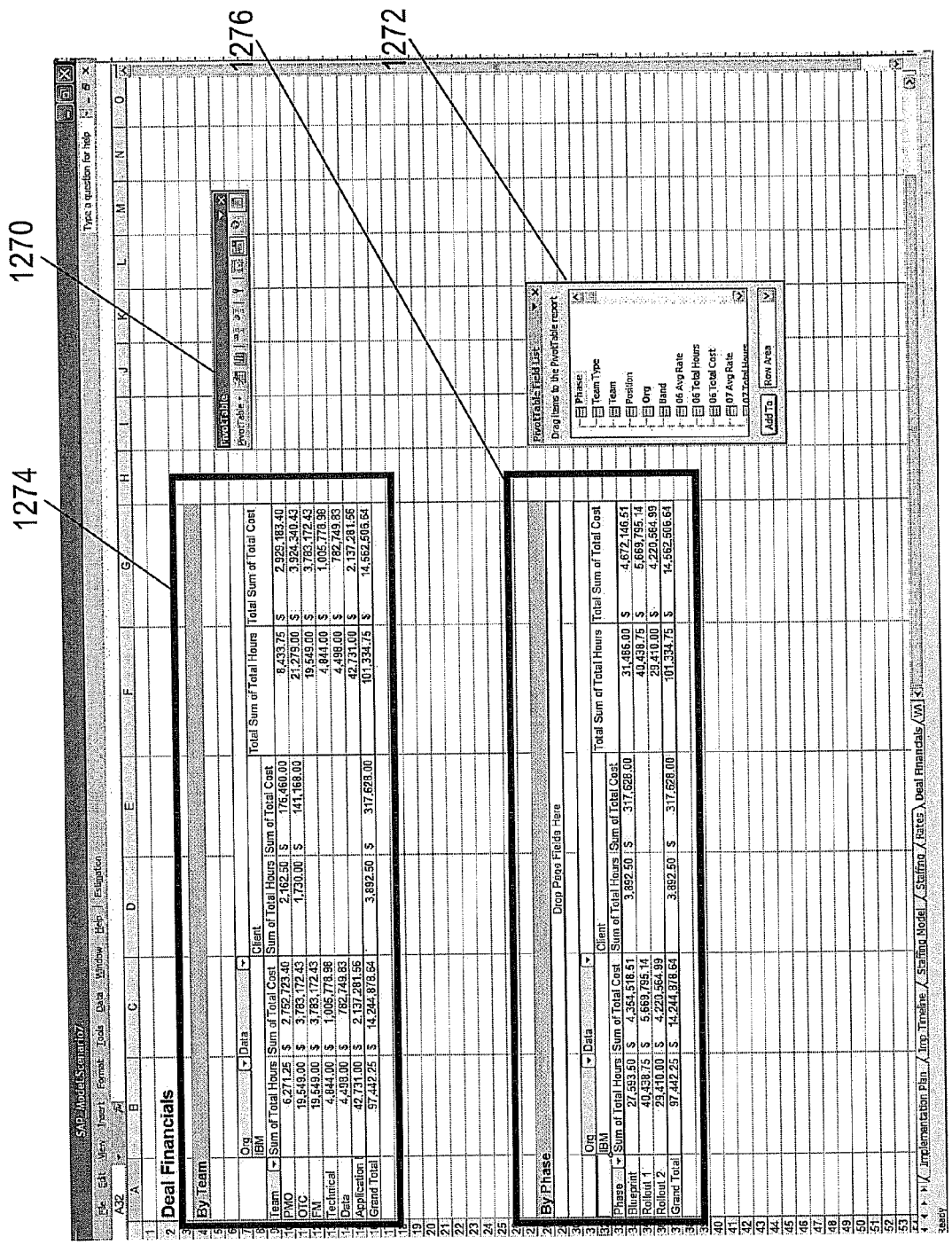

Examples of graphical user interface screens related to the staffing and cost estimator 122 of FIG. 1A are shown in FIGS. 12A-12F according to an embodiment of the invention. In FIG. 12A teams, roles, organizations, bands (rates) are assigned phases of the project by using templates and drivers based on a possible scenario in the multi-dimensional project plan 156 that is presented to the user in the form of a project schedule (Gantt chart) 160 of FIG. 1B. The templates may take the form of a spreadsheet application. The area 1202 is an example of a Gantt chart with the various templates for implementing the phases within the various project plans within the multi-dimensional project plan 156. The area 1204 provides the user with the ability to assign teams 1208, roles 1210, organizations 1212, bands (labor cost rate/FTE) 1214 to the phases 1206 of the project plan scenario. Within the roles 1210, depending on where the project implementation is to be carried out, an onshore role (within the home country of the company carrying out the implementation project for the client), or an offshore role (outside the home country of the company carrying out the implementation project for the client) can be designated. In FIG. 12B, as shown in area 1230, monthly FTE are assigned to the roles 1210. In FIG. 12C the work effort is calculated based on the given hours within the month as inputted by the user in area 1240 (173 hrs/month for this example) multiplied by the given FTE for the month. For example the calculated work effort for September in cell 1244 is (173 hours)*0.54=93.42 hours/month. In FIG. 12D the monthly cost per project role is calculated within the area 1250 based on the band rate 1214 multiplied by the monthly work effort (as calculated in FIG. 12C). In FIG. 12E the total annual work effort 1262 and total annual cost 1264 are calculated and displayed for each project role 1210 in their respective columns in area 1260. In FIG. 12F additional multi-dimensional views of aspects project finance related to a scenario within a set of project plans are presented. A toolbar 1270 allows the user to call up a menu 1272 of project finances based on various perspectives. Area 1274 presents deal financials on a team-by-team perspective, while area 1276 presents the deal financials on a phased perspective. The user also has the ability to drill-down or roll up the displayed results.

The externalization of staffing templates in the estimation knowledge base (106, 134) facilitates configuration without changing the underlying code to support diverse scenarios. In addition, the form-based user interface 112 is employed for collecting user input of driver values used in staffing including: custom development requirements, system integration requirements, work product (deliverable) requirement, data quality, template availability and level of deviation, training requirements, change management requirements, functional scope, RICEF, and process steps. The staffing templates also serve as a supply chain for staffing with assignment of team, role, organization, band, and geography to tasks. The staffing templates also provide workload assignment, and resource plans of similar rollouts.

Table 5 is an example of a standard estimating model for the times (in days) to complete the design/coding/unit testing phase, the integration test phase, and go-live/support phase in an ascendant method for RICEF.

TABLE 5

Estimating model in days

| Type | Design/Coding/Unit testing | | | 15% Integration Test | | | 10% Go Live/Support | | | Total Effort | | |
|---|---|---|---|---|---|---|---|---|---|---|---|---|
| | Low | Med. | High | Low | Med. | High | Low | Med. | High | Low | Med. | High |
| Forms | 8 | 12 | 20 | 1 | 2 | 3 | 1 | 1 | 2 | 10 | 15 | 25 |
| Reports | 7 | 12 | 20 | 1 | 2 | 3 | 1 | 1 | 2 | 9 | 15 | 25 |
| Interfaces | 9 | 16 | 24 | 1 | 2 | 4 | 1 | 2 | 2 | 11 | 20 | 30 |
| Conversions | 9 | 16 | 24 | 1 | 2 | 4 | 1 | 2 | 2 | 11 | 20 | 30 |
| Enhancements | 7 | 12 | 20 | 1 | 2 | 3 | 1 | 1 | 2 | 9 | 15 | 25 |

In Table 5 low-medium-high refer to the complexity of RICEF task to be conducted. The days provided for low-medium-high for the Design/Coding/Unit testing phase are obtained from benchmark data. The design/coding/unit testing phase is considered the primary factor in the estimation model. The provided percentages of 15% and 10% are effort factors that are used to determine the days required for completion of the integration test and go-live/support phase respectively. The days under the primary factor are multiplied by the effort factors to determine the days under integration test and go-live/support phase. For example, a medium difficulty form in the integration test phase takes 2 days to complete, based on 12×0.15=1.8 rounded up to 2; while a high difficulty conversion in the go-live/support phase takes 2 days to complete, based on 24×0.10=2.4 that is rounded down to 2 days. The total effort is the summation of the various columns and rows.

Figure 1C:
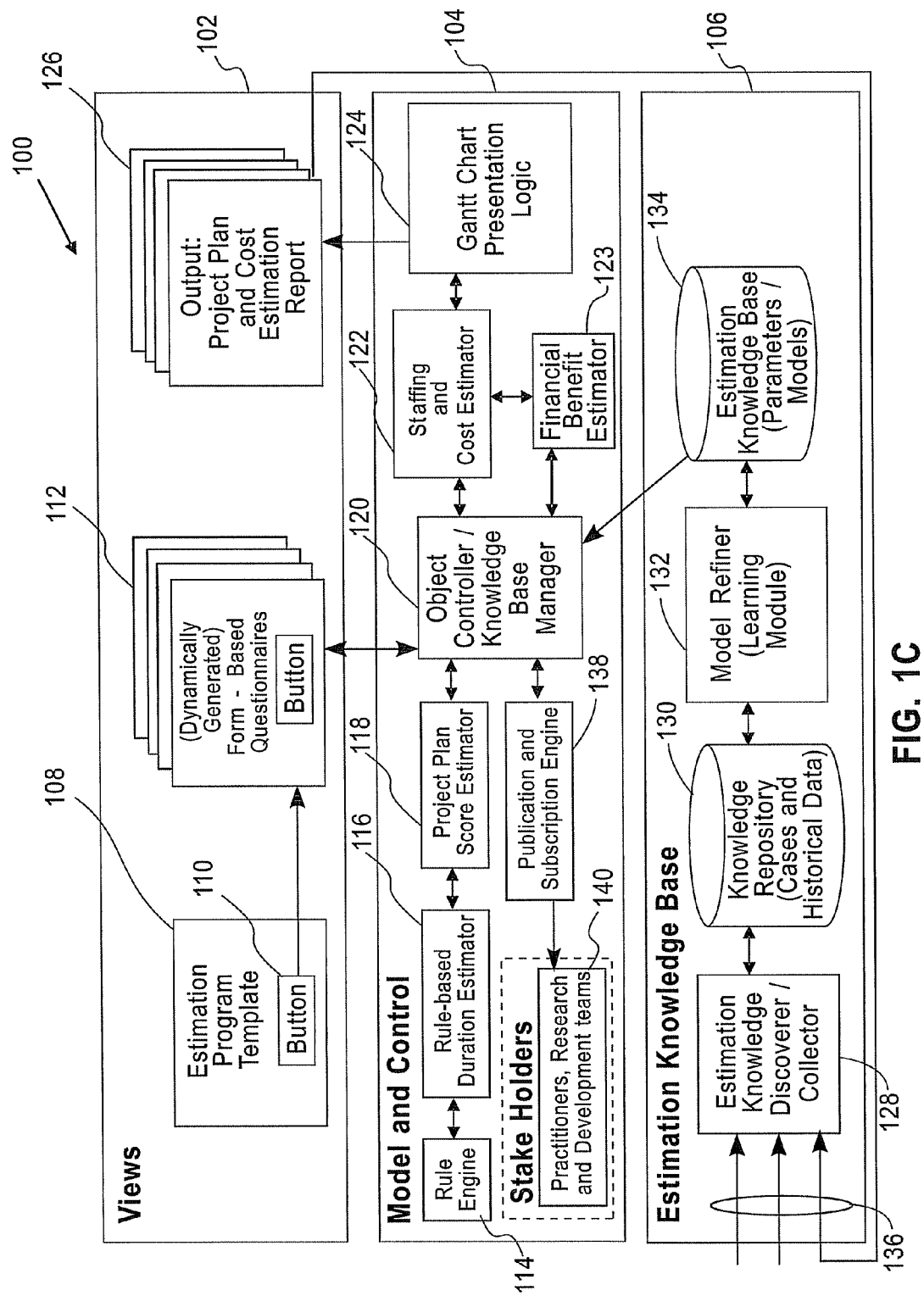
FIG. 1C is a schematic diagram of an estimation system architecture with a means for self calibrating the estimation model according to an embodiment of the invention.

FIG. 1C is an embodiment of the invention that facilitates the self-calibration and refinement of project estimation models for packaged software applications. The self-calibration and refinement is carried out by the estimation system architecture 100' with the addition of a publication and subscription engine 138 to the estimation system 100 of FIG. 1A. The publication and search engine 138 publishes the resultant model (case), with all related data including the answers to the form-based questionnaires 112, scenarios with generated schedules (Gantt charts), staffing projections, costing, benefits, pricing reports, to the knowledge repository 130 that holds cases and historical data, and to stake holders 140 for their review. Stakeholders 140 include practitioners in the field for which the case was generated, as well as research and development teams in the field of interest. The model refiner 132 analyzes the case data stored and provided by the knowledge repository 130, and updates (validates and calibrates) the estimation models and parameters in the estimation knowledge base 134. The stakeholder's use the published implementation project plans (cases) as guidelines for future implementations of project plans. The publish button 1050 (or an equivalent user interface selection option) in FIG. 10 of the estimated project plan rendered as Gantt chart 1000 is a possible mechanism for the user to initiate the publication process.

Figure 13:
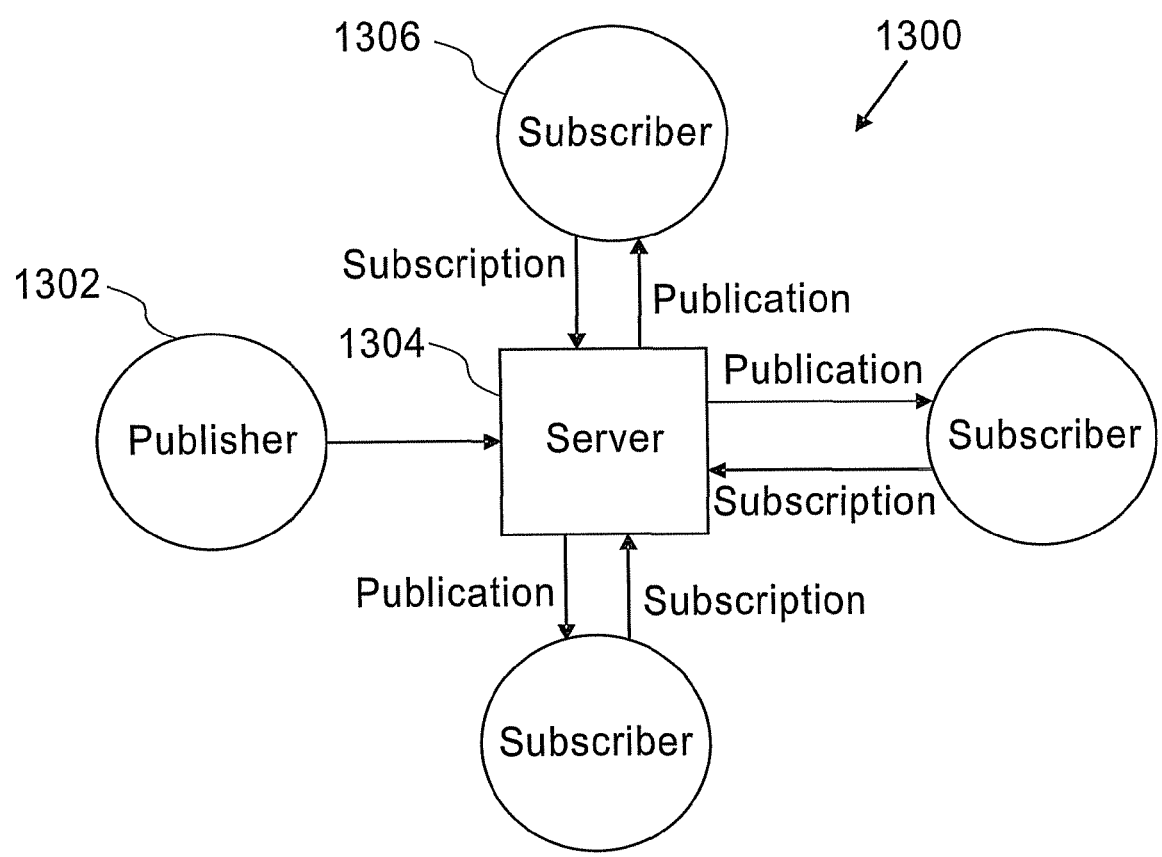
FIG. 13 illustrates a mechanism for publication and stakeholder interaction for the refinement and calibration of a project estimation model for packaged software applications according to an embodiment of the invention.

FIG. 13 illustrates a mechanism 1300 for publication and stakeholder interaction for the refinement and calibration of a project estimation model for packaged software applications according to an embodiment of the invention. In FIG. 13 the publisher 1302 represents the publication and subscription engine 138 that provides the "publication"—the published implementation project plans and case data to the server 1304. The server 1304 is the communication channel/network between the estimation system 100' and the subscribers 1306, and can take the form of email systems, collaborative team rooms, Web sites, wiki sites, RSS (real simple syndication), with notification, etc. The subscriber 1306, which represents the stakeholders 140, has the ability to collaborate and communicate with the other subscribers 1306, and to utilize the publication data as a training and education tool.

The estimation system (100, 100' as seen in FIGS. 1A and 1C, respectively) of embodiments of the invention utilizes the server 1304 as a communication channel/network for gathering information for calibrating and refining the estimation models. Within the estimation knowledge base 106 is an estimation knowledge discoverer and collector 128, which connects to various sources 136 (including empirical data from the project plan and cost estimation report 126, historical data—internal cases prior to implementation of embodiments of the present invention, and data from external sources,—the Web (Internet), packaged application software vendors (ISV), information from existing installations—data mining (crawler)), and collects knowledge and information relevant to estimation, including historical data of prior estimation cases contained within a knowledge repository 130. The collected knowledge and data is culled and analyzed by a model refiner 132. If validated, certain knowledge (in the form of rules and ontology) is learned by the model refiner 132, which, in turn, conveys the newly found knowledge to the estimation models as parameters that are represented in the estimation knowledge base 106.

The model refiner 132 uses several types of machine learning for calibration of the estimation models including supervised learning, unsupervised learning, semi-supervised learning, reinforcement learning, transduction, and learning to learn. Supervised learning is accomplished with a priori (previously available labeled examples) data to determine new attributes, and offers the highest accuracy of the available learning techniques. A supervised learning algorithm generates a function that maps inputs to desired outputs. One standard formulation, of the supervised learning task, is the classification problem. An example of a leaning classification task in an embodiment of the invention is the identification of which attributes are relevant to a given dimension through regression analysis of weighting factors. In unsupervised learning, the modeling of a set of inputs is accomplished without a priori data (labeled examples). Semi-supervised learning combines both labeled and unlabeled examples to generate an appropriate function or classifier. Reinforcement learning utilizes an algorithm that learns a policy of how to act given an observation of its operating environment. Every action has some impact on the relevant operating environment, and the environment provides feedback that guides the learning algorithm. Transduction learning shares similarities to supervised learning, but does not explicitly construct a function. Instead, transduction learning tries to predict new outputs based on training inputs, training outputs, and test inputs that are available while training. Finally, learning to learn is an algorithm that learns its own inductive bias based on previous experience.

Examples of estimation model calibration include the adjustment of phase parameters (see FIG. 7), duration parameters (see FIG. 8), and scoring parameters and values (see FIG. 9).

Estimation models employed by embodiments of the invention include normative, constructive, and self-correcting models. A normative model is a generic model for different customers and systems. In the context of the current invention normative models for estimation support various ISVs and packaged software applications, various clients, evolving situations, and parameter externalization in ontology and autonomic configuration. A constructive model is an intuitive model. In the context of the present invention, constructive models for estimation provide insights and understanding to the estimation, as well as, interactive decision support using what-if analysis and sensitivity analysis. Finally, a self-correcting model employs reinforcement learning using user input.

The estimation of financial benefits (value) of packaged application service projects is another key feature of embodiments of the invention. The financial benefit is what the information technology (IT) solutions offered by the packaged application provides the firm in terms of standard financial metrics including cash flow, net present value, asset turnover ratio, productivity, net profit margin, return on investment (ROI).

Embodiments of the present invention address issues related to business transformation as related to the value determination of IT implementations of packaged software applications. Business transformation is a key executive management initiative that attempts to align the technology initiatives of a company closely with its business strategy and vision. Business transformation projects are often hampered by situations known as "business-IT gaps", which lead to failures in demonstrating the business values of IT functions and capabilities in the implementation plans of packaged application software. Embodiments of the invention address business-IT gaps problem with an innovative model-driven approach to value-oriented business analysis and transformation. The model driven approach of the present invention maps IT functions and capabilities to business performance, and facilitates the demonstration of the delivered value of IT and services. In addition, the model-driven approach of the present invention integrates value models with business models of processes and components to leverage the value model at different levels and phases of business transformation. Embodiments of the invention extend the model-driven business transformation by linking business values with key IT enablers all the way down to the IT infrastructure, combining Component Business Modeling with the value-oriented business analysis to strengthen estimation system's business analysis capabilities, and using the measurement provided by the value model to monitor and track value and improvements during and after business transformation.

Figure 14:
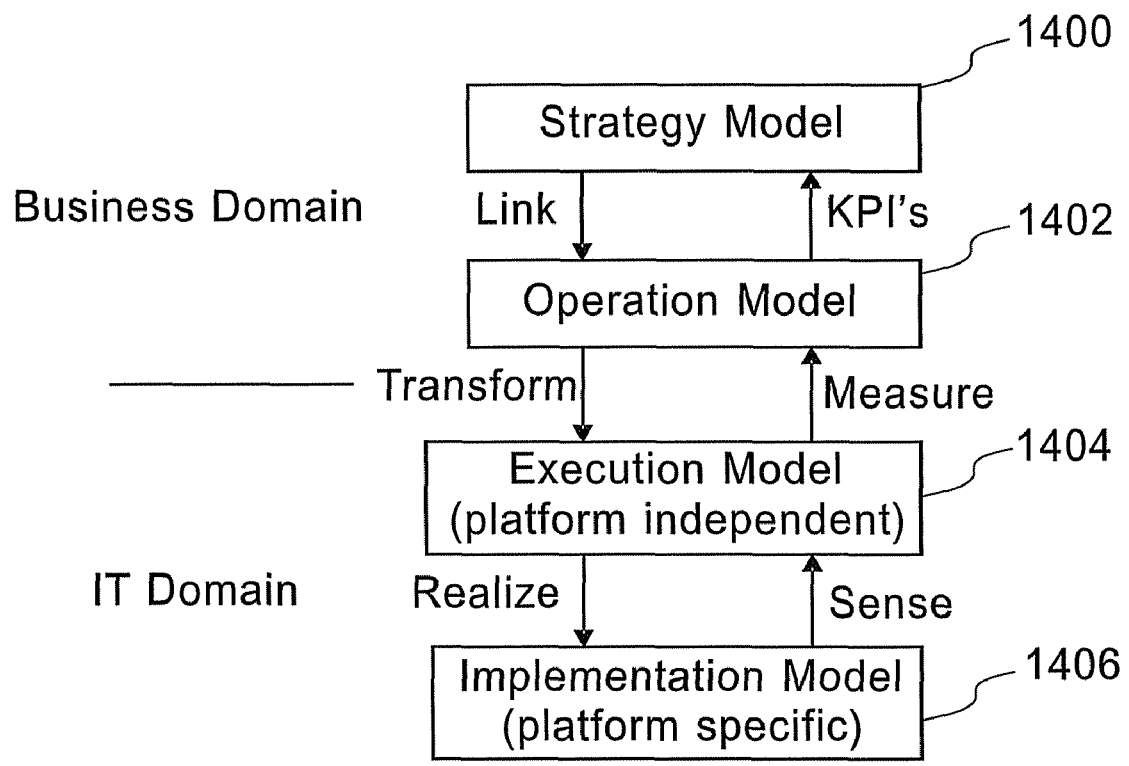
FIG. 14 illustrates a typical model-driven business transformation utilizing a multi-layer model approach to link business and IT semantics.

Model-driven business transformation is a supporting technology for business transformation in the service-led economy. Model-driven business transformation utilizes a multi-layer model approach to link business and IT semantics, as shown in FIG. 14. The upper layers of the model represent business semantics in the terms familiar to business executives, business managers and analysts such as key performance indicators, operational metrics (measures), business processes (operation model 1402), activities and governance (strategy model 1400). The lower layers (execution model 1404, implementation model 1406) of the model represent IT architecture comprising a wide range of services implemented in IT infrastructure such as service-oriented architecture. The vision of this multi-layer model is to enable IT solutions to accurately reflect and be driven by business intent. The key to the multi-layer model of the model-driven business transformation is that the layers are linked in meaningful ways, so that changes in one layer can ripple through to other layers. The representation and enforcement of the semantics of the different layers and also of the connections between the layers is essential to the model-driven approach. The model-driven business transformation approach provides a convergence of the business and IT models using a multi-layer model, which tightly couples the business and IT models, by providing a top-down business perspective, which enforces a business-orientation of business transformation. The model-driven business transformation approach is a significant step towards closing the "business-IT gap," and achieving maintainable alignment between business design and IT solutions.

Component business modeling (CBM) is being utilized by the consulting industry to understand and transform businesses. A component business model represents the entire business in a simple framework that fits on a single-page. CBM is an evolution of traditional views of a business, such as ones through business units, functions, geography, processes or workflow. The component business model methodology helps identify basic building blocks of business, where each building block includes the people, processes and technology needed by this component to act as a standalone entity and deliver value to the organization. This single page perspective provides a view of the business, which is not constricted by barriers that could potentially hamper the ability to make a meaningful business transformation. The component business model facilitates to identify which components of the business create differentiation and value. It also helps identify where the business has capability gaps that need to be addressed, as well as opportunities to improve efficiency and lower costs across the entire enterprise.

Embodiments of the present invention also employ value modeling to the business transformation process. Enterprises are increasingly focusing on value rather than on the functions and capabilities of IT. Enterprises expect service providers to demonstrate value of technologies throughout business transformation phases. Value modeling addresses this need by identifying and mapping the enterprise's key business and IT value drivers, and linking them to the measurable business and financial benefits. The value model also helps tracking the performance and showing realized value during and after the implementation.

The estimation system (100, 100') of FIGS. 1A and 1C of the present invention utilizes the aforementioned model-driven business transformation, component business modeling, and value models to provide for improved transformation decisions by building unique models for the business that captures all entities involved in creating value for the business, in both qualitative and quantitative terms. The qualitative business analysis is based on component business modeling, and the quantitative analysis is based on value modeling. By linking the qualitative and quantitative analysis, embodiments of the estimation system (100, 100') provide an end-to end suite of business analysis capabilities, enabling business-driven, value-oriented business transformation. The financial benefit estimator 123 works in tandem with the staffing and cost estimator 122 to provide presentation logic 124 in the form of business maps (see FIG. 15) through GUI generated in the view layer 102 with the output report generator 126. Each business map shows various entities involved in running and understanding of business and their relationships. The business maps generated by embodiments of the invention provide visual models, which organize the above-mentioned business entities in a structured way. In addition, they provide user interfaces, which allow the user to interactively navigate and explore the information space for analysis purposes. The various models for the financial benefit (value) analysis are stored in the estimation knowledge base 134, and are accessed by the financial benefit estimator 123 through the knowledge base manager 120. In FIG. 1B, the determined value 155 of the packaged application for an organization is used in determining the price 156 for implementing the packaged application.

The value model provided by the estimation system (100, 100') of embodiments of the present invention is capable of capturing both business entities of a business that are involved in creating or defining value and the relationships between the business entities. The business entities in the model include business components, business processes and activities, operational metrics, key performance indicators (KPI), and value drivers. In addition, the value model represents the business entities relationships to resources, services, messages, IT infrastructure, and solutions. Solutions refer to both IT and business capabilities to support business objectives and strategies, or address business pain points (areas of deficiencies in the business).

Figure 15:
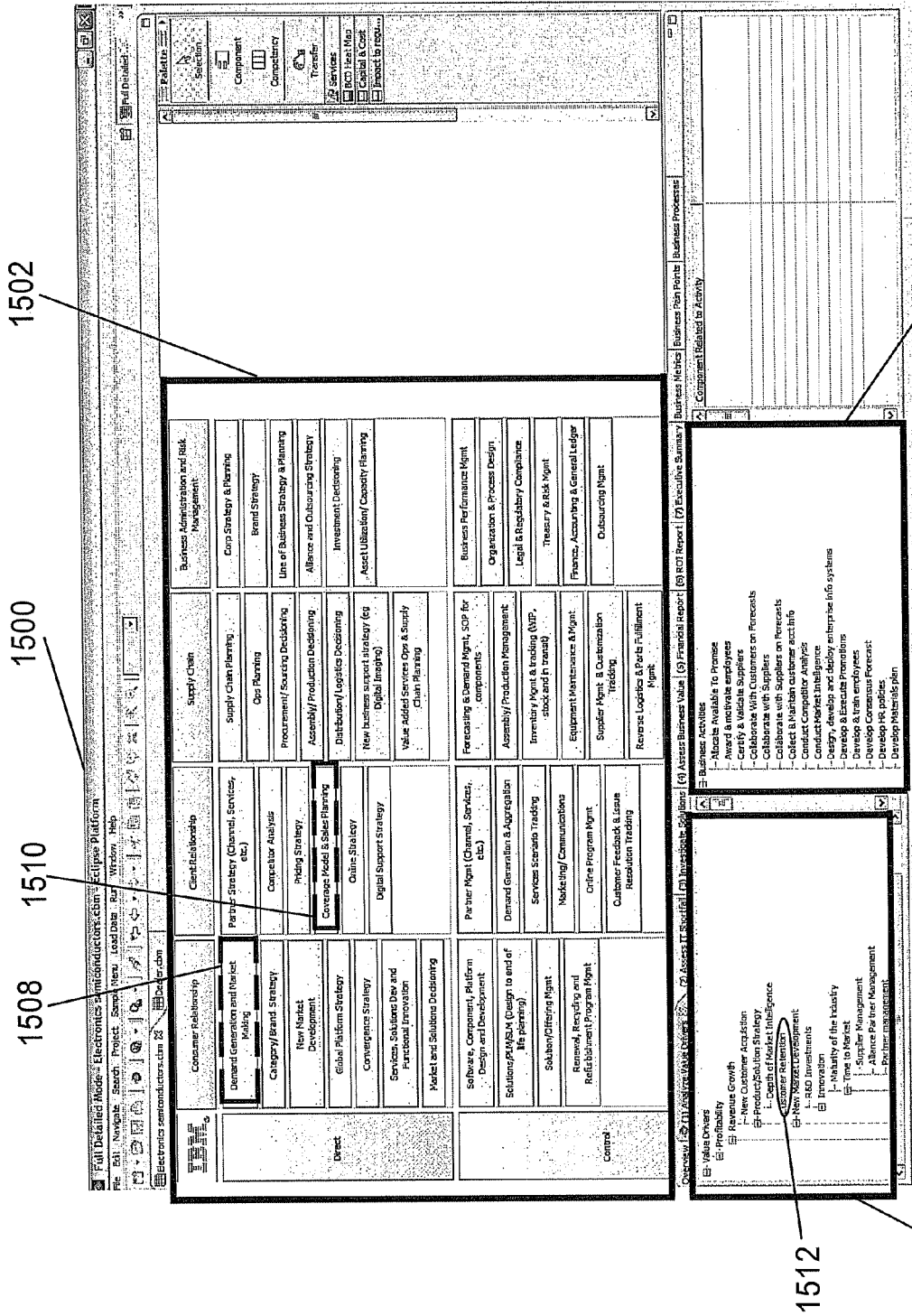
FIG. 15 illustrates an example of a business map according to embodiments of the invention.

FIG. 15 illustrates an example of a business map 1500 according to embodiments of the invention. The business map 1500 contains the component business map 1502, the value driver tree 1504 and the business activities 1506. The business maps generated in embodiments of the invention utilize industry standard taxonomies of business processes and metrics such as American Productivity and Quality Center (APQC) Process Classification Framework, and their relationship to value drivers and business components. Additionally, embodiments of the invention allow the user to customize the industry standards to the needs of a specific enterprise, and import and export the enterprise-specific value driver trees. The business map aids the user in various qualitative analysis methods including dependency analysis, heat map analysis, shortfall assessment, and solution identification.

Dependency analysis allows the user to explore the business maps and understand the correlations and dependencies among business entities. For examples, this capability can interactively identify one or more business components associated with a particular value driver within the value driver tree 1504. Conversely, the dependency analysis can find one or more value drivers that are affected by the performance of a particular business component. The associations between value drivers and business components are discovered through their relationships with business processes and activities. Similarly, the estimation system (100, 100') can identify and show dependencies between business activities and IT applications, and also between business activities and solutions, both IT and business-driven. Furthermore, the relationships are transitive, and so it is possible to infer the associations between value drivers and IT applications/solutions, and also between components and IT applications/solutions, and so on.

The estimation system (100, 100') supports the dependency analysis by capturing the basic relationship information in the estimation system's (100, 100') business model. The user, using the form-based questionnaires 112, populates the explicit relationship data, in the database. The system utilizes a Semantic Query Engine to infer implicit relationships among various business entities by using the explicit relationships and their logical properties. To provide the inference capability, the system utilized W3C's OWL (Web ontology language) semantic Web markup language, and the SnoBase Ontology Management system developed at IBM's Watson Research Center. The SnoBase system programmatically supports ontology needs of applications in a similar way a database management system supports data needs of applications. For programmers, SnoBase provides a Java applications program interface (API) referred to as Java Ontology Base Connector (JOBC), which is the ontological equivalent of Java Data Base Connector (JDBC). JOBC provides a simple-to-use but powerful mechanism for application programmers to utilize ontologies without dealing with the details of ontological information. In addition, SnoBase supports a number of query languages (QL), including a variant of OWL-QL and RDQL as ontological equivalents of SQL of relational database systems.

Heat map analysis is an essential capability of component business modeling (CBM), where a user discovers one or more "hot" (areas of concern) components that are associated with one or more business strategies and/or pain points (deficiency points). In the traditional CBM analysis, the analyst depending on their knowledge and expertise in the business domain conducts heat map analysis manually. The estimation system (100, 100') has automated heat map analysis by taking values into account with the dependency analysis. First, the estimation system (100, 100') allows the user to explore the value driver tree 1504 to identify one or more value drivers that may be associated with a certain business strategy/pain point. The discovery of "hot" components that affect the business strategy can be accomplished by executing a simple semantic query to the business model represented in OWL. The estimation system (100, 100') colors the identified hot components differently to distinguish the components that affect positively or negatively on the implementation business strategy. The estimation system (100, 100') compares the industry benchmark values stored in the knowledge repository 130 and the as-is values of the operational metrics and performance indicators associated with the components to decide on their color. FIG. 15 displays a heat map showing a couple of example hot components (1508, 1510) affecting positively to a value driver, "Customer Retention," which is highlighted 1512 in the value driver tree 1504.

The shortfall assessment allows a user to map the existing IT infrastructure against the "hot" components identified in the heat map analysis. The shortfall assessment helps a user understand how the current IT infrastructure, such as applications and network capabilities, supports the business, especially, for those hot components. The analysis requires collecting the information on the current IT infrastructure and representing it in a semantic business model in OWL. The mapping the IT applications and capabilities to the components becomes, again, an execution of a simple semantic query to the semantic model.

The system (100, 100') visualizes the mapping on the CBM map by overlaying IT applications on components. A user can then visually classify possible IT shortfalls into several types. Typically, four types of opportunities tend to arise. First, a gap indicates that a hot component does not have any IT support. The enterprise may want to consider an IT investment to improve the component's performance and support the intended business transformation. Second, duplication indicates that a component is supported by multiple IT applications, possibly, deployed over time. The business may want to consolidate the applications to improve performance and reduce cost in communication and maintenance overhead. Third, a deficiency indicates that the current application lacks key functionality, or is poorly designed, and so incurs a project opportunity. Finally, an over-extension indicates that a system designed to support one business component is extended beyond its core capability to support others. Different definitions for the shortfall types may apply. With precise definitions of the shortfall types, the estimation system (100, 100') also automates the shortfall classification and recommends to a user the initially identified shortfalls.

It is important to note that an IT system can be involved with multiple situations. The value model of the estimation system (100, 100') takes that fact into account, with an optimized plan for implementation projects to maximize the investment. An integrated management approach such as project portfolio management ensures that the project opportunities are effectively taken into account, that the best use is made of available resources by applying them to the highest priority opportunities, that the projects are regularly assessed, and that management actions are taken to keep them aligned with objectives.

Once IT shortfalls are identified and classified, one or more solution catalogs are consulted in the knowledge repository 130 to provide information on various IT and business solutions to address the shortfalls and support the intended business transformation. The estimation system (100, 100') allows the user to explore the solution space to identify one or more solutions that may address one or more shortfalls of interest. The discovery of solutions for supporting components associated with a shortfall can be automatically conducted by executing a semantic query that correlates solutions and components by using their relationships to business activities. In addition, the estimation system (100, 100') allows the user to manually correlate solutions and components, if desired. If there is no prefabricated solution available from existing solution catalogs to support a certain hot component and/or an IT shortfall, the estimation system (100, 100') helps the user start composing a new solution, by providing a link to a solution composer tool, such as IBM's WebSphere Business Modelers, which utilizes and supports service-oriented architecture.

In terms of quantitative value oriented business analysis the estimation system (100, 100') performs solution value estimation, value modeling, and generating business reports.

Solution value estimation allows the user to calculate the expected value of value drivers when one or more solutions are implemented in the context of business transformation. The details of the value modeling supporting this quantitative analysis will be given below. The calculation uses as input the as-is value of value drivers and the contributing factors of solutions to metrics that are associated with leaf nodes in the value driver tree (see FIG. 16). The expected values are calculated for a subset of the value driver tree, containing all the leaf node value drivers that are directly affected by the solution(s) and all their ancestors that are indirectly affected.

Once specific improvement opportunities for the target performance indicator are identified, the specific improvement opportunities can be prioritized, based on a value-model analysis of each opportunity. The value model takes into account factors such as implementation cost, potential savings, increased revenue, reduced risk, and other financial metrics such as ROI and net present value, net profit margin and asset turnover ratio, and also improved key performance indicators (KPI), such as customer satisfaction, time for fulfillment, productivity and product quality. Based on this value and the risk assessment models, the opportunities can be quantitatively understood in terms of measurable value.

An in-depth value analysis of individual opportunities can show the detailed benefits of the IT project in terms of measurable value. For example, a duplication situation provides an opportunity for a consolidation project. The value analysis of this solution offers details of the project, including cost savings by shutting down multiple, inadequate systems, the investment required for implementing a single consolidated system, a comparative analysis of implementing a new system versus integrating and improving existing systems, desirable financial metrics such as ROI, reduced risk, and improved KPIs such as time for fulfillment and increased productivity. This analysis allows the enterprise to make services/solution decisions based on the values, costs and priorities for business transformation.

The value model of the estimation system of the present invention models both tangible returns such as cost savings and intangible benefits such as productivity enhancement, while most existing ROI analysis tools focus on direct benefits. This additional capability of modeling intangible benefits is important because direct returns in cost reduction make up only half of technology ROI.

Figure 16:
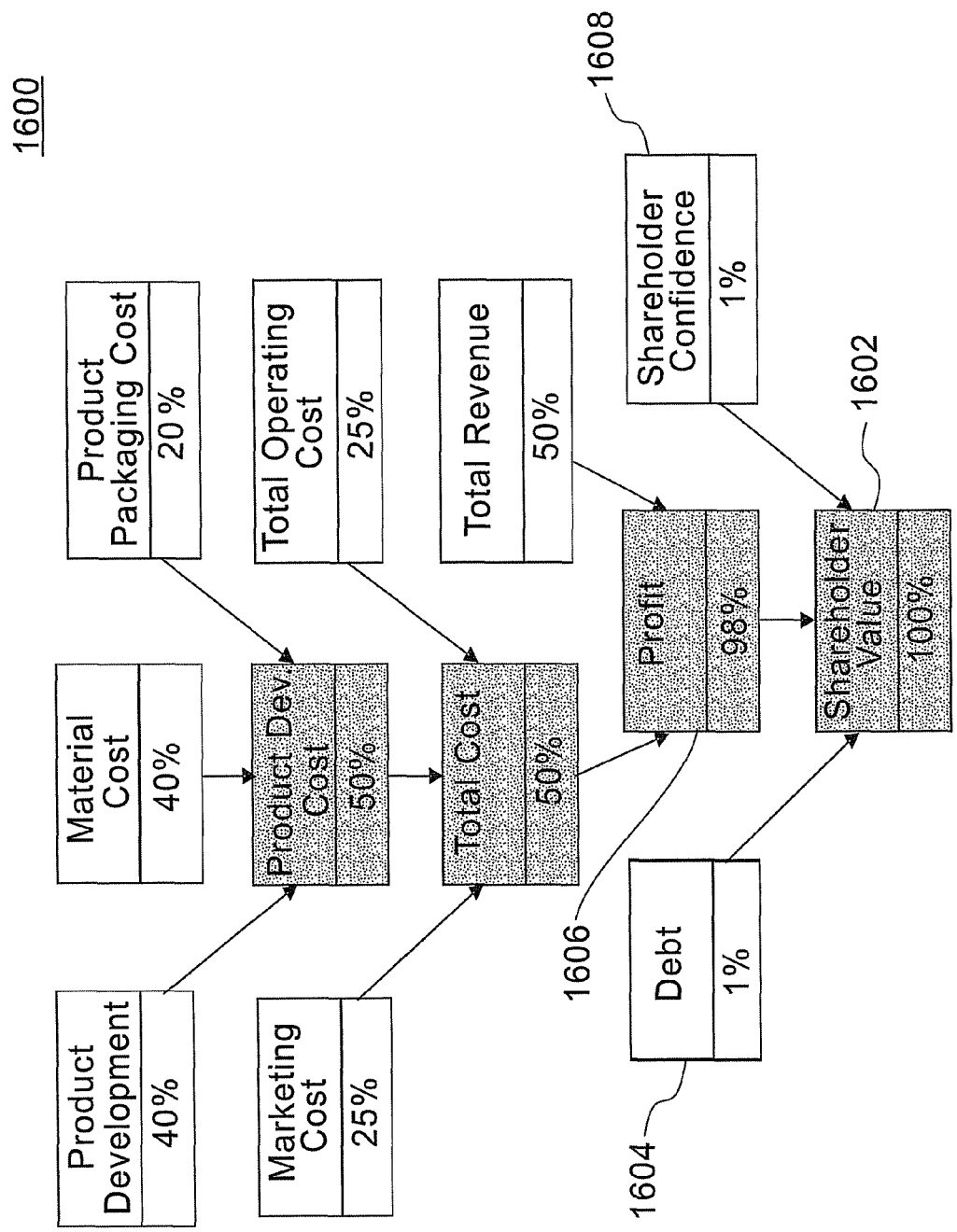
FIG. 16 illustrates an example of a value tree according to embodiments of the current invention.

The value model, of embodiments of the present invention, captures business impact at the measurable metric level and translates it into business value of generic value drivers such as revenue growth, margin improvement, and increased capital efficiency. For this purpose, the model provides a hierarchical structure of value drivers and metrics. FIG. 16 illustrates an embodiment of a hierarchical structure 1600 that is referred to as a value driver tree, where the root 1602 is the shareholder value or profitability, and the leaf nodes are measurable operational metrics. The leaf metrics nodes are connected to the root through multiple layers of performance indicators and value drivers. The initial framework of a value driver tree can be derived from a standard such as the metrics tree associated with the APQC Process Classification Framework. The skeleton metrics tree is customized for a specific business in practice. The linkage between any two nodes in the value driver tree is signified by the impact level of a child to its parent, where the impact levels of all children add up to 100%. For example, debt 1604 (1%), profit (98%) 1606, and shareholder confidence (1%) 1608 are children of the parent shareholder value 1602, and add up to 100%. The impact levels can be derived by mining empirical data from the estimation knowledge discoverer/collector 128 and knowledge repository 130, or assigned speculative values in a form based questionnaire 112 for sensitivity analyses.

Figure 17:
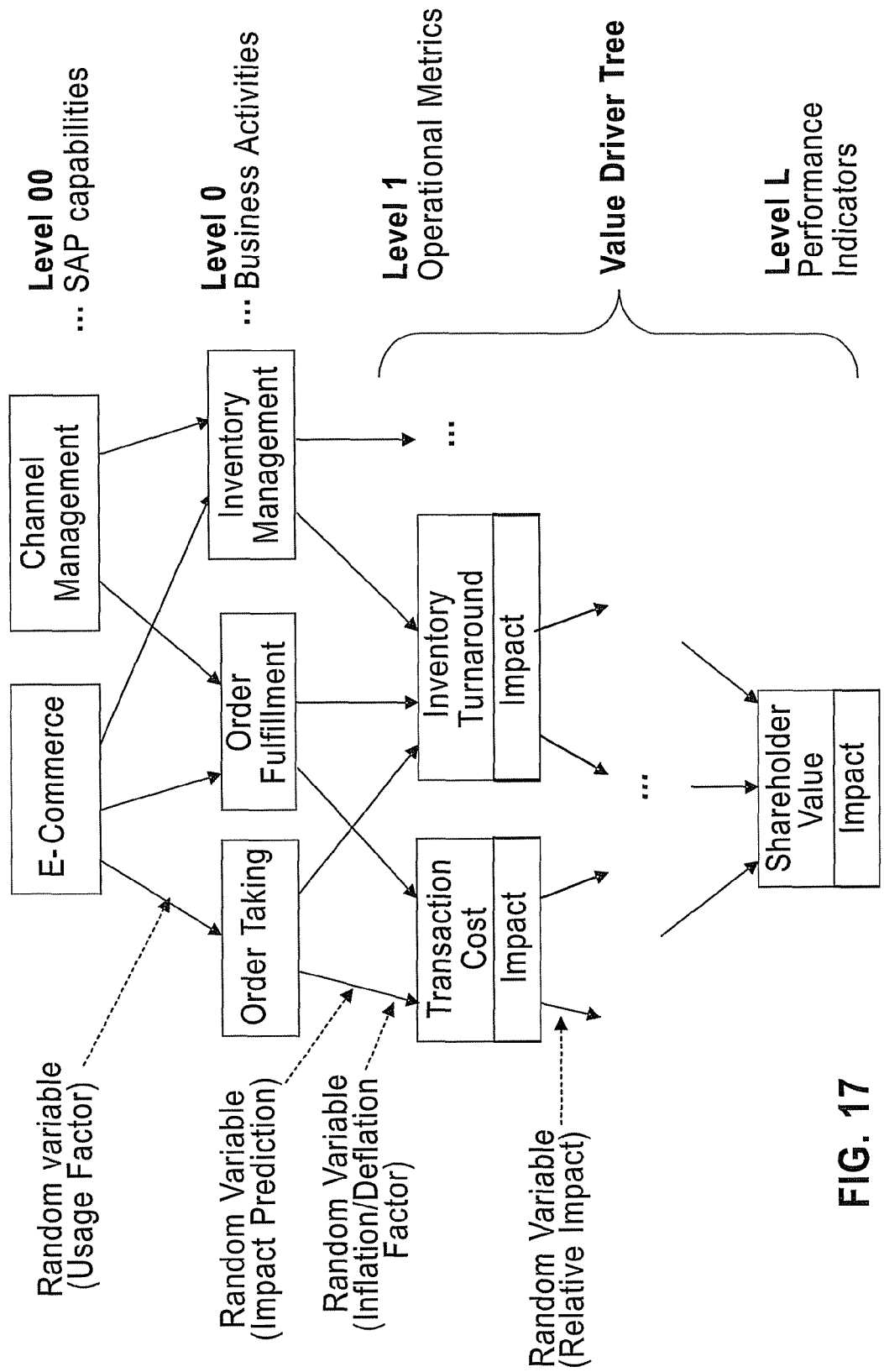
FIG. 17 illustrates an extension of the value tree of FIG. 16 to operational and business level activities according to embodiments of the current invention.

The estimation system's (100, 100') value engine (financial benefit estimator 123) calculates the expected values of a set of value drivers that are affected by the implementation of one or more IT solutions and/or business capabilities. To support this calculation, the value model extends the value driver tree (FIG. 16) by linking IT capabilities and solutions to business activities, and to operational metrics in the value driver tree (FIG. 17). Additionally, the expected value calculation requires user input for certain edges in the trees. First, the expected value calculation requires the usage factor on each edge between an IT capability and a business activity, which indicates how much of the activity the IT capability is used for. Second, it requires the improvement factor on each edge between an activity and a metric node, which indicates how much the metric is improved by the IT capability. Again, the user input values can be derived by mining empirical data or assigned speculative numbers (through form-based questionnaires 112) for sensitivity analyses.

The value engine (financial benefit estimator 123) uses a recursive algorithm to calculate the expected values of value drivers affected by one or more IT capabilities. The mean value of a node, $n_p$, in the value driver tree is derived as follows:

$$E[n_P] = \sum_{i=1,k} (E[n_{c_i}] \times E[e_{c_i}])$$

where $E[n_{c_i}]$ and $E[e_{c_i}]$ are the mean of a child node $n_{c_i}$ and its edge to $n_p$, respectively, and k is the number of children $n_p$ has.

The estimation system's (100, 100') value engine (financial benefit estimator 123) provides a robust sensitivity analysis for validating various value propositions, because it can take the impact factors in range and present the expected business values in confidence intervals. Also, it can capture synergistic or cannibalizing effects of different IT capabilities and solutions as separate user input (referred to as inflation and deflation factor) and take it into account for the value calculation. In addition, the engine can capture statistical dependencies via correlations. Finally, mapping value drivers to standard financial measures and ROI terms for generating business reports can extend the value model.

As results of the business analyses, both quantitative and qualitative, the estimation system (100, 100') of embodiments of the present invention can generate a number of business intelligence reports, utilizing the presentation logic 104 and project plan and estimation report output generator 126, for an executive summary of the analyses, including sophisticated interactive charts, as follows: (1) Value Driver Report, which summarizes the impact of investments in terms of value drivers in a structured format, with a number of illuminating interactive charts; (2) Financial Measure Report, which translates the impact of the solutions on value drivers to a set of standard financial measures, again, with a number of illuminating interactive charts. A sample report is shown in FIG. 6; and (3) ROI Report, which translates the impact of the solutions into a set of cash flow measures over time and provides the benefits of the investments in terms of standard ROI terms.

FIGS. 18A-18E illustrate the interactive and graphical features of estimating financial benefits and financial reporting according to embodiments of the invention.

Figure 18A:
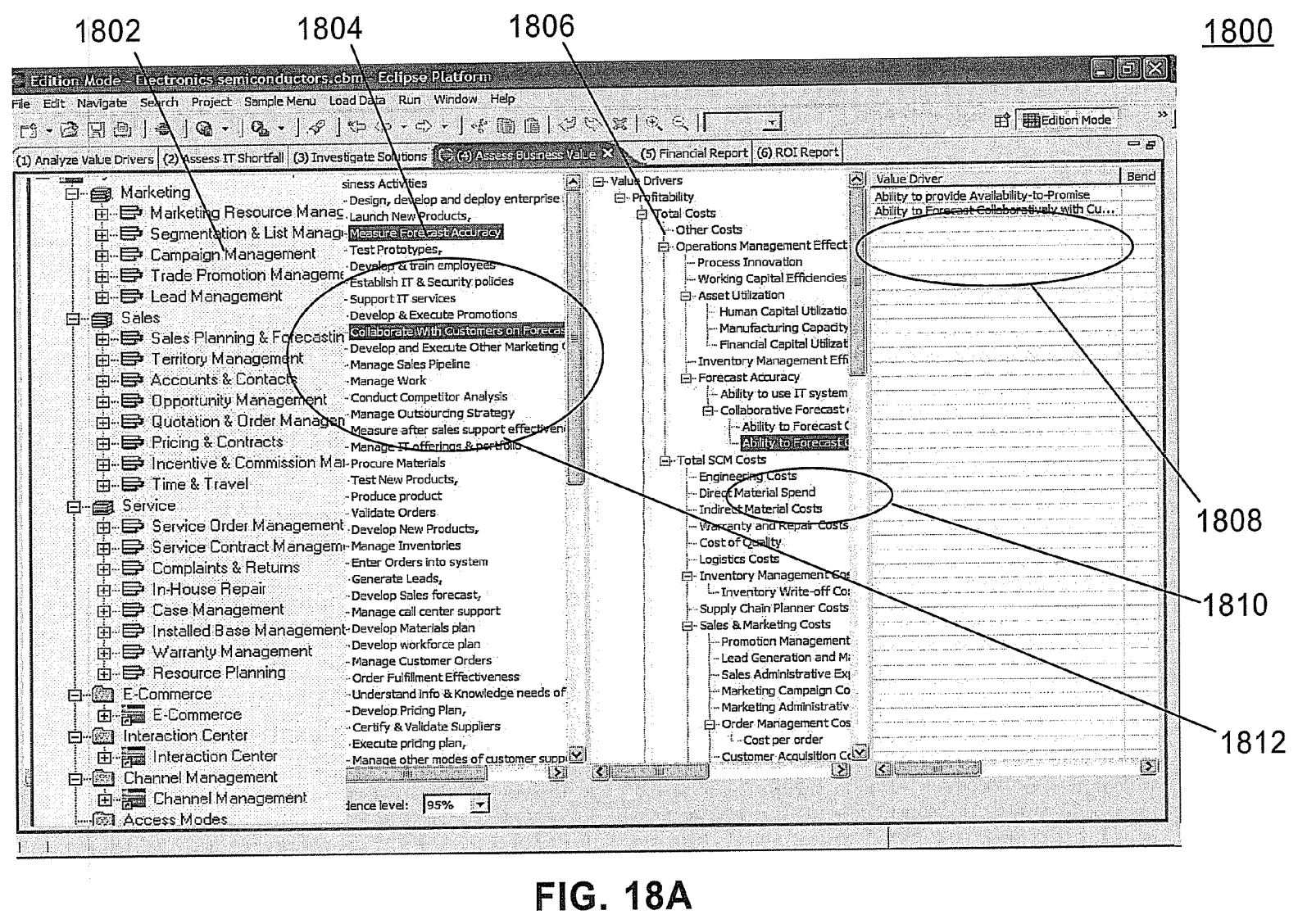

In the example screenshot 1800 of FIG. 18A the leftmost column 1802 represents the capabilities of the packaged application software. The available business activities are listed in the next column 1804, which link back to the capabilities required once the customer requirements—value drivers 1806 to impact are identified via the form-based questionnaires 112. Mapping of drivers 1808 to levers 1810 to activities 1812, along with key metrics identified and correlated is pre-configured in embodiments of the invention.

Figure 18B:
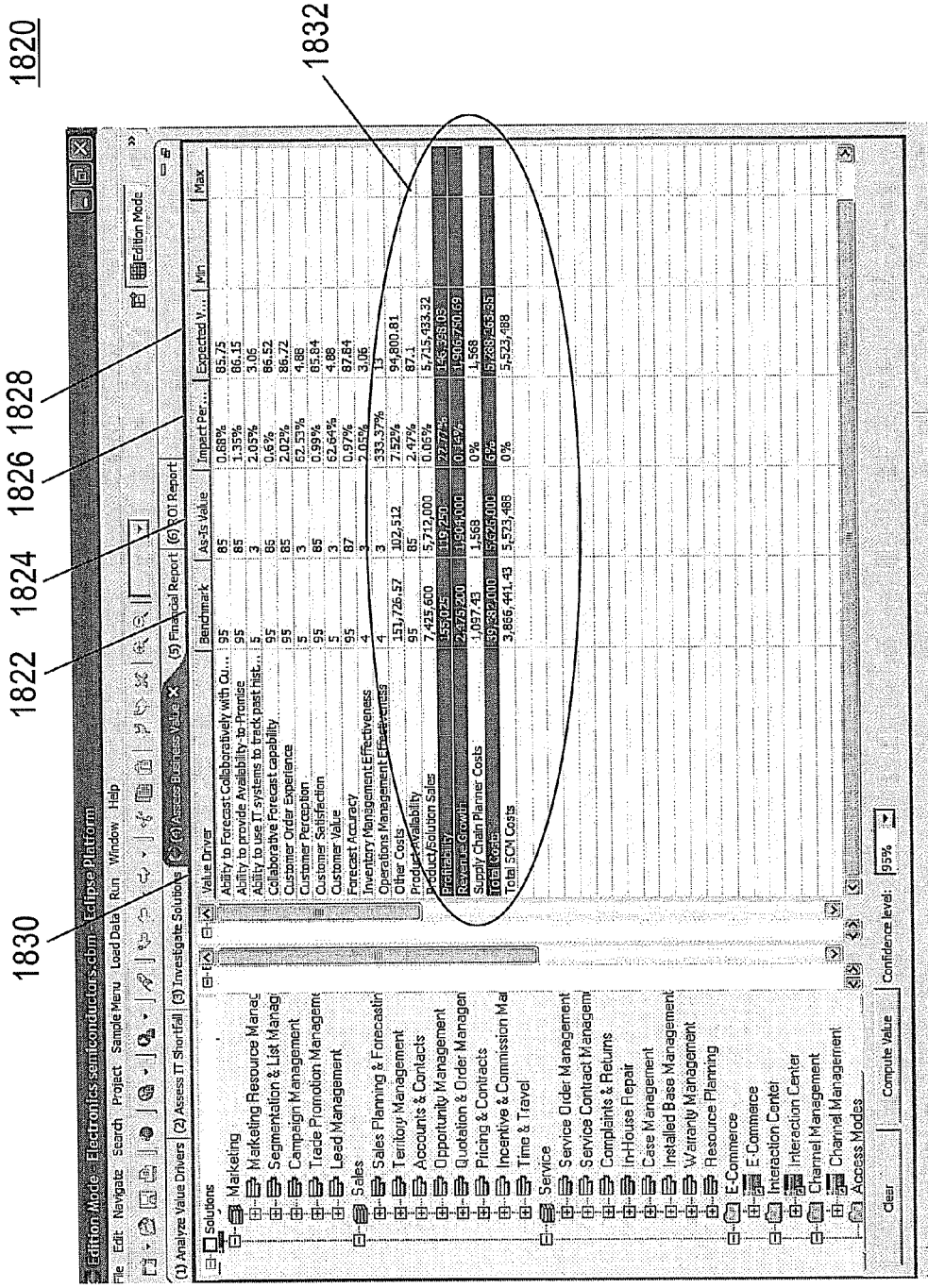
Figure 18D:
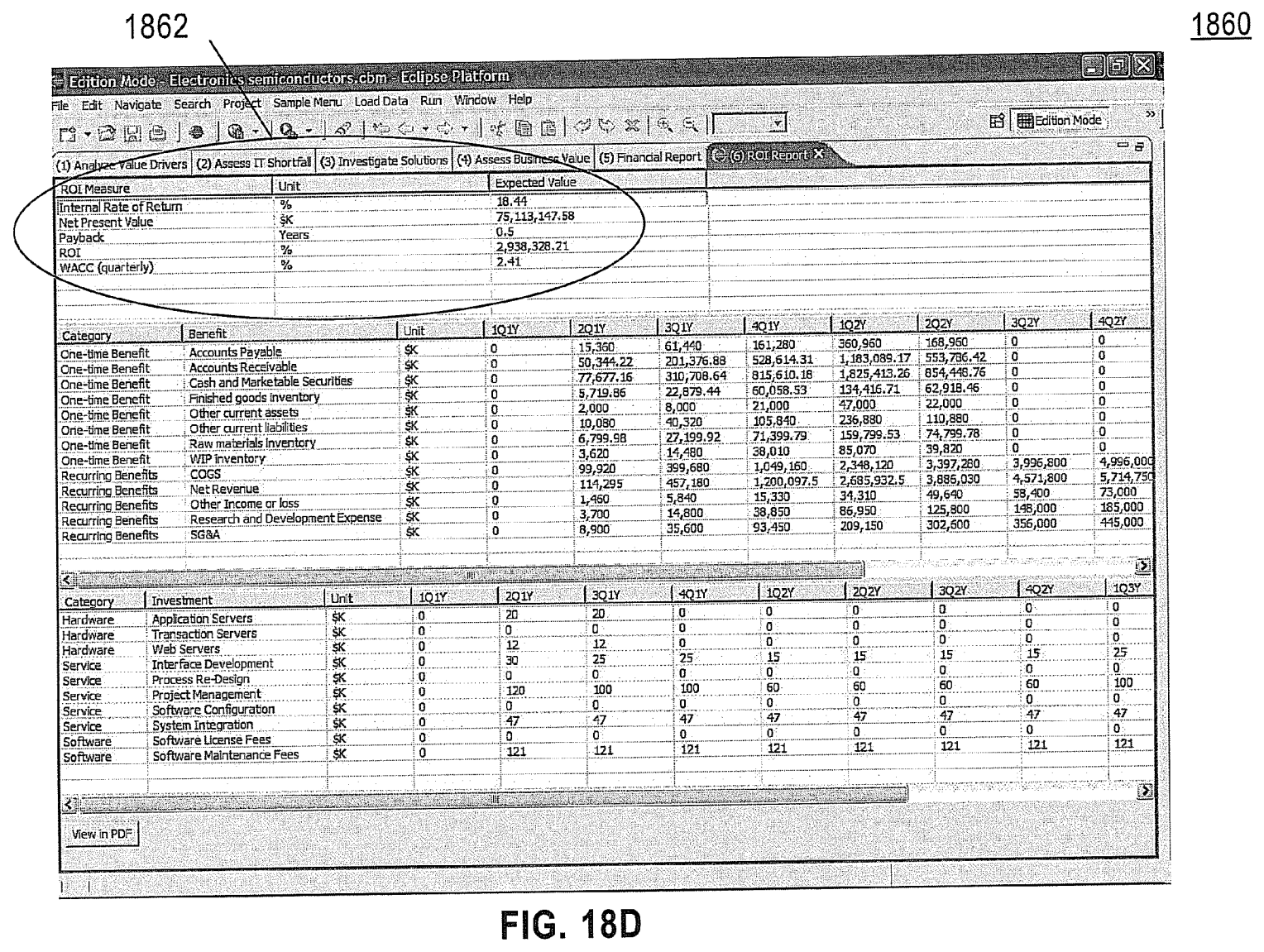
Figure 18E:
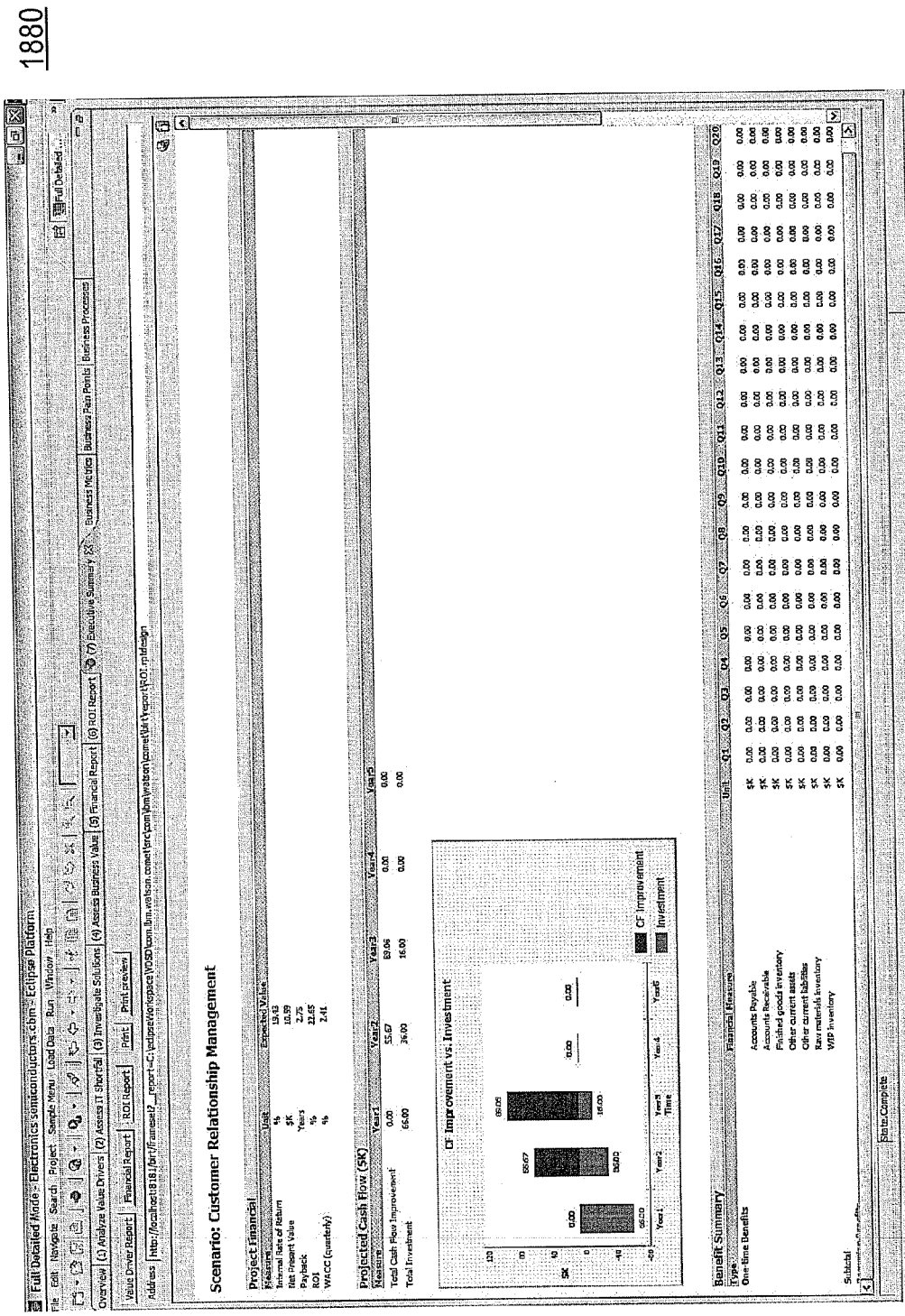

In the example screenshot 1820 of FIG. 18B, the impact of a packaged software application implementation on the expected high-level value drivers is shown. The benchmark data 1822 is based on previous implementations of the packaged software applications, which are stored in the knowledge repository 130. The as-is values 1824 of the value drivers 1830 are the client's current situation prior to the implementation of the packaged software application. The impact percentage 1826 is the expected change in the value driver 1830 that results in the expected value 1828. The impact on bottom line financial results 1832 is also shown. In a similar fashion, FIG. 18C is a screenshot of the financial impact of the implementation of the packaged software application as a result of the collected data and value modeling. FIG. 18D provides users an analysis report with key financial parameters 1862 for determining the validity of an investment, including Internal rate of return (IRR), net present value (NPV), payback, rate of return (ROI), etc. FIG. 18E is a screenshot 1880 that provides charts that are related to investment return scenarios.

Embodiments of the present invention employ value-based pricing for services related to the implementation of a packaged software application. Value-based pricing differs from cost-based that is based on time and materials. In value based pricing there is high level of shared pricing risk and shared pricing reward between the client and the provider of the service. The provider and client share upfront costs of the service or solution, and then share downstream revenue generated by the new product or service. The value-based pricing with a high degree of sharing is best for when organizations have a culture and internal governance that supports partnering. Value-based pricing may also be based on gain sharing and business-benefits-based, where the provider is paid in proportion to the business value generated by the project or service, such as percentage of increased profit or reduced operating expenses. Therefore, there is an incentive for the service provider or vender to meet predefined business goals or other relevant success metrics for an engagement.

Figure 19:
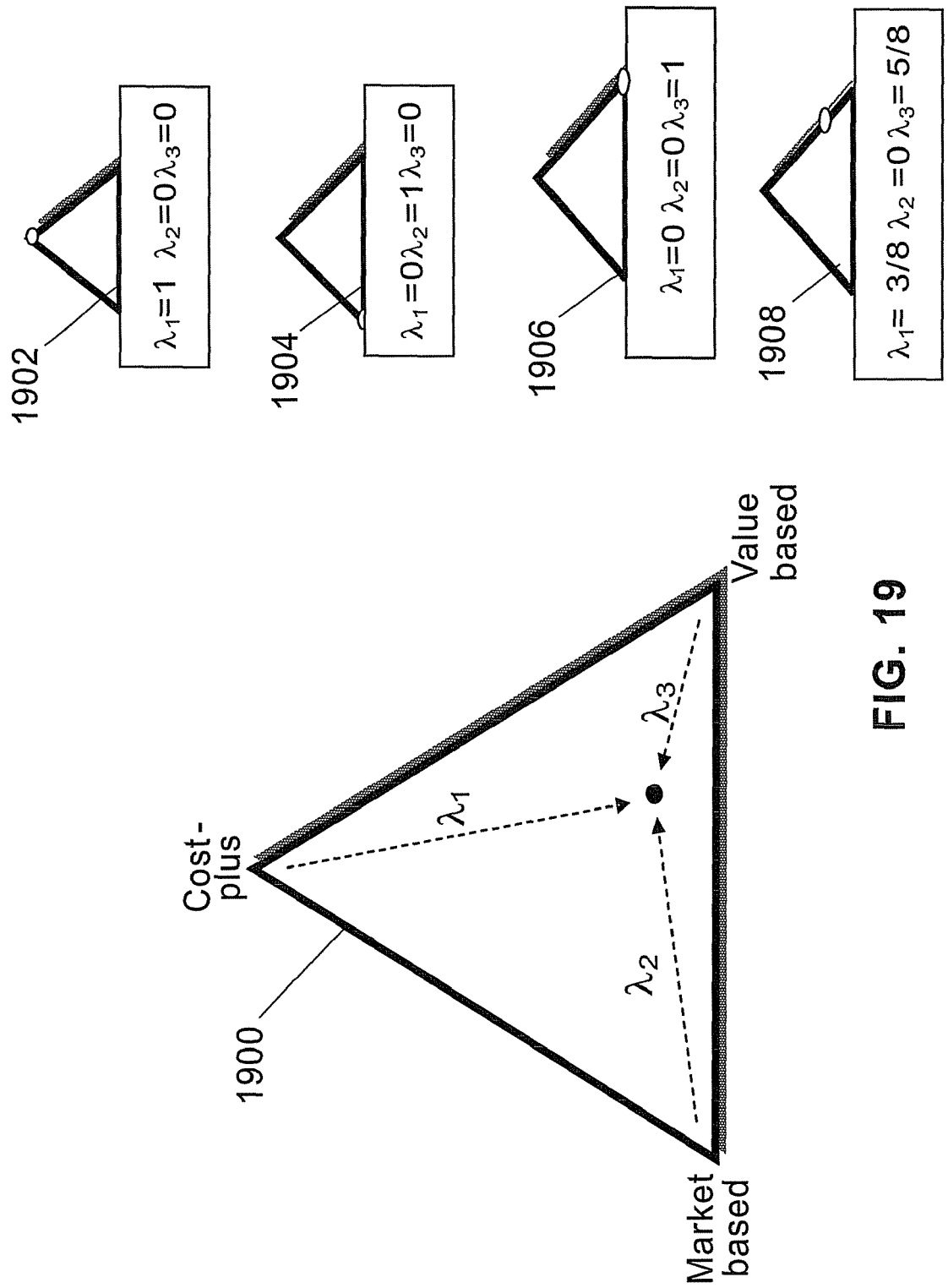
FIG. 19 illustrates a hybrid pricing approach according to an embodiment of the invention.

A hybrid pricing approach is also utilized in embodiments of the invention. Hybrid pricing is based on cost-plus, market based, and value-based pricing, which are weighted by $\lambda_1, \lambda_2, \lambda_3$, respectively. The weights vary between 0 and 1, and $\lambda_1+\lambda_2+\lambda_3=1$. In FIG. 19 a hybrid pricing plan that is primarily value-based (followed by market-based, and cost-plus) is shown in triangle 1900. Triangle 1902 is a graphical representation of a hybrid pricing plan, which is essentially a cost-plus plan. In the same manner, representations 1904 and 1906 are essentially market-based and value-based pricing plans, respectively. In the graphical representation 1908 the pricing plan is primarily value-based with some aspects of cost-plus pricing.

Embodiments of the invention also provide a model-driven approach to the generation of generic project estimation models for packaged software applications. The estimation system (100, 100') of the current invention has an estimation knowledge base 106 that has an estimation knowledge discoverer and collector 128, which connects to various sources 136 (including empirical data from the project plan and cost estimation report 126, historical and empirical data—internal cases prior to and after implementation of embodiments of the present invention, and data from external sources,—the Web (Internet), packaged application software vendors (ISV), information from existing installations—data mining (crawler)), and collects knowledge and information relevant to estimation, including historical data of prior estimation cases contained within a knowledge repository 130. The collected knowledge and data is culled and analyzed by a model refiner 132. If validated, certain knowledge (in the form of rules and ontology) is learned by the model refiner 132, which, in turn, conveys the newly found knowledge to the estimation models as parameters that are represented in the estimation knowledge base 106. The object controller/knowledge base manager 120 controls the estimation knowledge base 106.

Figure 20:
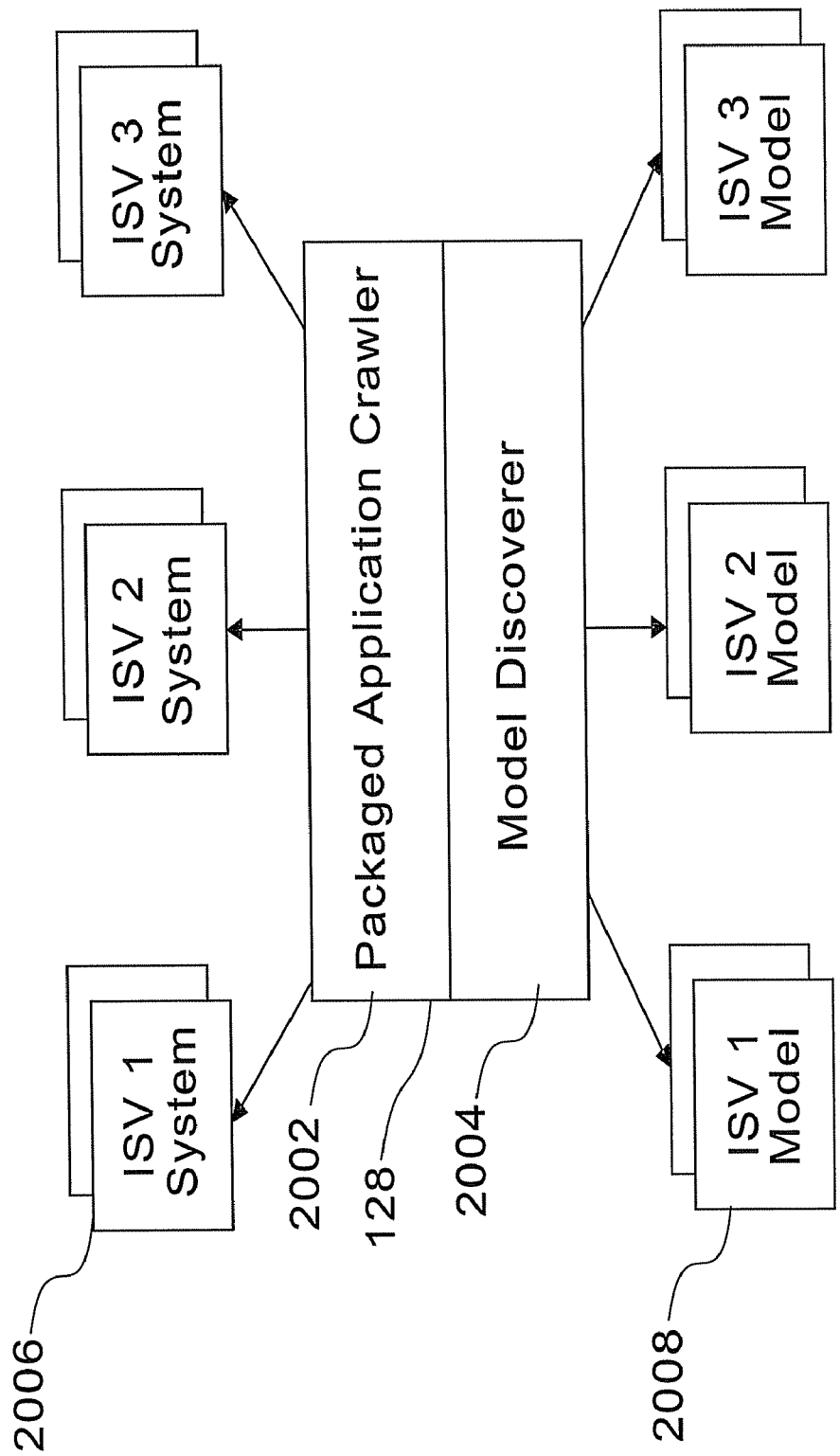
FIG. 20 illustrates an estimation knowledge discoverer/collector with its interaction with external information sources according to an embodiment of the invention.

FIG. 20 illustrates the estimation knowledge discoverer and collector 128 that is made up of a packaged application crawler 2002, and a model discoverer 2004. The packaged application crawler 2002 finds external installations of packaged software applications 2006 from various independent software vendors (ISV). The crawler collects relevant information on the model parameters of the packaged software applications 2006. The model discoverer 2004 analyzes the information collected by the crawler 2002, and derives unified modeling language (UML) models 2008 to be used for MDA ((Model-Driven Architecture)—MDA is a software design approach introduced by the Object Management Group (OMG) that supports model-driven engineering of software systems) code generation. The model discoverer 2004 also derives estimation parameter values for configuration.

Figure 21:
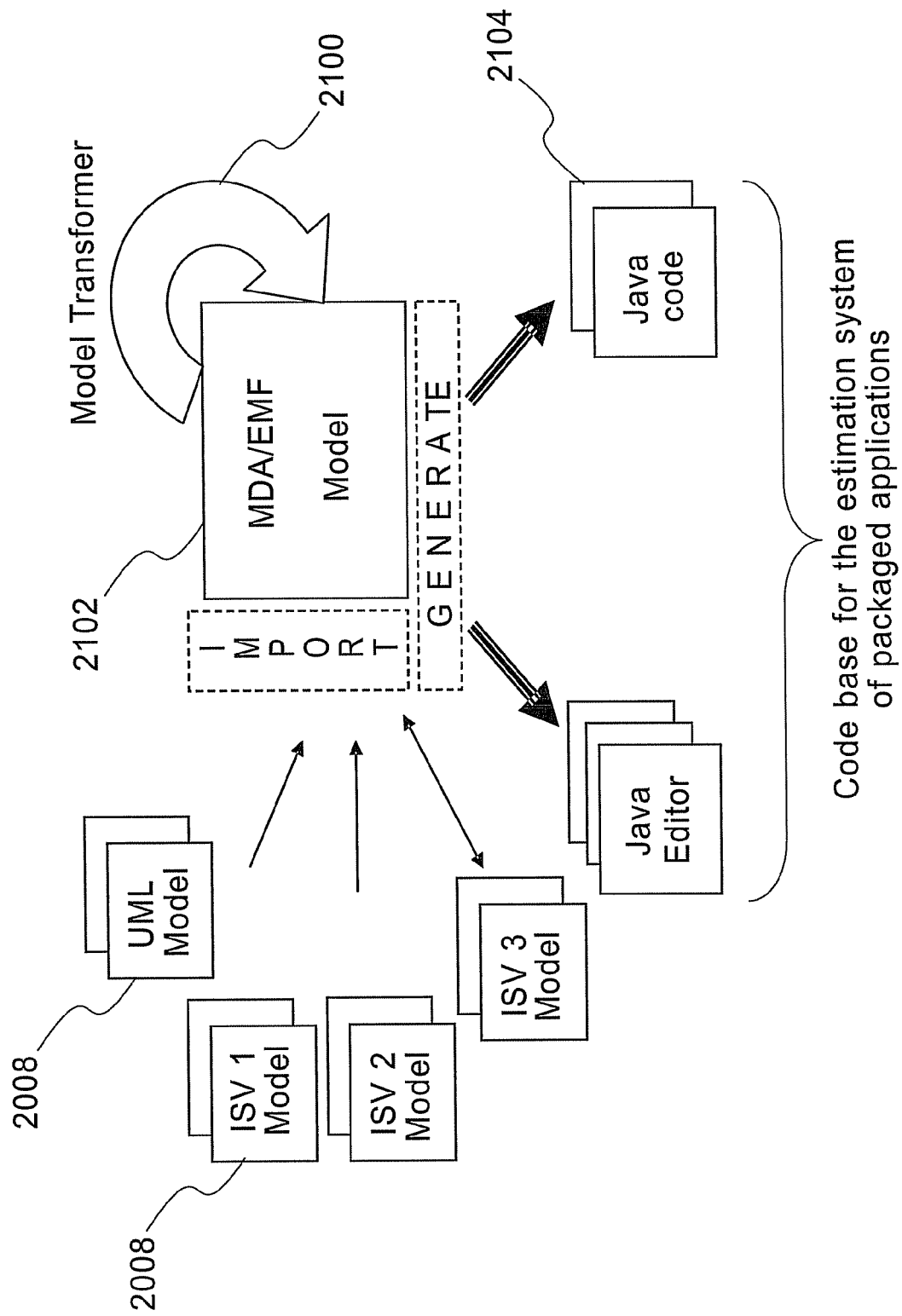
FIG. 21 illustrates a model transformer and its interaction with external information sources according to an embodiment of the invention.
Figure 22:
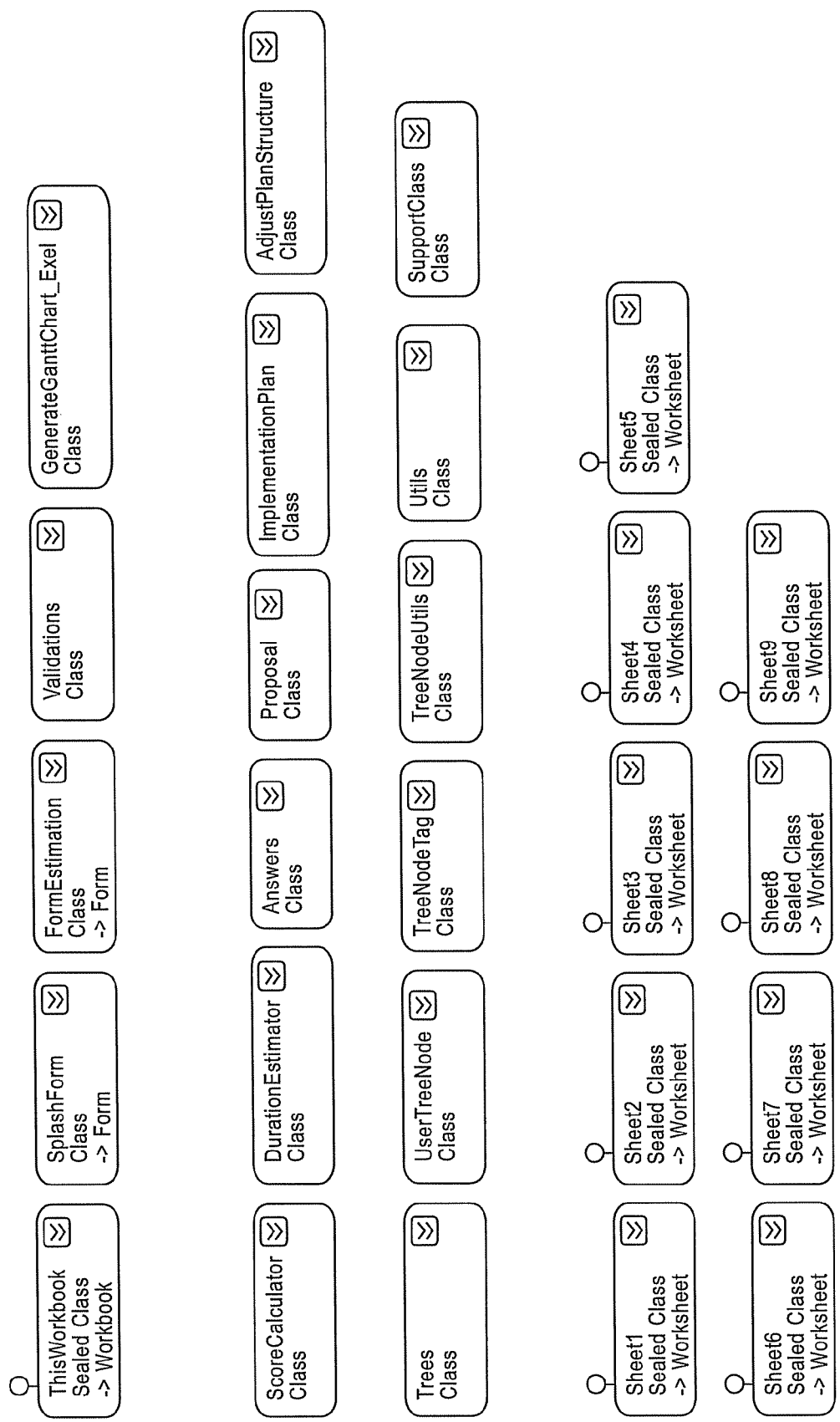
FIG. 22 illustrates a class diagram of a UML model according to an embodiment of the invention.

FIG. 21 illustrates a model transformer 2100 and its interaction with external information sources consisting of UML models 2008 according to an embodiment of the invention. The model transformer 2100 utilizes the MDA/EMF (Eclipse Modeling Framework) models 2102 to import the UML models 2008 and estimation parameter values derived for each packaged application 2006, and transforms the separate UML models 2008 into a single universal model for project estimation, as well as a generate basic code (with graphical user interfaces) for a generic (platform independent code) estimation system for packaged application projects. The model transformer 2100 serves as an automated generator of estimation tools, and forms a portion of the underlying code for the estimation system (100, 100'). Examples of Java code 2104 that is generated by the MDA/EMF model 2102 are FIGS. 7-9. Software engineers build on the basic code base to develop a more complete estimation system for packaged application projects by adding various functionalities. Administrators configure the generic estimation system that is obtained from estimation knowledge base 134, for a particular situation including a particular packaged application from an ISV, client, region, platform, estimation method and parameter set, and other dimensions. FIG. 22 is a class diagram of UML models.

Figure 1D:
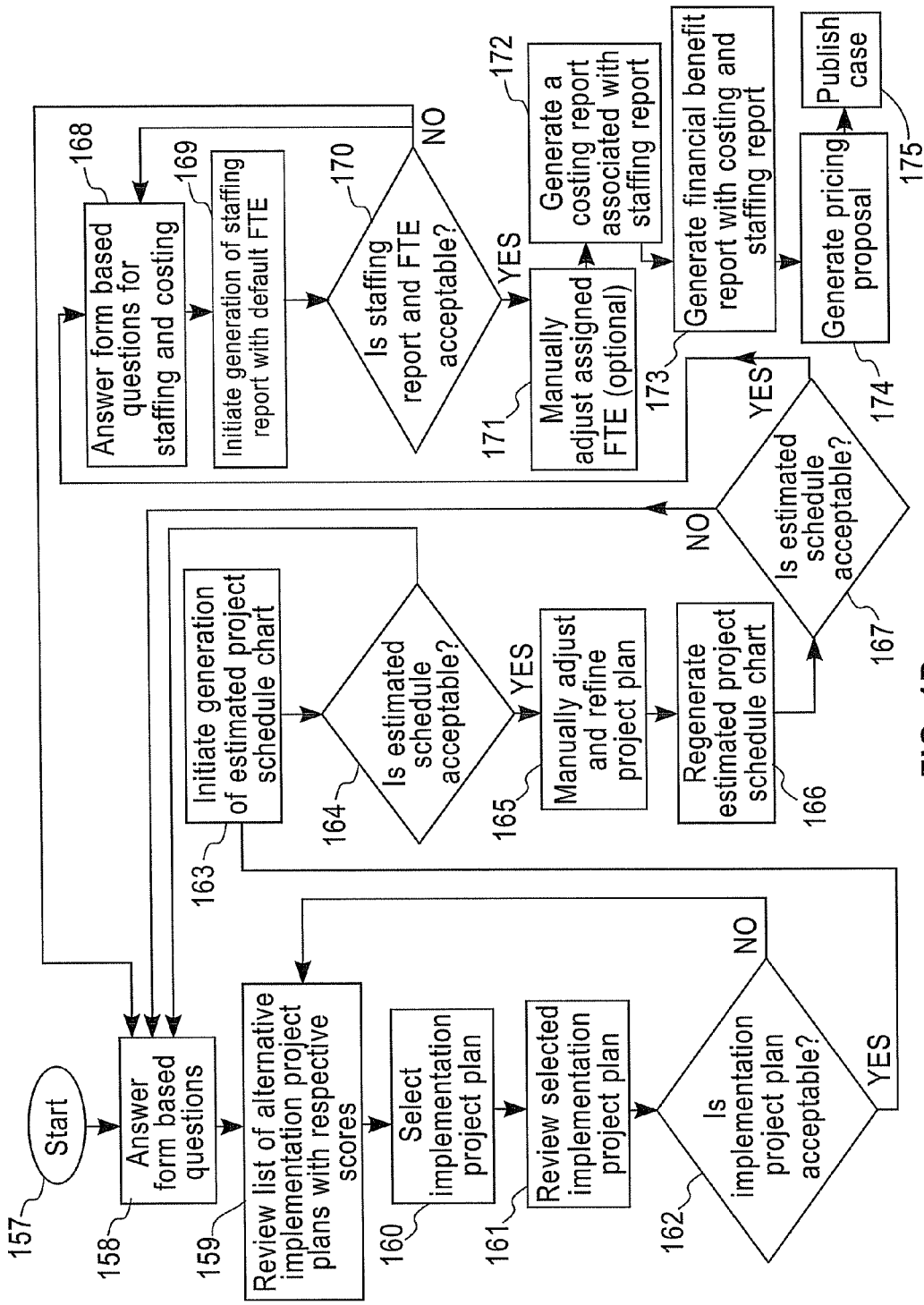
FIG. 1D is a flow chart from a user's perspective of a method for generating an implementation plan according to an embodiment of the invention.
Figure 1E:
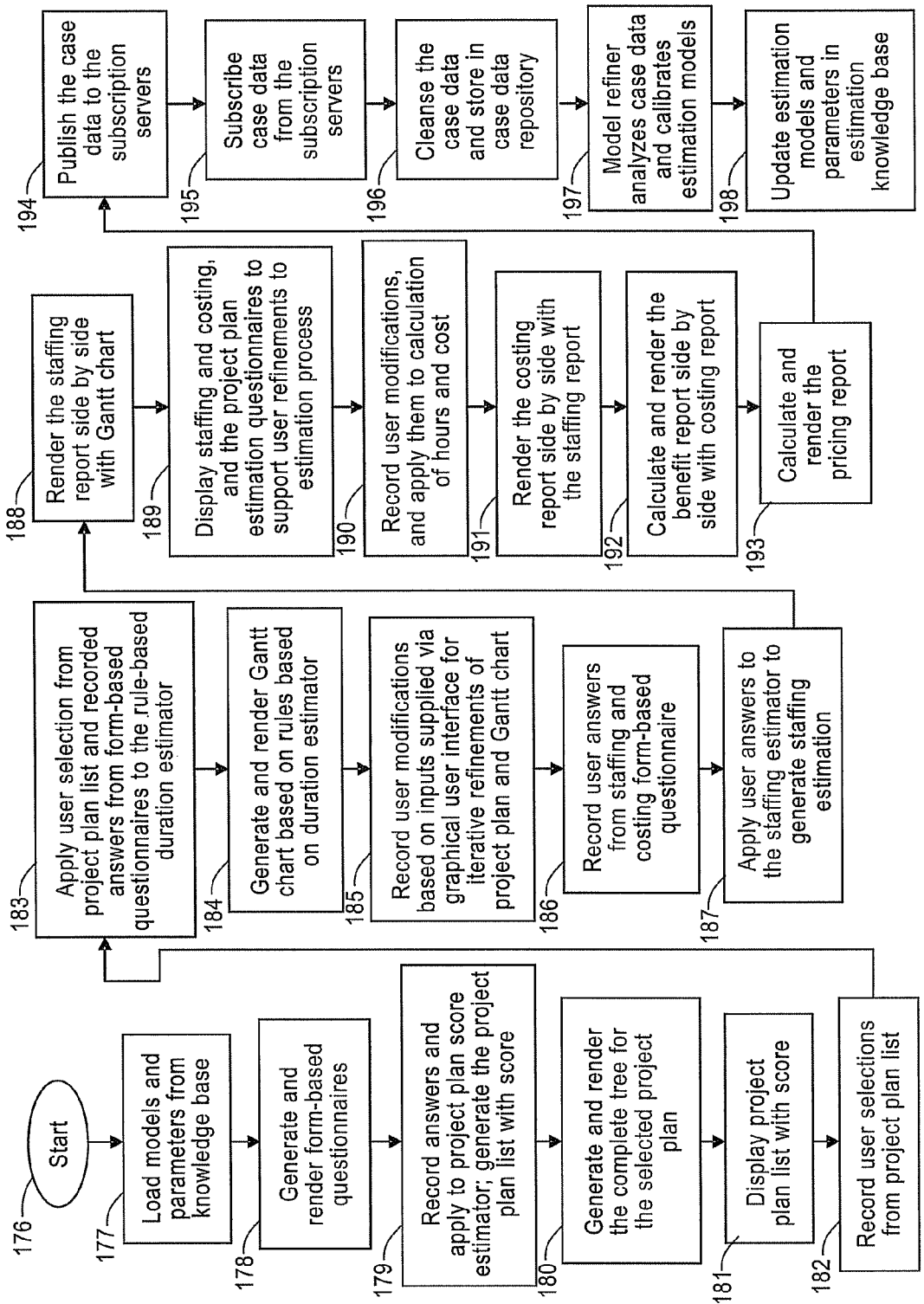
FIG. 1E is a flow chart from a system's perspective for facilitating a user in implementing a project plan through the method described in FIG. 1D according to an embodiment of the invention.

FIGS. 1D and 1E are flow charts that provide from a user's perspective a method for generating an implementation plan, and from a system's perspective the actions necessary to facilitate the user in generating the implementation plan, respectively, according to an embodiment of the invention. FIG. 1F illustrates in list form, the relationship between the user method of FIG. 1D and the system response of FIG. 1E according to an embodiment of the invention.

In FIG. 1D (in conjunction with FIGS. 1C, 1E, and 1F) a user starts (block 157) the process for estimating and generating implementation project plans for packaged software applications by answering a series of dynamically generated form based questionnaires (blocks 158, 112). Among the questions posed to the user include: basic informational questions, scope questions, and system questions. In response to the user initiating the process, the system 100' starts (block 176) by loading models and parameters (block 177) from the knowledge base 134, and generates and renders (block 178) the form-based questionnaires 112 in the graphical user interface—views 102. The system 100' records the user responses (block 179) to the form based questionnaires 112, and applies the answers to the project plan score estimator 118, and generates a project plan list with scores. The user reviews the alternative implementation project plans and their respective scores (block 159), and selects a plan from the list (block 160). In response to the user selection, the system 100' generates and renders a complete tree for the selected plan (block 180). The user views (102) and reviews the completed tree of the selected project plan (block 161), and can decide to iteratively go back (decision block 162) to review alternative project plans from the list (block 159). If the user does decide to go back to review the alternative project plans, the system 100' re-displays the project plan list with their associated scores (block 181). The user can then manually adjust the plan structures by selecting entries in the completed tree. The system 100' records the user's new selections (block 182), and applies the new selections (block 183) and the previous answers from the form-based questionnaires 112 to the rule-based duration estimator (116). Following the optional iterative process, the user initiates (block 163) the generation of an estimated project schedule chart (Gantt chart) by using a button, or other GUI means. In response to the user request, the system 100' renders (block 184) in the GUI—view 102 an estimated project chart (for example FIG. 10) based on the calculations of the rule-based duration estimator 116. At this point (decision block 164), if the user does not find the generated estimated schedule suitable, the aforementioned process steps can be repeated in an iterative fashion by returning to the form-based questionnaires (block 158) to refine the estimated project schedule chart, with the system 100' facilitating the iterative process (block 185). It is noted, that at anytime in the process the user can save their session file in a storage means, and comeback at a later point and resume the project planning process.

If the user decides that the estimated schedule is acceptable (decision block 164 is Yes), the user may (optionally) manually adjust and refine the project plan (block 165), and regenerate the estimated project schedule chart (block 166) before proceeding (decision block 167) in an iterative fashion as has already been described.

Following acceptance of the estimated schedule (decision block 167 is Yes), the user answers questions for staffing and costing estimation utilizing the form-based questionnaires 112 and the staffing and cost estimator 122. In response the system 100' records the user's supplied staffing and costing answers (block 186), and applies the user answers to the staffing and costing estimator 122 (block 187) to generate the staffing estimation. The user initiates (block 169) the generation of a staffing report with default FTE using a button, or other GUI means. In response to the user request, the system 100' renders (block 188) in the GUI—view 102 a staffing and costing report along side the staffing report. As before the system 100' supports (blocks 189) the user in iteratively going back to adjust and refine the staffing and costing via the form-based questionnaires related to staffing and costing (block 168) or by returning to the initial form-based questionnaires (block 158). If the user finds the staffing report and the assigned FTE acceptable (decision block 170 is Yes), the user can optionally adjust the assigned FTE (block 171) with the GUI 102, which the system 100' uses to calculate hours and cost (block 190). The user initiates (block 172) the generation of a costing report associated with the staffing report by using a button, or other GUI means. In response to the user request, the system 100' renders (block 191) in the GUI—view 102 a costing report along side the staffing report.

The user may also generate a financial benefit report along with the staffing and costing report (block 173) by using a button or other GUI means as supported by the system 100' (block 192). The user can also generate a pricing proposal for implanting the packaged software application project (block 174). Finally, the user can assist efforts in self-calibrating future project estimation models by publishing the entire case (answers, Gantt charts, staffing reports, costing reports, benefits reports, pricing reports) they have developed (block 175). In response to the user request to publish the case, the system 100' publishes the case data to subscription servers 138 (block 194), and subscribes data from the subscription servers (block 195). In addition, the case data is cleansed (block 196) and stored in the case data repository 130. A model refiner 132 analyzes the case data and calibrates the estimation models (block 197). Finally the estimation models and parameters in the estimation knowledge base 134 are updated (block 198).

Figure 1G:
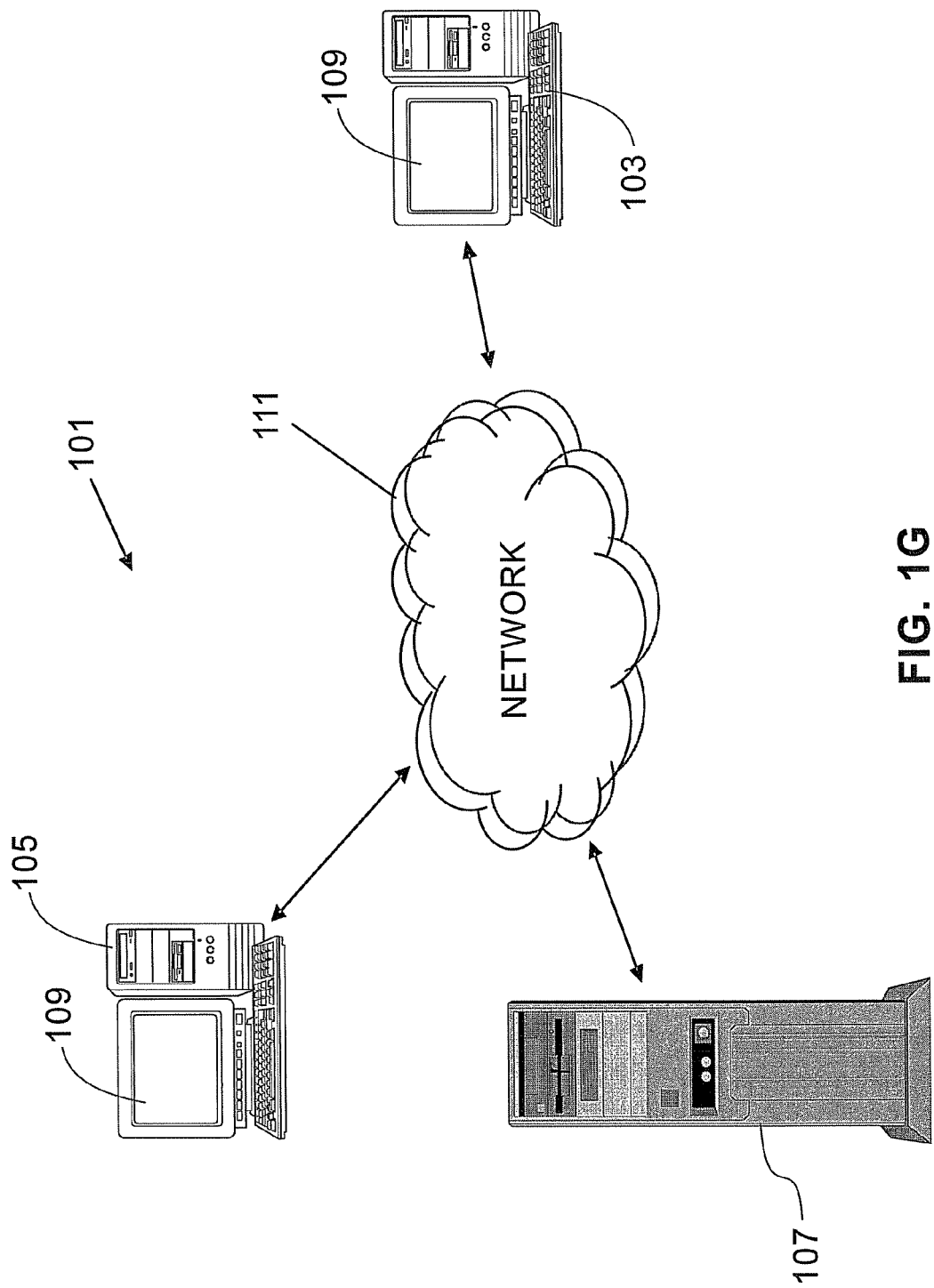
FIG. 1G illustrates a system for implementing embodiments of the invention.

FIG. 1G is a block diagram of an exemplary system 101 for implementing a software tool for the estimation and implementation of project plans for packaged software applications according to an embodiment of the present invention, and graphically illustrates how these blocks interact in operation. The system 101 includes portable remote devices 103 and desktop devices 105 equipped with speakers (not shown) for implementing the audio, as well as display capabilities 109 for facilitating graphical user interface (GUI) aspects of the software tool of the present invention. The portable remote devices 103 and desktop devices 105 may be wirelessly connected to a network 111. The network 111 may be any type of known network including a local area network (LAN), wide area network (WAN), global network (e.g., Internet), intranet, etc. with data/Internet capabilities as represented by server 107. Each portable remote device 103 and desktop device 105 may be implemented using a general-purpose computer executing a computer program for carrying out the GUI described herein. The computer program may be resident on a storage medium local to the remote devices 103 and 105, or maybe stored on the server system 107. The server system 107 may belong to a public service. The portable remote devices 103, and desktop devices 105 may be coupled to the server system 107 through multiple networks (e.g., intranet and Internet) so that not all portable remote devices 103, and desktop devices 105 are coupled to the server system 107 via the same network. The portable remote devices 103, and desktop devices 105, and the server system 107 may be connected to the network 111 in a wireless fashion, and network 111 may be a wireless network. In a preferred embodiment, the network 111 is a LAN and each portable remote device 103 and desktop device 105 executes a user interface application (e.g., web browser) to contact the server system 107 through the network 111. Alternatively, the portable remote devices 103 may be implemented using a device programmed primarily for accessing network 111 such as a remote client.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for scoring and ranking multi-dimensional project plans for implementing packaged software applications, the method comprising:
   inputting, using the computer, one or more dimensions for a project plan;
   assigning, using the computer, one or more attributes to each of the one or more dimensions;
   assigning, using the computer, one or more utility functions to each of the one or more attributes;
   assigning, using the computer, one or more weights to each of the one or more attributes;
   assigning, using the computer, one or more ordering factors to one or more combinations and permutations of the dimensions;
   calculating, using the computer, a series of scores for the one or more combinations and permutations of the dimensions; and
   ranking, using the computer, the one or more combinations and permutations of the dimensions based on the calculated series of scores;
   wherein each of the one or more combinations and permutations of the dimensions represents a different individual multi-dimensional project plan.

2. The method of claim 1, wherein a series of attribute values for the one or more attributes is inputted through a series of questionnaires.

3. The method of claim 2, wherein the series of attribute values are assigned to the utility functions to determine a series of corresponding utility values.

4. The method of claim 1, wherein the utility functions are at least one of the following: step functions, non-linear functions, and linear functions.

5. The method of claim 1, wherein the utility functions may be either a qualitative or quantitative measures.

6. The method of claim 1, wherein calculating the series of scores for the one or more combinations and permutations of the dimensions is carried out with one or more project plan score estimators in signal communication with one or more estimation knowledge bases; and
   wherein each of the project plan score estimators utilizes one or more mathematical models based on multi-attribute utility (MAU) theory with empirical data.

7. The method of claim 1, wherein calculating a series of scores for the one or more combinations and permutations of the dimensions further comprises the following:
   the calculation of one or more scores for a single-dimensional project plan that is a weight average utility value across involved attributes multiplied by one or more dimensional ordering factors; and
   wherein the calculation scales up the score comparable to those of multi-dimensional project plans.

8. The method of claim 1, wherein calculating a series of scores for the one or more combinations and permutations of the dimensions further comprises the following:
   the calculation of one or more scores for a multi-dimensional implementation project plan is the summation of the weight average utility value across involved attributes of each dimension, multiplied by ordering factors;
   wherein the calculation normalizes a resulting score comparable to resulting scores of other implementation project plans; and
   wherein the resulting scores reflect the effect of the orders of the involved dimensions.

9. The method of claim 1, wherein the ranked multi-dimensional plans are grouped according to a primary dimension;
   wherein the primary dimension is the first dimension listed in a given multi-dimensional plan;
   wherein the groupings are coded for visual identification; and
   wherein the coding comprises: colors, textures, shapes, and fonts.

10. The method of claim 9, wherein the grouping provides a visual indication of the consistency and validity of the scoring and ranking of the multi-dimensional project plans.

11. The method of claim 1, wherein one or more sensitivity analyses of the project plans may be conducted by changing one or more of the following: attributes, attribute weightings, and attribute utilities.

12. The method of claim 1, wherein a series of complete trees that show all combinations of multi-dimensional project plans are displayed to facilitate the adjustment of the multi-dimensional project plans.

13. The method of claim 1, wherein the plan dimensions that are taken into account in structuring packaged application projects plans include geography by continent, country, business unit, and business scenario to form a plurality of single-dimensional, two-dimensional, and three-dimensional project plans; and
   wherein geography by continent and country are never used together within an individual multi-dimensional project plan.

14. A system for scoring and ranking multi-dimensional project plans for implementing packaged software applications, the system comprising:
   a view layer configured to act as a user interface for user inputs and system outputs;
   a model and control layer configured to implement rules based on a series of estimation and implementation models, and to perform calculations to determine scores for ranking multi-dimensional project plans;
   an estimation knowledge base layer configured to hold and derive the series of estimation and implementation models; and
   wherein the system for scoring and ranking multi-dimensional project plans for implementing packaged software applications is carried out over networks comprising one or more of: the Internet, intranets, local area networks (LAN), and wireless local area networks (WLAN); wherein calculations to determine one or more scores for ranking multi-dimensional project plans is carried out with one or more project plan score estimators;
   wherein the one or more project plan score estimators:
   determine one or more dimensions for a project plan based on the series of estimation and implementation models;
   assign one or more attributes to each of the one or more dimensions;
   assign one or more utility functions to each of the one or more attributes;
   assign one or more weights to each of the one or more attributes;
   assign one or more ordering factors to one or more combinations and permutations of the dimensions;

assign the attributes, the utility functions, the weights, and the ordering factors based the series of estimation and implementation models;

calculate a series of scores for one or more combinations and permutations of the dimensions;

rank the one or more combinations and permutations of the dimensions based on the calculated series of scores; and wherein each of the one or more combinations and permutations of the dimensions represents a different individual multi-dimensional project plan.

15. The system of claim 14, wherein a series of attribute values for the one or more attributes are inputted through a series of questionnaires presented and answered in the view layer;

wherein the one or more project plan scorers assign the attribute values to the utility functions to determine a series of corresponding utility values;

wherein the utility functions are at least one of the following: step functions, non-linear functions, and linear functions; and wherein the utility functions may be either a qualitative or quantitative measures.

16. The system of claim 14, wherein the project plan score estimator utilizes a mathematical model based on multi-attribute utility (MAU) theory with empirical data to calculate the series of scores for the one or more combinations and permutations of the dimensions.

17. The system of claim 14, wherein calculating the series of scores for the one or more combinations and permutations of the dimensions further comprises the following:

the calculation of one or more scores for a single-dimensional project plan that is a weight average utility value across involved attributes multiplied by a single dimensional ordering factor;

wherein the single-dimensional calculation scales up the score comparable to those of multi-dimensional project plans;

wherein the calculation of one or more scores for a multi-dimensional implementation project plan is the summation of the weight average utility value across involved attributes of each dimension, multiplied by ordering factors;

wherein the multi-dimensional calculation normalizes a resulting score comparable to resulting scores of other implementation project plans; and wherein the resulting scores reflect the effect of the orders of the involved dimensions.

18. The system of claim 14, wherein the ranked multi-dimensional plans are grouped according to a primary dimension;

wherein the primary dimension is the first dimension listed in a given multi-dimensional plan;

wherein the groupings are coded for visual identification;

wherein the coding comprises: colors, textures, shapes, and fonts; and wherein the grouping provides a visual indication of the consistency and validity of the scoring and ranking of the multi-dimensional project plans.

19. The system of claim 14, wherein sensitivity analysis of the project plans may be conducted by one or more of the following: changing attributes, changing attribute weightings, and changing attribute utilities; and wherein a series of complete trees that show all combinations of multi-dimensional project plans are displayed in the view layer to facilitate the adjustment of the multi-dimensional project plans.

* * * * *